United States Patent [19]

Kirii et al.

[11] Patent Number: 5,457,980
[45] Date of Patent: Oct. 17, 1995

[54] METHOD AND DEVICE FOR CONTROLLING, CHECKING OR OPTIMIZING PRESSURE OF CUSHION PIN CYLINDERS OF PRESS BY DISCHARGING FLUID OR INITIAL PRESSURE

[75] Inventors: Kazunari Kirii, Aichi; Masahiro Shinabe, Toyota; Shigehiro Kirii, Nagoya, all of Japan

[73] Assignee: Toyota Jidosha Kabushiki Kaisha, Japan

[21] Appl. No.: 143,767

[22] Filed: Nov. 2, 1993

[30] Foreign Application Priority Data

Nov. 5, 1992 [JP] Japan ................... 4-321255
Nov. 5, 1992 [JP] Japan ................... 4-321256
May 7, 1993 [JP] Japan ................... 5-131397
May 7, 1993 [JP] Japan ................... 5-131398

[51] Int. Cl.⁶ ............................................. B21D 24/08
[52] U.S. Cl. ................................ 72/351; 72/453.13
[58] Field of Search .................... 72/350, 351, 453.13

[56] References Cited

U.S. PATENT DOCUMENTS

| 3,564,883 | 7/1968 | Koors et al. . |
| 4,601,190 | 7/1986 | Schneider et al. . |
| 4,745,792 | 5/1988 | Story et al. ................... 72/351 |
| 5,138,857 | 8/1992 | Siegert . |
| 5,255,552 | 10/1993 | Bielfeldt ................... 72/351 |
| 5,299,444 | 4/1994 | Kirii et al. ................... 72/351 |

FOREIGN PATENT DOCUMENTS

| 0173755 | 3/1986 | European Pat. Off. . |
| 0268894 | 6/1988 | European Pat. Off. . |
| 0312809 | 4/1989 | European Pat. Off. . |
| 0453955 | 10/1991 | European Pat. Off. . |
| 0531140 | 3/1993 | European Pat. Off. . |
| 0531141 | 3/1993 | European Pat. Off. . |
| 3807683 | 9/1989 | Germany . |
| 4128973 | 4/1992 | Germany ................... 72/351 |
| 60-108429 | 7/1985 | Japan . |
| 61-190316 | 11/1986 | Japan . |
| 62-3219 | 1/1987 | Japan . |
| 62-20711 | 2/1987 | Japan . |
| 62-46125 | 3/1987 | Japan . |
| 63-6353 | 3/1988 | Japan . |
| 63-31320 | 6/1988 | Japan . |
| 1-60721 | 4/1989 | Japan . |

Primary Examiner—Lowell A. Larson
Attorney, Agent, or Firm—Finnegan, Henderson, Farabow, Garrett & Dunner

[57] ABSTRACT

A cushioning apparatus for applying a blank-holding force to a pressure member to hold a blank on a press, through hydraulic cylinders on a cushion platen biased by a force generating device toward the pressure member, and cushion pins linked with the cylinders and supporting the pressure member, the blank-holding force being based on a biasing force generated by the force generating device, and controllable by a controller through a flow regulator provided in a discharge line for discharging the fluid from the cylinders, such that the controller controls the flow regulator to discharge the fluid from the cylinders during a pressing action on the blank by upper and lower dies, for thereby controlling the cylinder pressure according to a predetermined pattern of change in the pressure in relation to a downward movement of the upper die. The hydraulic cylinders may be classified into two or more groups connected to mutually independent discharge lines. The cylinder pressure may be optimized by disclosed methods and devices.

25 Claims, 29 Drawing Sheets

STROKE OF SLIDE 20

STROKE OF SLIDE 20

STROKE OF SLIDE 20

STROKE OF SLIDE 20

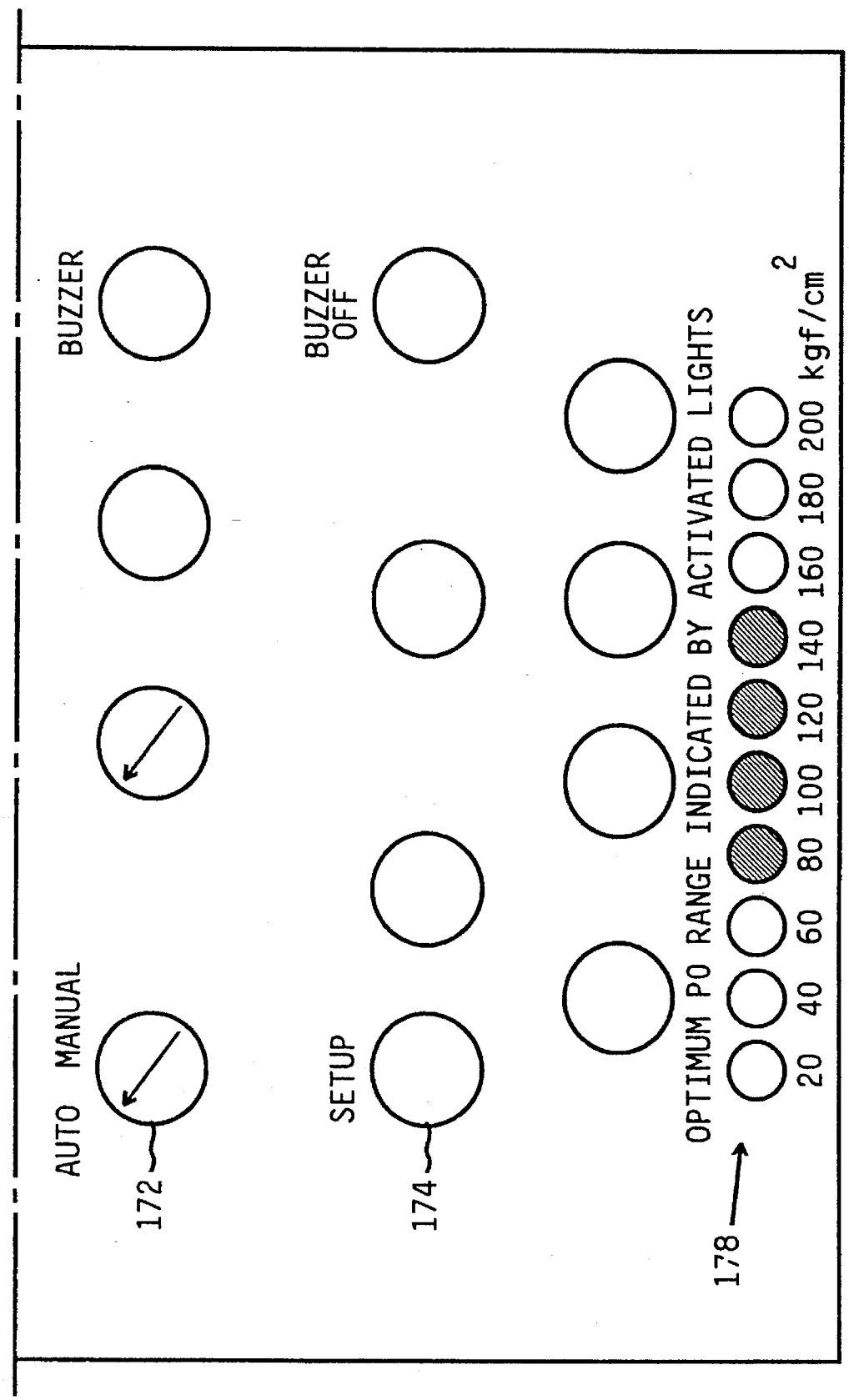

STROKE OF SLIDE 20

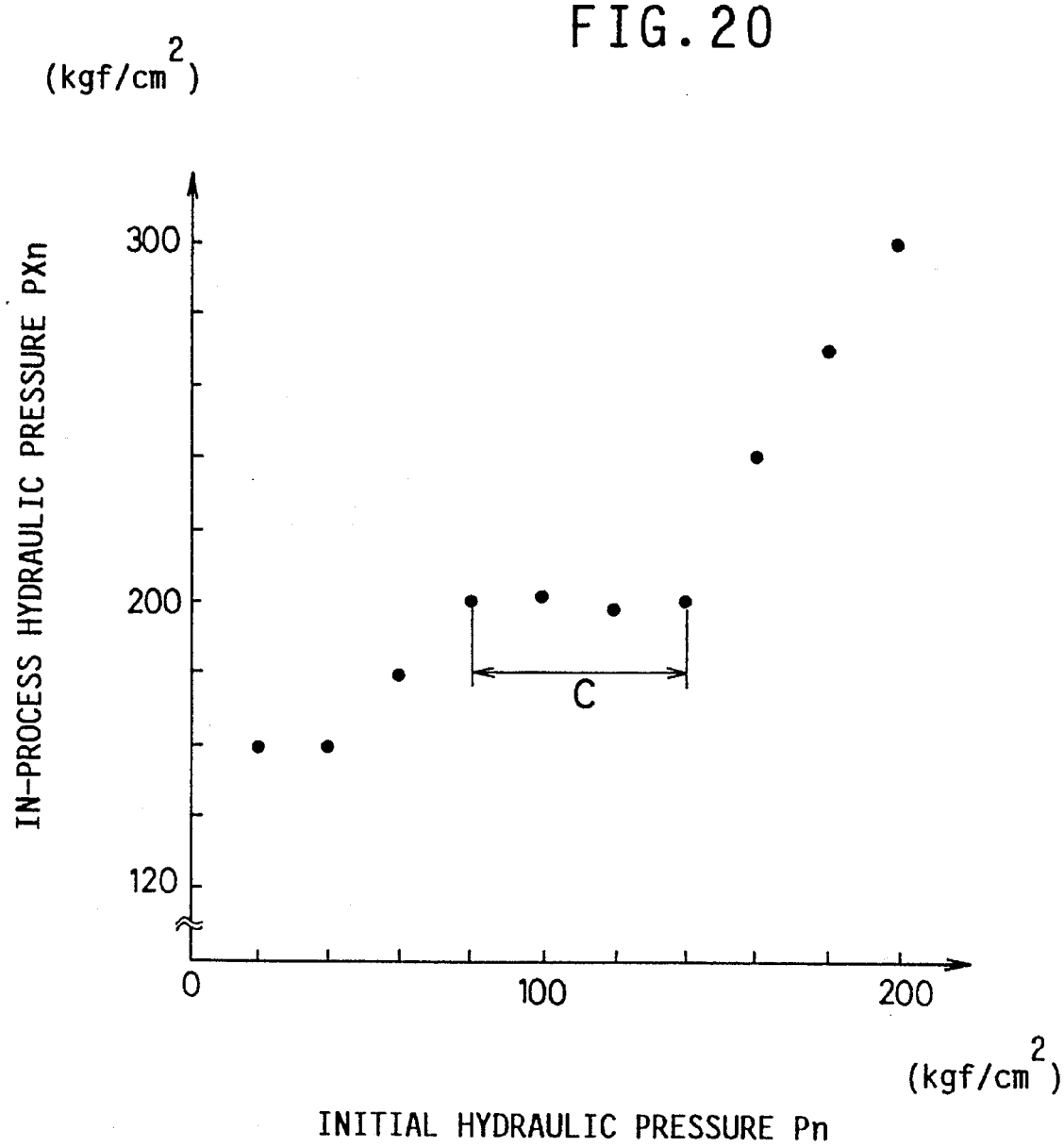

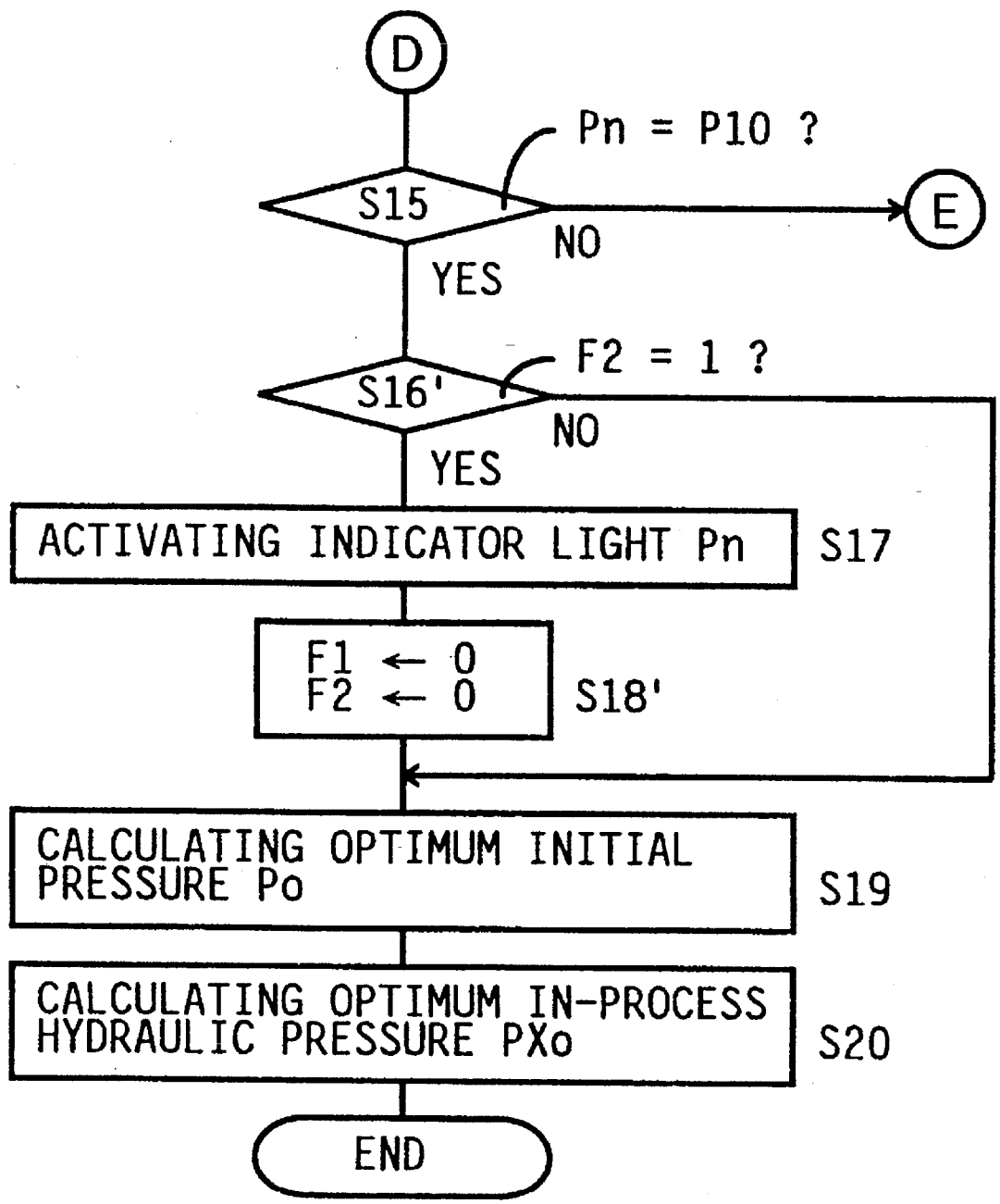

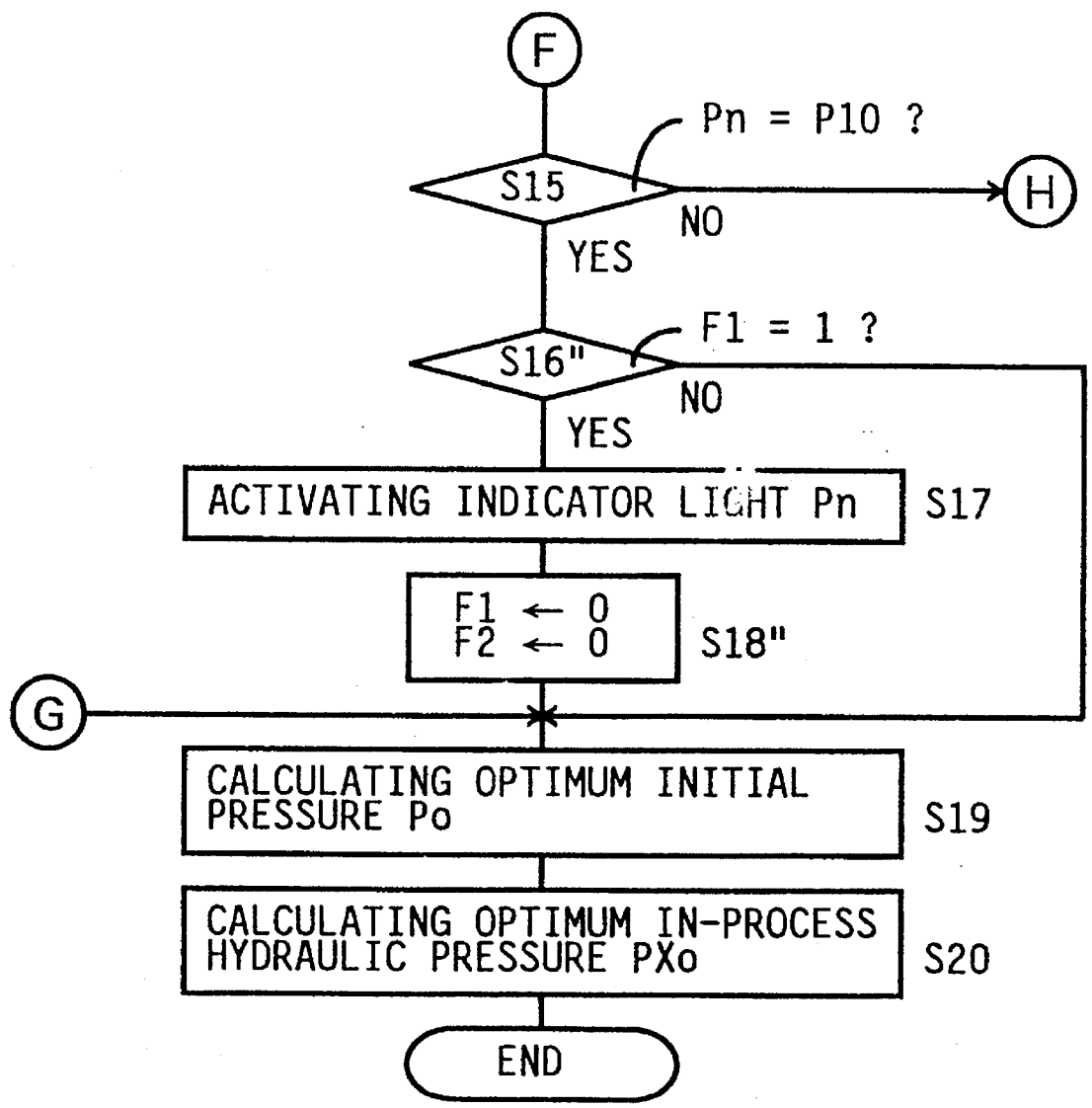

METHOD AND DEVICE FOR CONTROLLING, CHECKING OR OPTIMIZING PRESSURE OF CUSHION PIN CYLINDERS OF PRESS BY DISCHARGING FLUID OR INITIAL PRESSURE

BACKGROUND OF THE INVENTION

1. Field of the Invention

The present invention relates in general to a cushioning apparatus for applying a uniform cushioning force or a blank-holding force to a blank to be processed on a press, and more particularly to such cushioning apparatus capable of changing the force applied to hold the blank during a pressing operation on the workpiece, a method of checking or determining an optimum condition relating to a hydraulic pressure of the cushioning apparatus for uniform distribution of the blank-holding force, and a device for determining or establishing such optimum condition.

2. Discussion of the Related Art

A press has a press slide with an upper die attached thereto, which is lowered toward a lower die to perform a pressing operation on a blank or workpiece between the upper and lower dies while the blank is held by and between the upper die and a pressure member such as a pressure ring. For holding the blank during a pressing cycle, there is known a cushioning apparatus which includes (a) a cushion platen biased in an upward direction with a predetermined biasing force by suitable force generating means, (b) a plurality of balancing hydraulic cylinders disposed on the cushion platen and having respective fluid chambers which communicate with each other, and (c) a plurality of cushion pins linked at their lower ends with the respective hydraulic cylinders and supporting at their upper ends the pressure member, so that a blank-holding force (cushioning force) corresponding to the biasing force generated by the force generating means is applied to the pressure member through the cushion platen, hydraulic cylinders and cushion pins. The balancing hydraulic cylinders function to assure uniform distribution of the blank-holding force on the cushion pins, that is, permit the blank-holding force to be transmitted to the blank such that substantially equal components of the force act on all the cushion pins.

An example of such cushioning apparatus is disclosed in laid-open Publication No. 1-60721 of unexamined Japanese Utility Model Application, in which the hydraulic pressure in the balancing hydraulic cylinders is determined depending upon a desired value of the blank-holding force and other parameters, according to a suitably formulated equation or by a test pressing operation, so that the pistons of all the hydraulic cylinders are positioned between their upper and lower stroke ends (not positioned at their stroke ends) under reaction forces received from the cushion pins during a pressing action on the blank, irrespective of length variations of the cushion pins, inclination of the cushion platen, and other undesirable factors of the apparatus. The cushioning apparatus arranged as described above ensures substantially even distribution of the holding force and the surface pressure over the entire area of the pressure member, which permits consistently high quality of the articles produced from the blanks.

Another example of a cushioning apparatus for a pressing machine is disclosed in laid-open Publication No. 61-190316, in which the force generating means for generating the blank-holding force to be applied to the pressure member has a combination of a cushioning pneumatic cylinder and a cushioning hydraulic cylinder whose pistons are integrally connected in series with each other. The cushioning hydraulic cylinder is connected to a pressure relief valve, through which the pressurized fluid is discharged from the hydraulic cylinder when the hydraulic pressure exceeds a controllable relief pressure. The blank-holding force generated by the force generating means is determined by the pressure of the compressed air supplied to the pneumatic cylinder and the relief pressure of the pressure relief valve. During a pressing operation, the relief pressure of the relief valve is controlled by a controller, to change the blank-holding force. This cushioning apparatus having such force generating means and controller is capable of effecting fine or intricate adjustment of the blank-holding force during a pressing operation, namely, during a downward movement of the press slide after the upper die contacts the blank to start an effective pressing stroke down to the lower stroke end. The fine adjustment of the blank-holding force permits reduction in the vibration of the blank upon abutting contact of the upper die with the pressure member, and is effective to prevent an excessive amount of initial movement of the blank between the pressure member and the upper die due to the vibration, thereby assuring comparatively improved surface quality of the article produced from the blank. Further, the present arrangement makes it possible to reduce the blank-holding force during a pressing action on the blank to thereby protect the blank from rupture, whereby the material grade of the blank may be lowered to reduce the material cost. Thus, the cushioning apparatus having the force generating means and the controller arranged as described above not only assures even distribution of the blank-holding force on the pressure member (blank), but also provides other advantages for enhanced results of the pressing operation on the blank.

However, the above cushioning apparatus having the cushioning pneumatic and hydraulic cylinders as the force generating means capable of controlling the blank-holding force requires two hydraulic circuits, one for the balancing hydraulic cylinders associated with the cushion pins, and the other for the cushioning hydraulic cylinder of the force generating means for generating the blank-holding force. Accordingly, the apparatus tends to be complicated and expensive. Although the cost of the force generating means and the controller is comparatively low if they are incorporated in a cushioning apparatus upon manufacture of the apparatus, the application of these force generating means and controller to the existing cushioning apparatus requires considerable modification of the apparatus, which increases the overall cost of the apparatus to such a high level that cannot justify the practical utilization of such force generating means and controller for the existing cushioning apparatus.

As indicated above, the even distribution of the blank-holding force on the pressure member and the blank requires the pistons of all the balancing hydraulic cylinders associated with the cushion pins to be positioned between their upper and lower stroke ends, that is, held in their neutral position during a pressing operation on the blank, irrespective of possible length variations of the cushion pins and other fluctuating factors. To this end, an optimum initial hydraulic pressure Po applied to the hydraulic cylinders prior to a pressing operation so as to establish the desired even distribution of the blank-holding force on the pressure member is determined so as to satisfy the following equation (1):

$$Xav = (Fs - N \cdot As \cdot Po)V/n^2 \cdot As^2 \cdot K \quad (1)$$

where,

Xav: average operating stroke of the pistons of the hydraulic cylinders (cushion pins);

As: pressure-receiving area of the piston of each hydraulic cylinder;

K: volume modulus of elasticity of the working fluid;

V: total fluid volume in the hydraulic cylinders and the hydraulic circuit connected thereto;

Fs: blank-holding force; and n: number of the hydraulic cylinders (cushion pins).

The average operating stroke Xav of the pistons of the balancing hydraulic cylinders is predetermined by experiments, for example, so as to enable all the cushion pins to abut at their upper ends on the pressure member while the pistons of the hydraulic cylinders are spaced away from their upper stroke ends by the cushion pins, but do not reach their lower stroke ends due to collision of the upper die with the pressure member through the blank during a pressing action on the blank, even if the cushion pins have different length dimensions and the cushion platen is inclined with respect to the horizontal plane. The total fluid volume V is a total volume of the working fluid in the fluid chambers of all the hydraulic cylinders when the pistons are at their upper ends, plus a volume of the fluid in the hydraulic circuit connected to the hydraulic cylinders.

The optimum initial hydraulic pressure Po determined so as to satisfy the above equation (1) basically permits the pistons of the hydraulic cylinders to be lowered from their upper stroke ends by an average distance equal to Xav, during a pressing action on the blank, so that the blank-holding force is substantially evenly distributed on the pressure members through the cushion pins. In this respect, it is noted however that the volume modulus of elasticity K of the fluid varies due to air introduced into the fluid or deterioration of the fluid. Therefore, the optimum initial hydraulic pressure Po calculated according to the above equation (1) is not necessarily accurate. To improve the accuracy of the optimum initial hydraulic pressure Po, it is known to adjust the value Po as obtained from the equation (1), during a test pressing operation, so that an in-process hydraulic pressure PX generated in the hydraulic cylinders during the pressing operation substantially coincides with an optimum value PXo which is obtained according to the following equation (2):

$$Fs + Wr + n \cdot Wp = n \cdot As \cdot PXo \qquad (2)$$

where,

Fs: blank-holding force;

Wr: weight of the pressure member; .

Wp: average weight of the cushion pins;

n: number of the cushion pins; and

As: pressure-receiving area of the piston of hydraulic cylinders.

The values Xav, As, K, V and other values necessary to calculate the optimum initial hydraulic pressure Po prior to a pressing operation and the optimum in-process hydraulic pressure PXo during the pressing operation should be as accurate as possible. In this sense, these values should not be theoretical values but should be obtained by experiments performed on the individual pressing machines which have specific operating characteristics. These experiments to obtain the values used to calculate the optimum initial and in-process values Po and PXo are extremely cumbersome and time-consuming. Yet, the values obtained by the cumbersome experiments may include some errors, which lead to errors in the calculated optimum values Po and PXo, resulting in the failure to establish uniform distribution of the blank-holding force and the surface pressure on the pressure member, even if the actual initial and in-process pressure values P and PX are adjusted to the calculated optimum values Po and PXo. Thus, the article produced from the blank may be defective. Another proposed approach to improve the quality of the produced article is to compare the actual in-process hydraulic pressure PX with the optimum value PXo obtained as described above, to thereby monitor the distribution of the blank-holding force on the pressure member. However, the comparison of the values PX and PXo does not allow accurate checking of the uniform distribution of the blank-holding force.

SUMMARY OF THE INVENTION

The present invention was made in view of the prior art discussed above.

It is therefore a first object of the present invention to provide a cushioning apparatus for a press, which has balancing hydraulic cylinders for even distribution of the blank-holding force on the pressure member, and which is economical to manufacture and capable of controlling the blank-holding force during a pressing operation on the blank.

A second object of this invention is to provide a method by which an optimum hydraulic pressure condition of the cushioning apparatus such as the optimum initial and in-process hydraulic pressure values of the balancing hydraulic cylinders can be easily and accurately checked or determined so as to establish uniform distribution of the blank-holding force on the pressure member through the cushion pins.

A third object of the invention is to provide a device capable of easily and accurately determining or establishing such optimum hydraulic pressure condition of the cushioning apparatus.

The first object indicated above may be achieved according to a first aspect of the present invention, which provides a cushioning apparatus for a press having an upper die and a lower die which cooperate to perform a pressing action on a blank during a downward movement of the upper die, and a pressure member which cooperates with the upper die to hold the blank during the pressing action, the cushioning apparatus including (a) force generating means for generating a biasing force, (b) a cushion platen disposed below the lower die and biased toward the lower die by the biasing force, (c) a plurality of balancing hydraulic cylinders disposed on the cushion platen and having fluid chambers communicating with each other, and (d) a plurality of cushion pins associated at lower ends thereof with the hydraulic cylinders, respectively, and supporting at upper ends thereof the pressure member, and wherein the blank is held by the upper die and the pressure member during the pressing action, by a blank-holding force corresponding to the biasing force which is transmitted to the pressure member through the hydraulic cylinders and cushion pins such that the biasing force is substantially evenly distributed on all of the cushion pins by the hydraulic cylinders, the cushioning apparatus being characterized by comprising: a discharge line connected to the fluid chambers of the hydraulic cylinders, for discharging a pressurized fluid from the hydraulic cylinders; flow regulating means provided in the discharge line and having a closed state in which a discharge flow of the fluid from the hydraulic cylinders through the discharge line is inhibited, and an open state in which the fluid is permitted to be discharged at a predetermined flow rate through the discharge line; and control means for controlling the flow regulating means, to discharge the fluid from the hydraulic cylinders through the discharge line during the pressing action on the blank, for thereby controlling a pressure in the hydraulic cylinders according to a predetermined pattern of change in the pressure in relation to the downward movement of the upper die during the pressing action.

The blank-holding force to be applied to the pressure member to hold the blank is basically determined by the biasing force generated by the force generating means of the cushioning apparatus. If the fluid is partially discharged from the balancing hydraulic cylinders during a pressing action in which the cushion platen, hydraulic cylinders and cushion pins are lowered as a unit, the pressure in the hydraulic cylinders is temporarily lowered due to the inertia of those components, whereby the blank-holding force is accordingly decreased. The amount of decrease of the blank-holding force varies with the rate of discharge of the fluid from the hydraulic cylinders. When the fluid discharge from the hydraulic cylinders is stopped during the pressing action, the blank-holding force will rise back to the original level determined by the biasing force of the force generating means. Therefore, the blank-holding force can be controlled or changed as needed during the pressing action, by controlling the flow regulating means provided in the discharge line, to permit the fluid to be discharged from the hydraulic cylinders through the flow regulating means according to a predetermined pattern of change in the flow rate in relation to the downward movement of the upper die during the pressing action, whereby the pressure in the hydraulic cylinders is changed according to a pattern corresponding to the pattern of change in the rate of the discharge flow of the fluid.

As explained above, the present cushioning apparatus is capable of adjusting the blank-holding force during a pressing action by partially discharging the pressurized fluid from the balancing hydraulic cylinders whose primary function is to establish even distribution of the blank-holding force. Accordingly, the apparatus according to the present invention does not require a cushioning hydraulic cylinder conventionally used in combination with a cushioning pneumatic cylinder to provide the force generating means. The conventionally used cushioning hydraulic cylinder is connected to a pressure relief valve to control the blank-holding force. In the absence of such cushioning hydraulic cylinder and the pressure relief valve connected to that cushioning hydraulic cylinder, the present cushioning apparatus is comparatively simple and available at a reduced cost. Further, the present cushioning apparatus may be easily provided on an existing press, by simply connecting the discharge line to the fluid chambers of the balancing hydraulic cylinders, and providing the flow regulating means in the discharge line so that the flow rate of the flow regulating means is controlled by the controller in relation to the vertical position of the upper die during the pressing action. Thus, the present apparatus is available on the existing press without considerable modifications of the press.

The first object indicated above may also be achieved according to a second aspect of this invention, which provides a cushioning apparatus for a press having an upper die and a lower die which cooperate to perform a pressing action on a blank during a downward movement of the upper die, and a pressure member which cooperates with the upper die to hold the blank during the pressing action, the cushioning apparatus including (a) force generating means for generating a biasing force, (b) a cushion platen disposed below the lower die and biased toward the lower die by the biasing force, (c) a plurality of hydraulic cylinders disposed on the cushion platen, and (d) a plurality of cushion pins associated at lower ends thereof with the hydraulic cylinders, respectively, and supporting at upper ends thereof the pressure member, and wherein the blank is held by the upper die and the pressure member during the pressing action, by a blank-holding force corresponding to the biasing force which is transmitted to the pressure member through the hydraulic cylinders and cushion pins such that the biasing force is substantially evenly distributed on all of the cushion pins by the hydraulic cylinders, the cushioning apparatus being characterized by comprising: a plurality of mutually independent supply lines connected to respective groups of the hydraulic cylinders so that a pressurized fluid is supplied to the respective groups of hydraulic cylinders through the supply lines independently of each other; a plurality of discharge lines connected to the respective groups of hydraulic cylinders, for discharging the fluid from the respective groups of hydraulic cylinders; a plurality of flow regulating means provided in the plurality of discharge lines, respectively, each of the flow regulating means having a closed state in which a discharge flow of the fluid from a corresponding one of the respective groups of hydraulic cylinders through a corresponding one of the plurality of discharge lines is inhibited, and an open state in which the fluid is permitted to be discharged at a predetermined flow rate through the corresponding one discharge line; and control means for controlling the plurality of flow regulating means, independently of each other, to discharge the fluid from the respective groups of hydraulic cylinders through the corresponding flow regulating means during the pressing action on the blank, for thereby controlling pressure values in the respective groups of hydraulic cylinders according to predetermined patterns of change in the pressure values in relation to the downward movement of the upper die during the pressing action.

In the cushioning apparatus constructed as described above according to the second aspect of this invention, the pressurized fluid is supplied to the plurality of groups of hydraulic cylinders through the respective mutually independent supply lines, while the plurality of groups of hydraulic cylinders are connected to the respective discharge lines so that the discharge flows of the fluid from the plurality of groups of hydraulic cylinders through the corresponding discharge lines are controlled independently of each other by the respective flow regulating means which are provided in the respective discharge lines and which are controlled independently of each other by the control means, to control the pressure values of the fluid in the respective groups of hydraulic cylinders according to the predetermined patterns of change in the pressure values in relation to the downward movement of the upper die during the pressing action. Accordingly, the local blank-holding force values acting on the local portions of the pressure member corresponding to the two or groups of hydraulic cylinders can be intricately controlled independently of each other, namely, can be adjusted to different values, by suitably controlling the rates of the discharge flows of the fluid through the respective flow regulating means, depending upon the specific configuration and specifications of the blank and varying degrees of wear at the local portions of the die set which includes the upper die, lower die and pressure member.

The second object indicated above may be achieved according to a third aspect of this invention, which provides a method of checking an optimum condition relating to a hydraulic pressure of a plurality of hydraulic cylinders in a cushioning apparatus for a press having an upper die and a lower die which cooperate to perform a pressing action on a blank during a downward movement of the upper die, and a pressure member which cooperates with the upper die to hold the blank during the pressing action, the cushioning apparatus including (a) force generating means for generating a blank-holding force, (b) a cushion platen disposed below the lower die and biased toward the lower die by the blank-holding force, (c) the plurality of hydraulic cylinders disposed on the cushion platen and having fluid chambers communicating with each other, and (d) a plurality of cushion pins associated at lower ends thereof with the hydraulic cylinders, respectively, and supporting at upper ends thereof the pressure member, and wherein the blank is held by the upper die and the pressure member during the pressing action, by the blank-holding force which is generated by the force generating means and which is transmitted to the pressure member through the cushion platen, hydraulic cylinders and the cushion pins such that the blank-holding force is substantially evenly distributed on all of the cushion pins by the hydraulic cylinders, the method comprising the steps of: detecting an in-process value of a hydraulic pressure in the hydraulic cylinders during the pressing action, while changing an initial value of the hydraulic pressure prior to the pressing action, to thereby obtain a relationship between the initial and in-process values of the hydraulic pressure; and determining, on the basis of the detected relationship, an optimum range of the initial value of the hydraulic pressure in which the in-process value of the hydraulic pressure is substantially constant irrespective of a change in the initial value.

The graph of FIG. 17 indicates a relationship between the initial hydraulic pressure in the hydraulic cylinders prior to a pressing action on the blank and the in-process hydraulic pressure during the pressing action. This relationship is obtained by changing the initial hydraulic pressure while the other operating conditions of the press such as the blank-holding force are held constant. When the initial hydraulic pressure is in a high range A, the pistons of all the hydraulic cylinders are kept stationary while being held in their upper stroke ends, as indicated in FIG. 17. With the initial hydraulic pressure being lowered to fall within a relatively low range B, the pistons of some of the hydraulic cylinders corresponding to the relatively long cushion pins are slightly moved downward away from their upper stroke ends, while the pistons of the other hydraulic cylinders corresponding to the relatively short cushion pins are still held at their upper stroke ends. In this condition, the blank-holding force is not perfectly evenly distributed on all the cushion pins. As the initial hydraulic pressure of the hydraulic cylinders is lowered, the average distance of downward movements of the pistons of the cylinders increases, thereby increasing the number of the cylinders whose pistons are moved downward away from the upper stroke ends, whereby the blank-holding force is distributed to those cylinders and the corresponding cushion pins. Accordingly, the in-process hydraulic pressure of the cylinders during the pressing action is lowered as the initial hydraulic pressure is lowered within the range B.

When the initial hydraulic pressure is in a range C lower than the range B, the pistons of all the hydraulic cylinders are placed in their neutral positions, that is, located between their upper and lower stroke ends, as indicated in FIG. 17. In this condition, the blank-holding force is evenly distributed on all the cushion pins through the respective hydraulic cylinders. In this sense, this range C is referred to as an optimum range. Within this optimum range C, the in-process hydraulic pressure is held substantially constant, with the cylinder pistons being slightly moved toward their lower stroke ends as the initial hydraulic pressure is lowered. In a range D lower than the optimum range C, the pistons of some of the hydraulic cylinders are bottomed or reach their lower stroke ends, whereby the blank-holding force is not evenly distributed on all the cushion pins. The bottomed pistons will cause the blank-holding force to be transmitted directly to the corresponding cushion pins without the cushioning effect of the hydraulic pressure. As the initial hydraulic pressure is lowered, the number of the bottomed pistons increases, and the in-process hydraulic pressure is accordingly lowered.

It is noted that all the hydraulic cylinders provided on the cushion platen are not necessarily or always placed in their operable states or used to effectively act to transmit the blank-holding force to the pressure member, but some of the hydraulic cylinders may be held in their inoperable states as needed. In this respect, "all the hydraulic cylinders" as defined above with respect to the optimum range C should be interpreted to mean all the hydraulic cylinders which are placed in their operable states and whose pistons are moved downward away from their upper stroke ends through the corresponding cushion pins during a pressing action on the blank, and contribute to the distribution of the blank-holding force to the pressure member.

If the cushion pins have an excessively large variation in the length dimension, or if the operating strokes of some of the cylinder pistons are excessively small, there may arise a situation in which some of the cylinder pistons are held at their upper stroke ends while the other cylinder pistons are bottomed (held at their lower stroke ends). In this case, it is possible that the optimum range C of the initial hydraulic value as defined above cannot be recognized or cannot be clearly determined, or two or more optimum ranges are recognized. In such situation, therefore, some abnormality exists in the cushioning apparatus.

It will be understood from the above explanation that the optimum range (indicated at C in FIG. 17) in which the in-process hydraulic pressure is held substantially constant even with a change in the initial hydraulic pressure can be determined, recognized or detected on the basis of the relationship between the initial and in-process values of the hydraulic pressure, which relationship is obtained by detecting the in-process value while the initial value is changed. The thus determined optimum range C of the initial hydraulic pressure can be used to determine the optimum condition relating to the hydraulic pressure of the hydraulic cylinders, namely, the optimum initial pressure and/or the optimum in-process pressure of the hydraulic cylinders which permit substantially even or uniform distribution of the blank-holding force to all the cushion pins. Described in detail, an initial hydraulic pressure value selected within the determined optimum range C may be used as an optimum initial pressure Po prior to a pressing action, which permits the blank-holding force to be evenly distributed to all the cushion pins. By adjusting the initial hydraulic pressure to the optimum initial value Po prior to the pressing operation, the distribution of the surface pressure of the pressure member during the pressing action can be made substantially constant over the entire working area of the pressure member. Further, the in-process hydraulic pressure value corresponding to the optimum initial pressure value Po is an optimum in-process hydraulic pressure PXo during the pressing action. Consequently, the initial hydraulic pressure may be finely adjusted so that the actual in-process hydraulic pressure substantially coincides with the optimum value PXo. Further, inadequate pressing conditions due to some abnormality of the hydraulic cylinders (e.g., due to foreign matters trapped within the cylinders) can be detected by monitoring the actual in-process hydraulic pressure for substantial coincidence with the optimum value PXo. It is also possible to obtain the actual blank-holding force from the determined optimum in-process pressure value PXo. If the optimum range of the initial hydraulic pressure cannot be determined or recognized, this information can be used to provide an indication that the cushioning apparatus suffers from some abnormality.

As is apparent from the above description, the method according to the third aspect of the invention permits easy and accurate determination or diagnosis of the optimum condition relating to the hydraulic pressure of the hydraulic cylinders, without the conventionally required calculation according to the above equations (1) or (2) on the basis of the average operating stroke Xav and pressure-receiving area As of the pistons of the hydraulic cylinders, and volume modulus of elasticity K and total volume V of the working fluid.

The second object indicated above may also be achieved according to a fourth aspect of the present invention, which provides a method of checking an optimum condition relating to a hydraulic pressure of a plurality of hydraulic cylinders in a cushioning apparatus for a press having an upper die and a lower die which cooperate to perform a pressing action on a blank during a downward movement of the upper die, and a pressure member which cooperates with the upper die to hold the blank during the pressing action, the cushioning apparatus including (a) force generating means for generating a blank-holding force, (b) a cushion platen disposed below the lower die and biased toward the lower die by the blank-holding force, (c) the plurality of hydraulic cylinders disposed on the cushion platen and having fluid chambers communicating with each other, and (d) a plurality of cushion pins associated at lower ends thereof with the hydraulic cylinders, respectively, and supporting at upper ends thereof the pressure member, and wherein the blank is held by the upper die and the pressure member during the pressing action, by the blank-holding force which is generated by the force generating means and which is transmitted to the pressure member through the cushion platen, hydraulic cylinders and the cushion pins such that the blank-holding force is substantially evenly distributed on all of the cushion pins by the hydraulic cylinders, the method comprising the steps of: lowering the upper die to a predetermined blank-holding position for abutting contact with the pressure member; detecting a hydraulic pressure of a working fluid in a hydraulic circuit including the hydraulic cylinders, while the upper die is held in the blank-holding position and while an amount of the working fluid in the hydraulic circuit is changed; and determining an optimum range of the hydraulic pressure in which the hydraulic pressure is substantially constant irrespective of a change in the amount of the fluid in the hydraulic circuit.

Changing the amount of the working fluid in the hydraulic circuit including the hydraulic cylinders has substantially the same significance as changing the initial hydraulic pressure in the hydraulic cylinders prior to a pressing action in the method according to the third aspect of the invention. That is, when the hydraulic pressure in the hydraulic cylinders is held within an optimum range permitting substantially even distribution of the blank-holding force, the fluid pressure in the hydraulic circuit is substantially constant, irrespective of a change in the amount of the fluid in the hydraulic circuit, which causes only slight movements of the pistons of the hydraulic cylinders. In view of this fact, the present method is formulated to first lower the upper die to the predetermined blank-holding position such as its lower stroke end, change the amount of the fluid in the hydraulic circuit communicating with the hydraulic cylinders while the upper die is held in the blank-holding position, and detect the pressure of the fluid while the fluid amount is changed. The range of the fluid pressure in which the fluid pressure is substantially constant irrespective of a change in the fluid amount in the hydraulic circuit may be determined as an optimum range of the fluid pressure that should be established during a pressing action. Therefore, the above-indicated optimum hydraulic pressure PXo of the hydraulic cylinders can be selected within the determined optimum range. Accordingly, the initial pressure of the hydraulic cylinders can be adjusted to an optimum level so that the actual in-process hydraulic pressure during a pressing action is substantially equal to the determined optimum value PXo. During an actual pressing operation, the in-process hydraulic pressure may be compared with the determined optimum value PXo, to monitor the pressing condition for any abnormality which may arise due to entry of any foreign matters in the hydraulic cylinders. The optimum in-process hydraulic pressure PXo may be used to obtain the desired blank-holding force. If the optimum range of the fluid pressure in the hydraulic circuit cannot be determined or detected, this means the existence of some abnormality in the cushioning apparatus, which may be indicated by suitable alarm means.

The method according to the fourth aspect of this invention as described above also permits easy and accurate determination of the optimum condition relating to the hydraulic pressure of the hydraulic cylinders, and diagnosis of the cushioning apparatus, without the conventionally required calculation according to the above equation (1) or (2) on the basis of the operating parameters of the apparatus such as the average operating stroke Xav and pressure-receiving area as of the pistons of the cylinders, and the volume modulus of elasticity K and total volume V of the working fluid in the hydraulic circuit. Further, since the fluid pressure is detected with the fluid amount being changed while the press slide is held in the blank-holding position, the operation to determine the optimum hydraulic pressure condition can be readily and efficiently performed in a fully automatic manner, unlike the operation according to the third aspect of the invention in which the in-process hydraulic pressure values are detected with different initial hydraulic pressure values that are established in different test pressing cycles.

The third object may be achieved according to a fifth aspect of this invention, which provides an device for determining an optimum condition relating to a hydraulic pressure of a plurality of hydraulic cylinders in a cushioning apparatus for a press having an upper die and a lower die which cooperate to perform a pressing action on a blank during a downward movement of the upper die, and a pressure member which cooperates with the upper die to hold the blank during the pressing action, the cushioning apparatus including (a) force generating means for generating a blank-holding force, (b) a cushion platen disposed below the lower die and biased toward the lower die by the blank-holding force, (c) the plurality of hydraulic cylinders disposed on the cushion platen and having fluid chambers communicating with each other, and (d) a plurality of cushion pins associated at lower ends thereof with the hydraulic cylinders, respectively, and supporting at upper ends thereof the pressure member, and wherein the blank is held by the upper die and the pressure member during the pressing action, by the blank-holding force which is generated by the force generating means and which is transmitted to the pressure member through the cushion platen, hydraulic cylinders and the cushion pins such that the blank-holding force is substantially evenly distributed on all of the cushion pins by the hydraulic cylinders, the apparatus comprising: (i) detecting means for detecting a hydraulic pressure in the hydraulic cylinders; (ii) initial pressure changing means for changing an initial value of the hydraulic pressure prior to the pressing action, in a plurality of steps at a predetermined rate of change; (iii) calculating means for calculating an amount of change in an in-process value of the hydraulic pressure detected by the detecting means during the pressing action, which amount of change arises from a change of the initial value by the initial pressure changing means, each time the initial value is changed; (iv) judging means for judging whether the amount of change in the in-process value calculated by the calculating means is larger than a predetermined value; and (v) determining means for determining an optimum condition relating to the hydraulic cylinders, on the basis of an optimum range of the initial value of the hydraulic pressure in which the amount of change in the in-process value is not larger than the predetermined value.

In the present device constructed as described above, the in-process values of the hydraulic pressure of the hydraulic cylinders during a pressing action on the blank are detected by the detecting means while the initial value of the hydraulic pressure is changed by the initial pressure changing means. The amount of change of the successively detected in-process pressure values corresponding to the different initial pressure values is calculated by the calculating means. The judging means judges whether the calculated amount of change is larger than a predetermined value or not, that is, determines whether the in-process pressure value is substantially constant irrespective of a change in the initial pressure value. If the calculated amount of change is determined not to be larger than the predetermined value, the corresponding initial pressure value is determined to fall within an optimum range of the initial pressure. This determination is effected each time the initial pressure value is changed. Based on the initial pressure values within the determined optimum range, the determining means determines the optimum operating condition relating to the pressure of the hydraulic cylinders, for instance, the optimum initial hydraulic pressure Po and/or the optimum in-process hydraulic pressure PXo. The optimum initial hydraulic pressure Po selected within the optimum range permits even distribution of the blank-holding force to all the cushion pins. The optimum in-process hydraulic pressure PXo corresponds to the initial pressure value selected within the optimum range. In the present device, the initial hydraulic pressure may be finely adjusted so that the actual in-process hydraulic pressure substantially coincides with the optimum value PXo. Further, inadequate pressing conditions due to some abnormality of the hydraulic cylinders (e.g., due to foreign matters trapped within the cylinders) can be detected by monitoring the actual in-process hydraulic pressure for substantial coincidence with the optimum value PXo.

The device according to the fifth aspect of this invention is capable of determining the optimum condition relating to the hydraulic pressure of the hydraulic cylinders, according to the principle of the method according to the third aspect of the invention. The initial pressure changing means for changing the initial pressure value and the detecting means for detecting the in-process pressure value while the initial pressure value is changed correspond to the detecting step of the method. Further, the calculating means for calculating the amount of change in the in-process pressure value and the judging means for judging whether the amount of change is larger than the predetermined value corresponds to the determining step of the method.

The present device is also capable of easily and accurately determining the optimum hydraulic pressure condition of the hydraulic cylinders, without the conventionally required calculation according to the above equation (1) or (2) on the basis of the average operating stroke Xav and pressure-receiving area As of the hydraulic cylinder pistons and the volume modulus of elasticity K and total volume V of the working fluid. Accordingly, the present device is effective to reduce defects of the product obtained by the pressing action on the blank. Further, the operator's load can be reduced, and the erroneous setting of the operating conditions of the press due to erroneous manipulation of the press can be effectively avoided, since the device is adapted to automate the detection of the hydraulic pressure, calculation of the amount of change in the detected pressure, determination on the optimum range of the initial pressure, and determination of the optimum hydraulic pressure condition on the basis of the determined optimum range.

BRIEF DESCRIPTION OF THE DRAWINGS

The above and optional objects, features and advantages of the present invention will become more apparent from the following detailed description of presently preferred embodiments of the invention, when considered in connection with the accompanying drawings, in which:

FIGS. 13A and 13B are views illustrating an operator's control panel provided on the press of FIG. 12;

FIG. 20 is a graph indicating another example of the relationship between the pressure values Pn and PXn, which is different from that of FIG. 16;

FIGS. 21A, 21B and 21C are flow charts illustrating a routine executed in a still further embodiment of this invention, in place of the routine of FIGS. 14A and 14B;

FIGS. 23A and 23B are flow charts illustrating another routine executed in another embodiment of the invention;

DETAILED DESCRIPTION OF THE PREFERRED EMBODIMENTS

Figure 1:
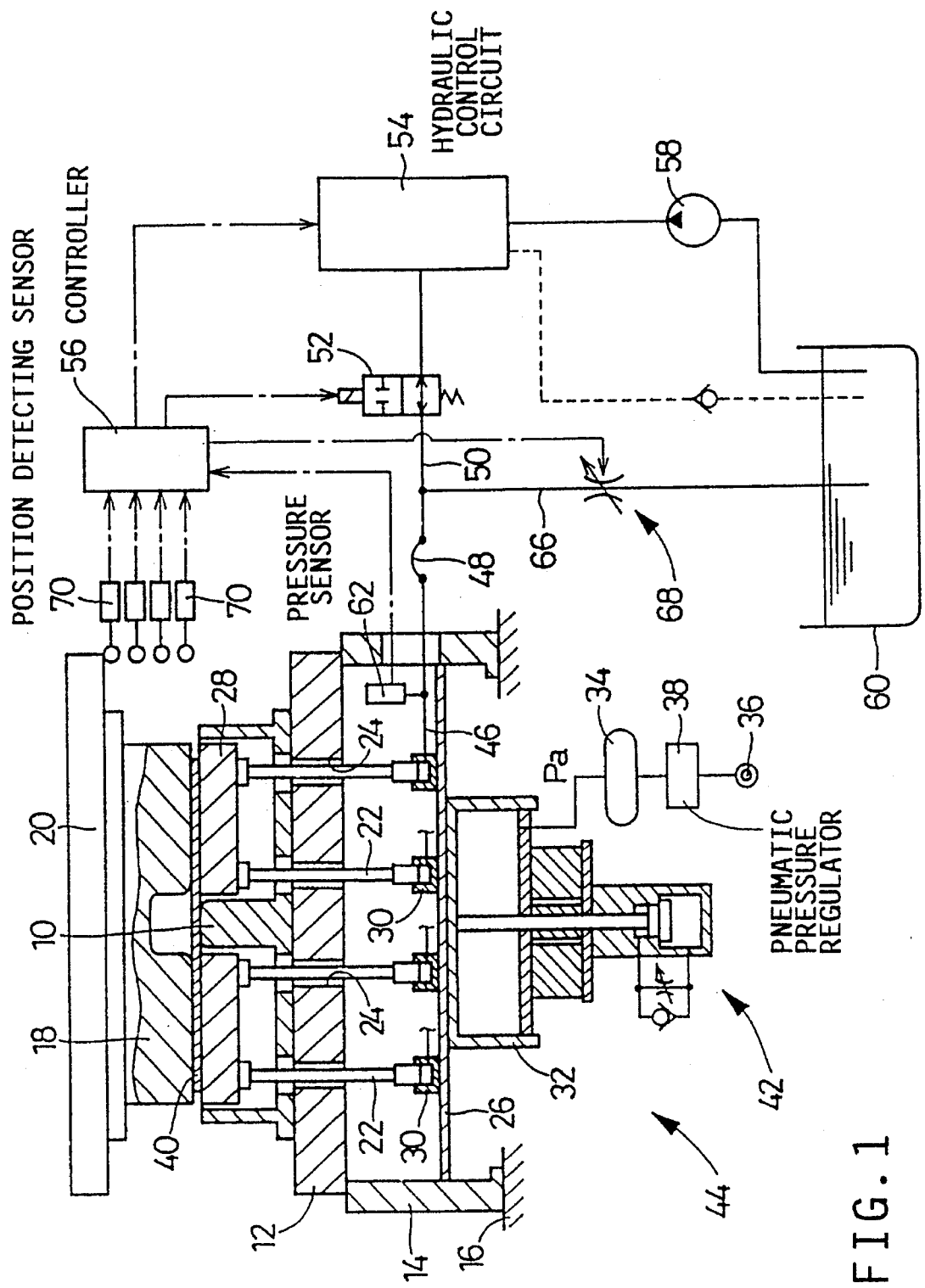
FIG. 1 is a fragmentary schematic view showing a part of a press equipped with a cushioning apparatus constructed according to one embodiment of the present invention.

Referring first to FIG. 1, there is shown a part of a press in which a lower die in the form of a punch 10 is mounted on a bolster 12 disposed on a carrier 14 resting on a machine base 16, while an upper die 18 is carried by a press slide 20 which is vertically reciprocated by a drive mechanism including a drive motor, cranks and links, as well known in the art. The bolster 12 has a multiplicity of through-holes 24 through which respective cushion pins 22 extend in the direction of reciprocation of the press slide 20. The cushion pins 22 are supported at their lower ends by a cushion platen 26 disposed below the bolster 12.

The cushion pins 22 are provided to support, at their upper ends, a pressure member in the form of a pressure ring 28 which is disposed so as to surround the working portion of the punch 10. The number of the cushion pins 22 and their positions relative to the pressure ring 28 are determined as needed depending upon the size and configuration of the pressure ring 28. The cushion platen 26 is provided with a multiplicity of balancing hydraulic cylinders 30 disposed thereon in alignment with the through-holes 24 formed through the bolster 12. The hydraulic cylinders 30 have housings secured to the upper surface of the cushion platen 26, and pistons which are held in abutting contact with the lower end faces of the respective cushion pins 22. As indicated above, the punch 10, die 18 and pressure ring 28 serve as the lower die, upper die and pressure member, respectively.

The cushion platen 26 is disposed within the press carrier 14 and supported by a cushioning pneumatic cylinder 32, such that the platen 26 is movable in the direction of reciprocation of the press slide 20, and biased by the pneumatic cylinder 32 in the upward direction. The pneumatic cylinder 32 has an air chamber communicating with an air tank 34 which stores compressed air having a pneumatic pressure Pa supplied from an air pressure source 36 via a pneumatic pressure regulator 38. The pneumatic pressure Pa is determined and adjusted depending upon a desired blank-holding force to be applied to the pressure ring 28. Described in detail, a blank 40 in the form of a metal strip to be drawn into an intended article is placed on the pressure ring 28 before a pressing or drawing operation on the blank 40 is started with a downward movement of the press slide 20 with the upper die 18. As the slide 20 is lowered to a given point, the upper die 18 forces an outer portion of the blank 40 against the pressure ring, whereby the blank 40 is held in place prior to a drawing action on the blank 40 between the upper and lower dies 18, 10. As a result, the pneumatic cylinder 32 is pressed down via the pressure ring 28, cushion pins 22, hydraulic cylinders 30 and cushion platen 26, whereby a reaction force corresponding to the pneumatic pressure Pa of the cylinder 32 acts on the pressure ring 28 as the blank-holding force or cushioning force, as well known in the art.

In the present embodiment, the pneumatic cylinder 32, air tank 34, air pressure source 36 and pressure regulator 38 constitute force generating means 42 for generating the blank-holding force to be applied to the pressure ring 28 through the platen 26, hydraulic cylinders 30 and cushion pins 22. This force generating means 42 cooperates with the hydraulic cylinders 30, cushion platen 26 and cushion pins 22 to provide a mechanical portion of a cushioning apparatus 44 for applying the blank-holding force to the pressure ring 28.

The fluid chambers of the hydraulic cylinders 30 communicate with each other by a manifold 46, which is connected to a hydraulic control circuit 54 through a flexible tube 48, a fluid passage 50 and a solenoid-operated shut-off valve 52. The shut-off valve 52 is controlled by a controller 56, so as to be selectively placed in an open position for connecting the fluid passage 50 and the hydraulic control circuit 54, and a closed position for disconnecting the fluid passage 50 from the control circuit 54. To the hydraulic control circuit 54, there is connected a pneumatically operated hydraulic pump 58, which operates to pressurize a working fluid from an reservoir 60. The pressurized fluid from the pump 58 is supplied to the hydraulic control circuit 54, which incorporates a pressure relief valve controlled by the controller 56 for regulating the pressure of the fluid to be delivered to the hydraulic cylinders 30, so that an initial hydraulic pressure P in the hydraulic cylinders 30 prior to a pressing operation or cycle on the press coincides with a predetermined optimum value Po. To this end, a hydraulic pressure sensor 62 for detecting the hydraulic pressure in the manifold 46 is connected to the controller 56, so that the controller 56 controls the hydraulic control circuit 54, on the basis of an output signal of the pressure sensor 62 representative of the pressure in the hydraulic cylinders 30.

The controller 56 employs a microcomputer incorporating a central processing unit, a random-access memory and a read-only memory. The microcomputer executes various control programs for controlling the shut-off valve 52 and the hydraulic control circuit 54 as described above, and a flow control valve 68 which will be described. The optimum initial hydraulic pressure Po is determined according to a suitable formula or equation or by a test pressing operation, so that the pistons of the hydraulic cylinders 30 are positioned between their upper and lower stroke ends under pressures received from the cushion pins 22 during a pressing operation on the blank 40, irrespective of length variations of the cushion pins 22 and inclination of the cushion platen 26. In other words, the determined optimum initial hydraulic pressure Po should enable the pistons of the hydraulic cylinders 30 to be maintained in their neutral positions, while the blank 40 is held by the pressure ring 28 during a pressing operation on the blank 40. The solenoid-operated shut-off valve 52 is held in the open position until a pressing operation on the blank 40 is started, and is switched to the closed position upon starting of the pressing operation.

To assure excellent quality of the product, it is required to maintain the pistons of all the hydraulic cylinders 30 in their neutral positions during a pressing action on the blank 40, so that the blank-holding force acts substantially uniformly the pressure ring 28 over its entire surface area through the individual hydraulic cylinders 30, even in the presence of some length variations of the cushion pins 22 and some angle of inclination of the cushion platen 26 with respect to the horizontal plane.

To the fluid passage 50, there is connected a drain or discharge line 66 through which the pressurized fluid may be partially discharged into the reservoir 60. The discharge line 66 is provided with a variable flow control valve 68 whose cross sectional area for fluid flow is continuously variable to adjust the rate of flow of the fluid into the reservoir 60. The flow control valve 68 is controlled by a signal from the controller 56, so as to be selectively placed in a closed position for inhibiting the fluid flow therethrough, and an open position for allowing the fluid flow therethrough at the controlled flow rate. The valve 68 is normally placed in the closed position.

The controller 56 receives output signals of position sensors 70 (e.g., limit switches) provided to detect respective vertical positions of the press slide 20 in its downward movement for the pressing action. When the pressing action on the blank 40 between the upper and lower dies 18, 10 is started with the blank 40 held at its outer portion by and between the upper die 18 and the pressure ring 28, the controller 56 commands the flow control valve 68 to be switched from the closed position to the open position. As the press slide 20 is further lowered, the controller 56 receiving the output signals from the position sensors 70 changes the flow rate of the flow control valve 68 according to a predetermined pattern, depending upon the vertical position of the slide 20 as detected by the position sensors 70.

If the pressing operation on the blank 40 is effected with the flow control valve 68 held in the closed position, the holding force applied to the blank 40 is held substantially constant (precisely, slightly raised with a volumetric decrease of the air chamber of the pneumatic cylinder 32) at a level corresponding to the pneumatic pressure Pa of the pneumatic cylinder 32, and the blank-holding force is substantially evenly distributed on the pressure ring 28 through the hydraulic cylinders 30 and cushion pins 22. If the fluid is partially discharged from the hydraulic cylinders 30 during the pressing action in which the cushion platen 26, hydraulic cylinders 30 and cushion pins 22 are lowered as a unit, the pressure in the hydraulic cylinders 30 is temporarily lowered due to the inertia of those components, whereby the blank-holding force is accordingly decreased. The amount of decrease of the blank-holding force varies with the rate of discharge of the fluid from the hydraulic cylinders 30. When the fluid discharge from the cylinders 30 is stopped during the pressing action (during the effective drawing stroke of the slide 20), the blank-holding force will rise back to the original level corresponding to the pneumatic pressure Pa.

Figure 5:
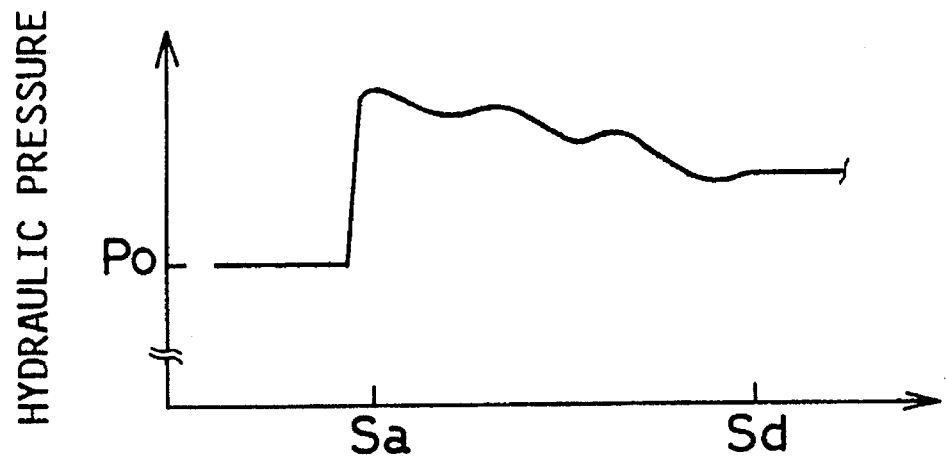
FIG. 5 is a graph indicating an example of a change in a pressure of a fluid in balancing hydraulic cylinders used in the apparatus of FIG. 1, which change is effected by discharging the fluid from the cylinders.
Figure 6:
FIG. 6 is a graph similar to that of FIG. 5, indicating an example of a change in the fluid pressure in the hydraulic cylinders used in the embodiment of FIG. 2.
Figure 7:
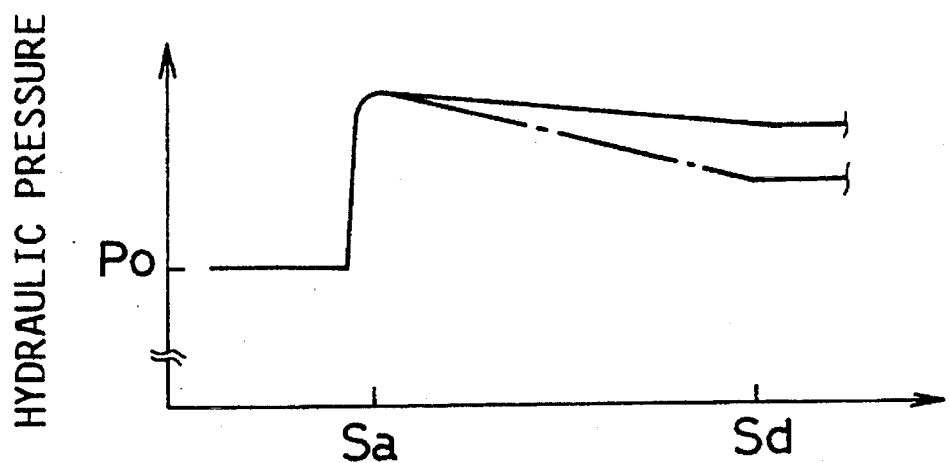
FIG. 7 is a graph similar to that of FIG. 5, indicating an example of a change in the fluid pressure in the hydraulic cylinders used in the embodiment of FIG. 3.
Figure 8:
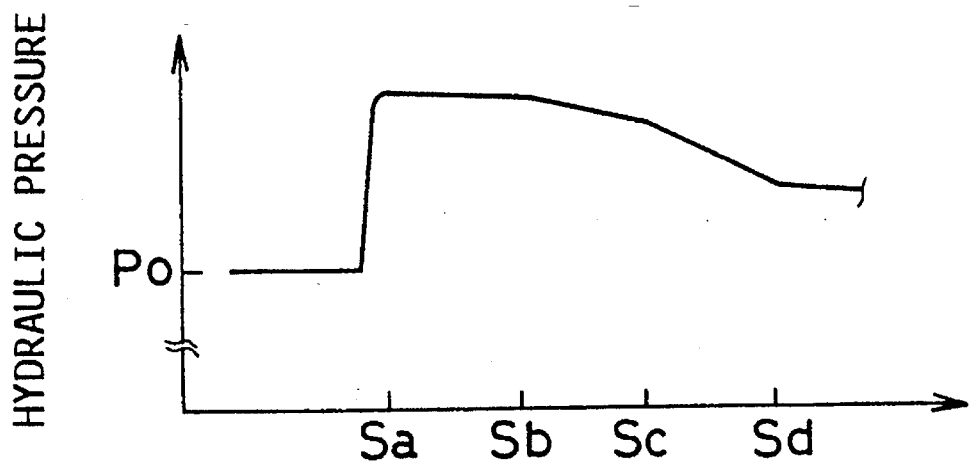
FIG. 8 is a graph similar to that of FIG. 5, indicating an example of a change in the fluid pressure in the hydraulic cylinders used in the embodiment of FIG. 4.

Therefore, the blank-holding force can be controlled or changed as needed, by opening the flow control valve 68 in the discharge line 66 to start discharging the fluid from the hydraulic cylinders 30 upon commencement of the actual pressing action on the blank 40, and adjusting the flow rate of the flow control valve 68 during the pressing action. If, for example, the pressure in the hydraulic cylinders 30 is progressively lowered as indicated in the graph of FIG. 5 during a period between a point of time Sa at which the pressing action is started and a point of time Sd at which the slide 20 reaches its lower stroke end, the blank-holding force is progressively reduced with the lowering of the hydraulic pressure in the cylinders 30. The hydraulic pressure may be lowered as indicated in the graphs of FIGS. 6–8. The pattern of changing the flow rate of the flow control valve 68 is predetermined by experiments, for example, so as to establish a desired pattern of lowering the pressure in the hydraulic cylinders 30 and reducing the blank holding pressure, in relation to the vertical positions of the press slide 20 as detected by the position sensors 70. It is noted that the actual pressure in the hydraulic cylinders 30 may be used to re-adjust or feedback-control the flow rate of the flow control valve 68 for intricate control of the blank-holding force exactly following the desired pattern. The necessity of the adjustment of the blank-holding force during a pressing action on the blank 40 depends upon the specific pressing operation or condition on the press. If this adjustment involving a discharge flow of the fluid from the hydraulic cylinders 30 is effected, the initial hydraulic pressure P should be adjusted to the original optimum level Po. In the present embodiment, the flow control valve 68 serves as flow regulating means for controlling a discharge flow of the fluid from the hydraulic cylinders 30, and the controller 56 serves as means for controlling the flow regulating means.

It will be understood that the pump 58 and the hydraulic control circuit 54 serve as a pressure source for supplying a pressurized fluid to the hydraulic cylinders 30, while the controller 56, discharge passage 66, shut-off valve 76 and flow control valve 78 constitute a control portion of the cushioning apparatus 44.

The cushioning apparatus 44 according to the present embodiment constructed as described above is capable of controlling or changing the blank-holding force by discharging the fluid from the hydraulic cylinders 30 while a pressing action is performed on the blank 40. The discharge flow of the fluid from the hydraulic cylinders 30 may be controlled so as to damp the vibration or oscillation of the blank-holding force upon collision of the upper die 18 with the pressure ring 28, whereby an excessive amount of initial movement of the blank 40 relative to the pressure ring 28 and upper die 18 upon such collision is effectively avoided, with a result of improving the surface quality of the article produced from the blank. Further, the reduction of the blank-holding force during the pressing action is effective to prevent rupturing of the blank being drawn, and permits the use of a less expensive low-grade material for the blank while assuring a desired quality of the product manufactured from the blank. Thus, the cushioning apparatus not only assures even distribution of the blank-holding force on the pressure ring 28, but also provides various other advantages for enhanced results of the pressing operation on the press.

As is apparent from the above description, the present cushioning apparatus 44 is adapted to adjust the blank-holding force during a pressing action by partially discharging the pressurized fluid from the balancing hydraulic cylinders 30 whose primary function is to establish even distribution of the blank-holding force. Accordingly, the apparatus 44 does not require a cushioning hydraulic cylinder conventionally used in combination with a cushioning pneumatic cylinder to provide force generating means corresponding to the means 42 of the present embodiment. The conventionally used cushioning hydraulic cylinder is connected to a pressure relief valve to control the blank-holding force. In the absence of such cushioning hydraulic cylinder and the pressure relief valve connected to that cushioning hydraulic cylinder, the present cushioning apparatus 44 is comparatively simple and available at a reduced cost. Further, the cushioning apparatus 44 may be easily provided on an existing press, by simply connecting the discharge line 66 to the fluid chambers of the balancing hydraulic cylinders 30, and providing the flow control valve 68 in the discharge line 66 so that the flow rate of the flow control valve 68 is controlled by the controller 56 in relation to the vertical position of the press slide 20. Thus, the apparatus 44 is available on the existing press without considerable modifications of the press.

Referring to FIGS. 2, 3, 4 and 9, some modifications of the embodiment of FIG. 1 will be described. In these modified embodiments, the same reference numerals as used in FIG. 1 will be used to identify the functionally corresponding components.

Figure 2:
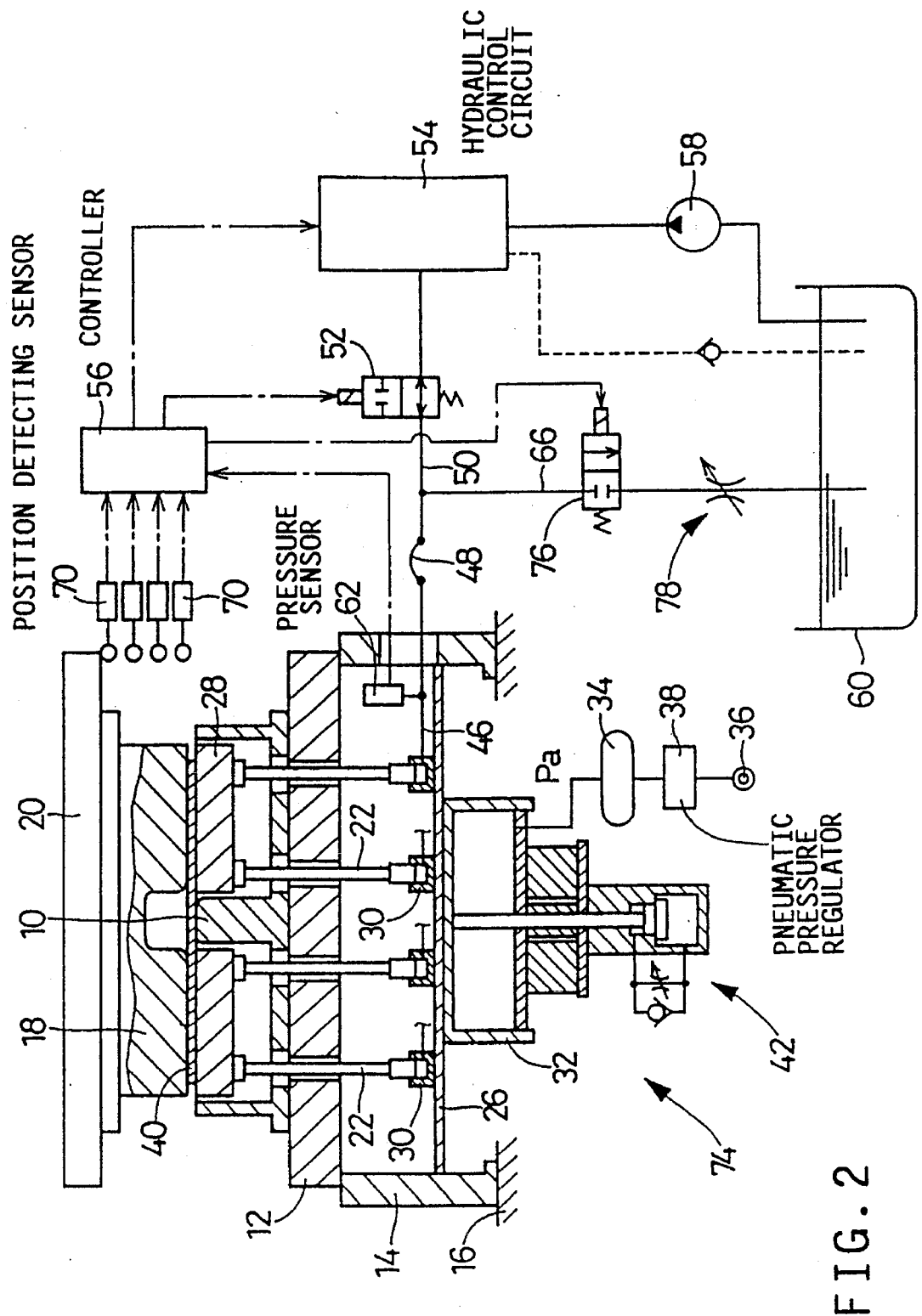
FIG. 2 is a view similar to that of FIG. 1, showing a cushioning apparatus according to another embodiment of the invention.

In a cushioning apparatus 74 according to the embodiment of FIG. 2, a solenoid-operated shut-off valve 76 and a manually controlled flow control valve 78 are connected in series in the discharge line 66. The flow rate of the flow control valve 78 is manually adjusted to a desired value. Like the shut-off valve 52, the shut-off valve 76 is selectively placed in the open and closed positions under the control of the controller 56. For instance, the shut-off valve 76 is opened at a predetermined point Sb in the effective drawing stroke of the slide 20, as indicated in FIG. 6, to permit the fluid to be discharged from the hydraulic cylinders 30 through the shut-off valve 76 and flow control valve 78, at a flow rate determined by the flow control valve 78, whereby the hydraulic pressure in the cylinders 30 is changed in a pattern as indicated in FIG. 6, and the blank-holding force is accordingly changed. While the graph of FIG. 6 shows a rise of the pressure during a period between the points Sa and Sb in the drawing stroke, this rise is due to the volumetric reduction of the cushioning pneumatic cylinder 32. The point Sa is a moment at which the pressing action on the blank is commenced as described above with respect to the graph of FIG. 5. The flow rate of the flow control valve 78 and the moment (Sb) at which the shut-off valve 76 is opened are determined as needed depending upon the specific pressing operation on the press. In the present embodiment of FIG. 2, the solenoid-operated shut-off valve 76 and the manually controlled flow control valve 78 serve as the flow regulating means.

Figure 3:
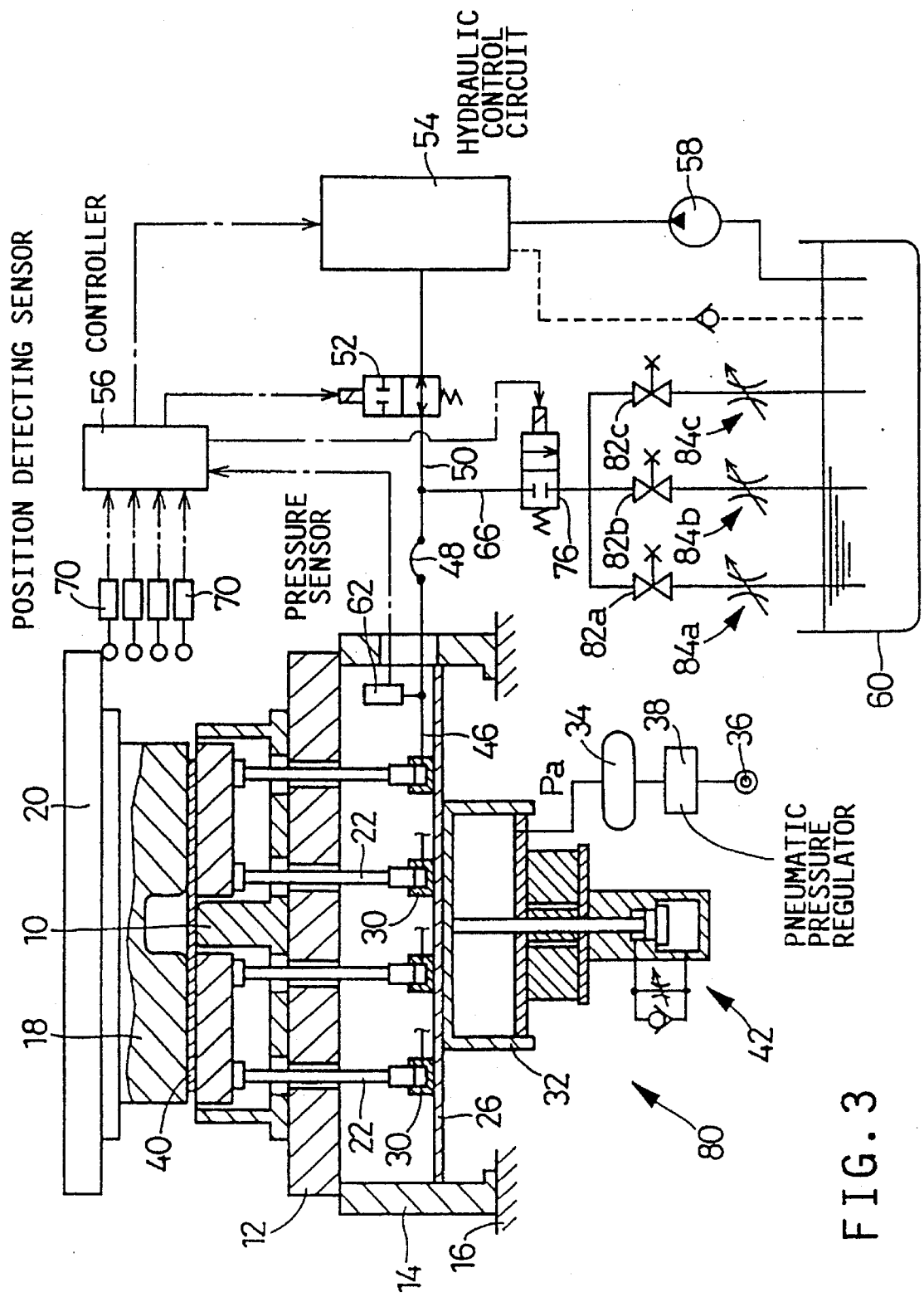
FIG. 3 is a view similar to that of FIG. 1, showing a further embodiment of the invention.

In a die cushioning apparatus 80 of the embodiment of FIG. 3, three manually operated shut-off valves 82a, 82b, 82c and three manually controlled flow control valves 84a, 84b, 84c are provided downstream of the solenoid-operated shut-off valve 76, in place of the manually controlled flow control valve 78 used in the embodiment of FIG. 2. The three shut-off valves 82a, 82b, 82c are connected in parallel with each other, and the three flow control valves 84a, 84b, 84c are connected to the respective shut-off valves 82a, 82b, 82c. The flow rates of the flow control valves 84a, 84b, 84c are manually adjusted to predetermined different values, and the shut-off valves 82a, 82b, 82c are manually opened and closed by the operator of the press, depending upon the specific pressing operation on the press. Therefore, the overall rate of discharge flow of the fluid from the hydraulic cylinders 30 can be changed in steps by changing the combination of the opened and closed shut-off valves 82a, 82b, 82c. Accordingly, the rate of decrease in the blank-holding force can be changed in steps. Solid and one-dot chain lines in the graph of FIG. 7 illustrate two examples of the hydraulic pressure reduction pattern, in which the solenoid-operated shut-off valve 76 is opened at the point of time Sa, with the respective different combinations of the opened and closed shut-off valves 82a, 82b, 82c. In the present embodiment, the solenoid-operated shut-off valve 76, manually operated shut-off valves 82a, 82b, 82c and manually controlled flow control valves 84a, 84b, 84c constitute the flow regulating means.

Figure 4:
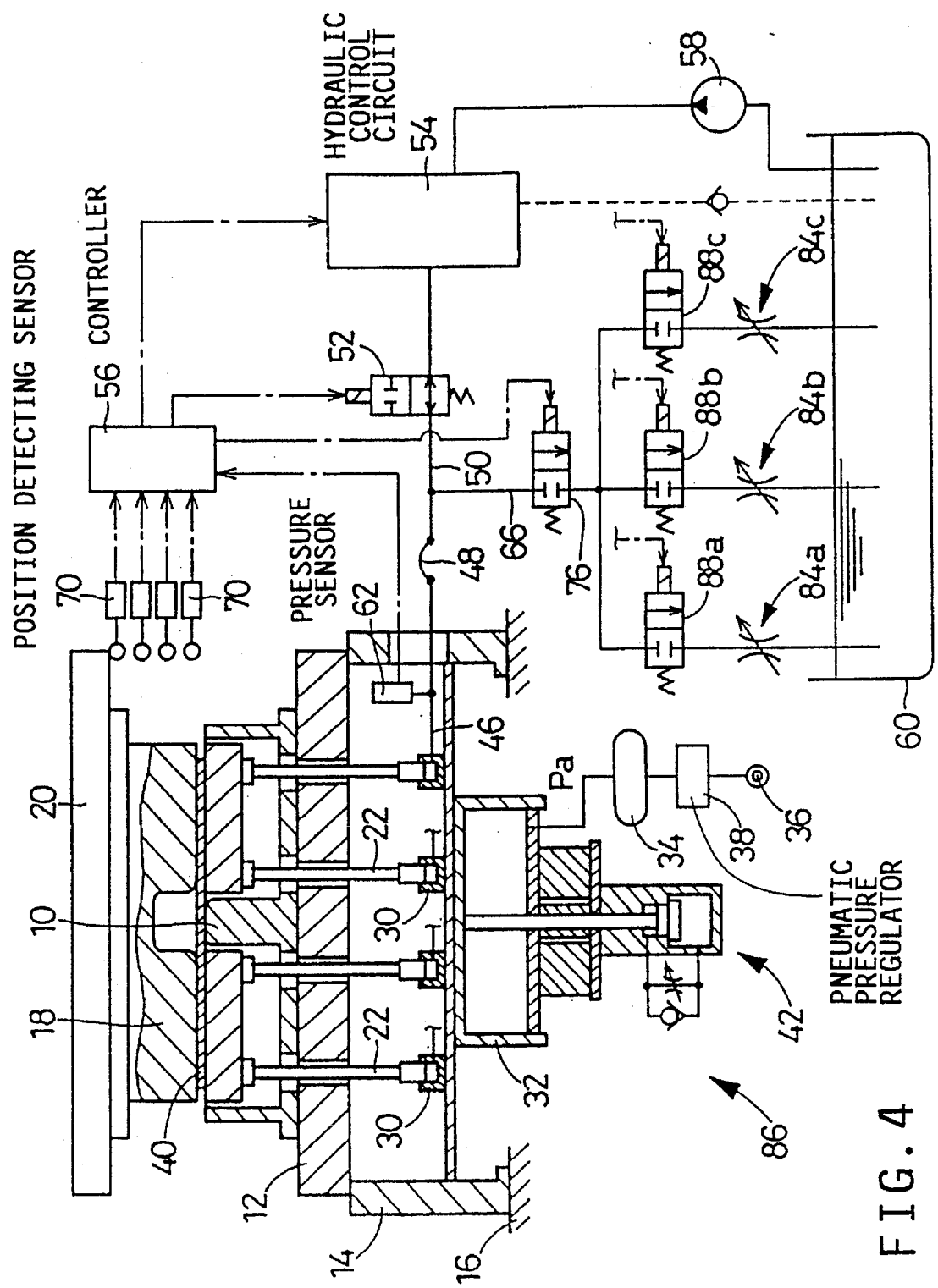
FIG. 4 is a view similar to that of FIG. 1, showing a yet further embodiment of the invention.

In a cushioning apparatus 86 of the embodiment of FIG. 4, solenoid-operated shut-off valves 88a, 88b, 88c opened and closed by the controller 56 are used in place of the manually operated shut-off valves 82a, 82b, 82c used in the embodiment of FIG. 3. As in the embodiment of FIG. 3, the rate of decrease in the blank-holding force can be changed in steps depending upon the selected combination of the opened and closed shut-off valves 88a, 88b, 88c. Further, the rate of decrease in the blank-holding force can be changed even in the process of a pressing action on the blank 40, as indicated in FIG. 8, since the shut-off valves 88a, 88b, 88c can be automatically opened and closed by the controller 56 during the pressing action. In the present embodiment of FIG. 4, the solenoid-operated shut-off valves 76, 88a, 88b, 88c and the manually controlled flow control valves 84a, 84b, 84c constitute the flow regulating means.

Figure 9:
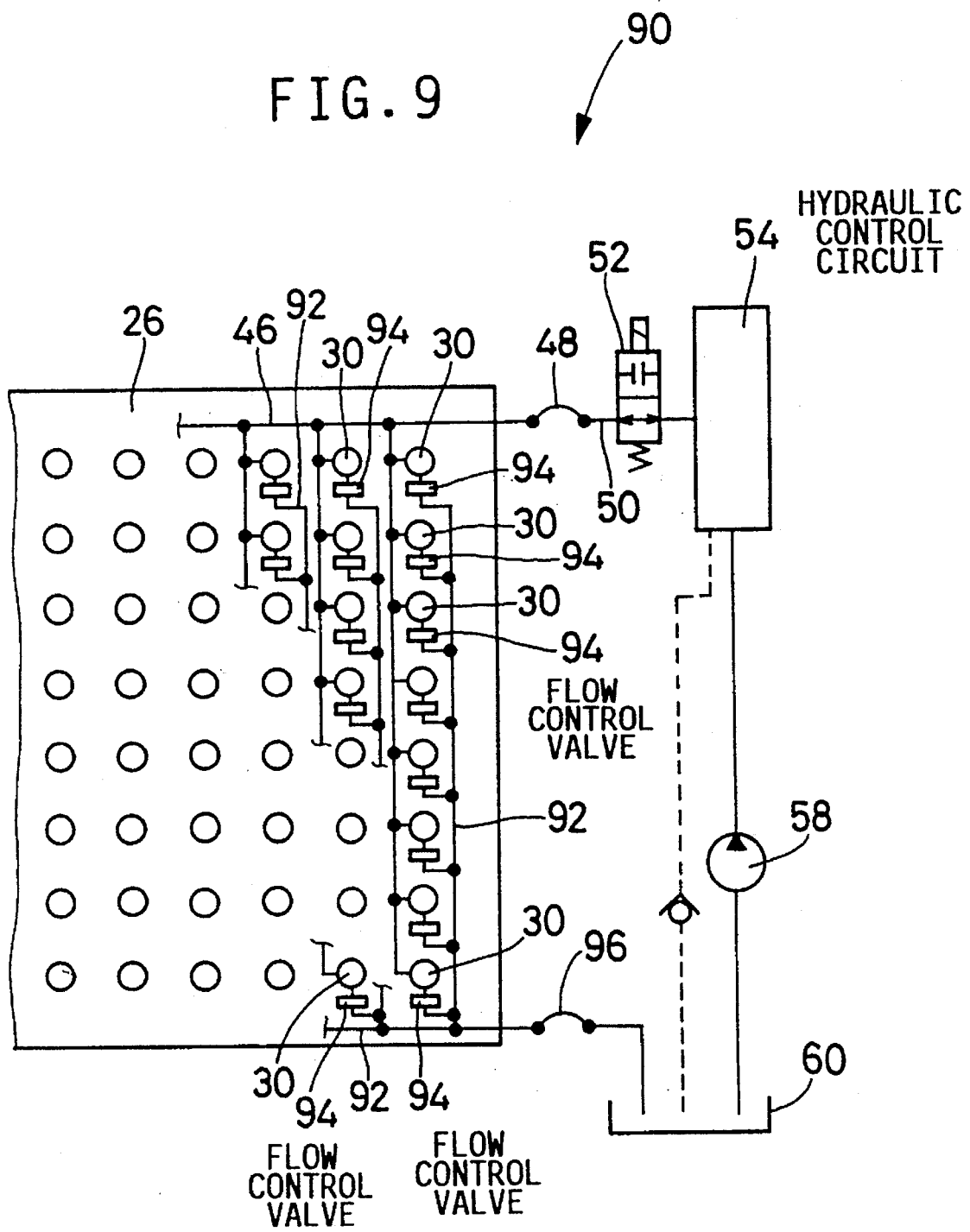
FIG. 9 is a schematic view illustrating a still further embodiment of this invention.

Referring to FIG. 9 wherein the hydraulic cylinders 30 are indicated as seen in a plane parallel to the cushion platen 26, a cushioning apparatus 90 uses discharge lines 92 which are connected to the fluid chambers of the hydraulic cylinders 30, but are not directly connected to the manifold 46 which is connected to the hydraulic control circuit 54. The discharge lines 92 are provided with flow control valves 94 disposed near the respective hydraulic cylinders 30, so that the fluid may be discharged from the hydraulic cylinders 30 through the flow control valves 94 and the discharge lines 92. The discharge lines 92 are connected to the oil reservoir 60 through a flexible tube 96. Like the flow control valves 68, the flow control valves 94 are comparatively compact variable flow control valves, which are controlled by a common control signal received from the controller 56, so as to be selectively placed in a closed position for inhibiting a discharge flow of the fluid from the hydraulic cylinders 30, and an open position for permitting the discharge flow of the fluid at a controlled flow rate, as in the first embodiment of FIG. 1. Since the rate of discharge flow of the fluid from each hydraulic cylinder 30 is controlled by the corresponding flow control valve 94 provided in the exclusive discharge lines 92, the present apparatus 90 permits uniform reduction of the pressure values in the individual hydraulic cylinders 30, with less variation in the pattern of the pressure reduction, as compared with the apparatus 44 in which the single flow control valve 68 is provided in the discharge line 66 connected to the fluid supply passage 50. Thus, the present apparatus 90 assures more accurate control of the blank-holding force during a pressing action while maintaining uniform distribution of the blank-holding force on the pressure ring 28. Further, the present apparatus 90 allows relatively rapid discharge of the fluid from the cylinders 30, which results in an increased range of control of the hydraulic pressure, and an accordingly increased range of control of the blank-holding force.

The cushioning apparatus 90 may be modified so that the individual flow control valves 94 are controlled independently of each other by the controller 56, in terms of their flow rates and/or the point of time at which the valves 94 are opened.

There will be described further embodiments of the present invention, by reference to FIGS. 10 and 11 in which the same reference numerals as used in FIG. 1 will be used to identify the functionally corresponding components.

Figure 10:
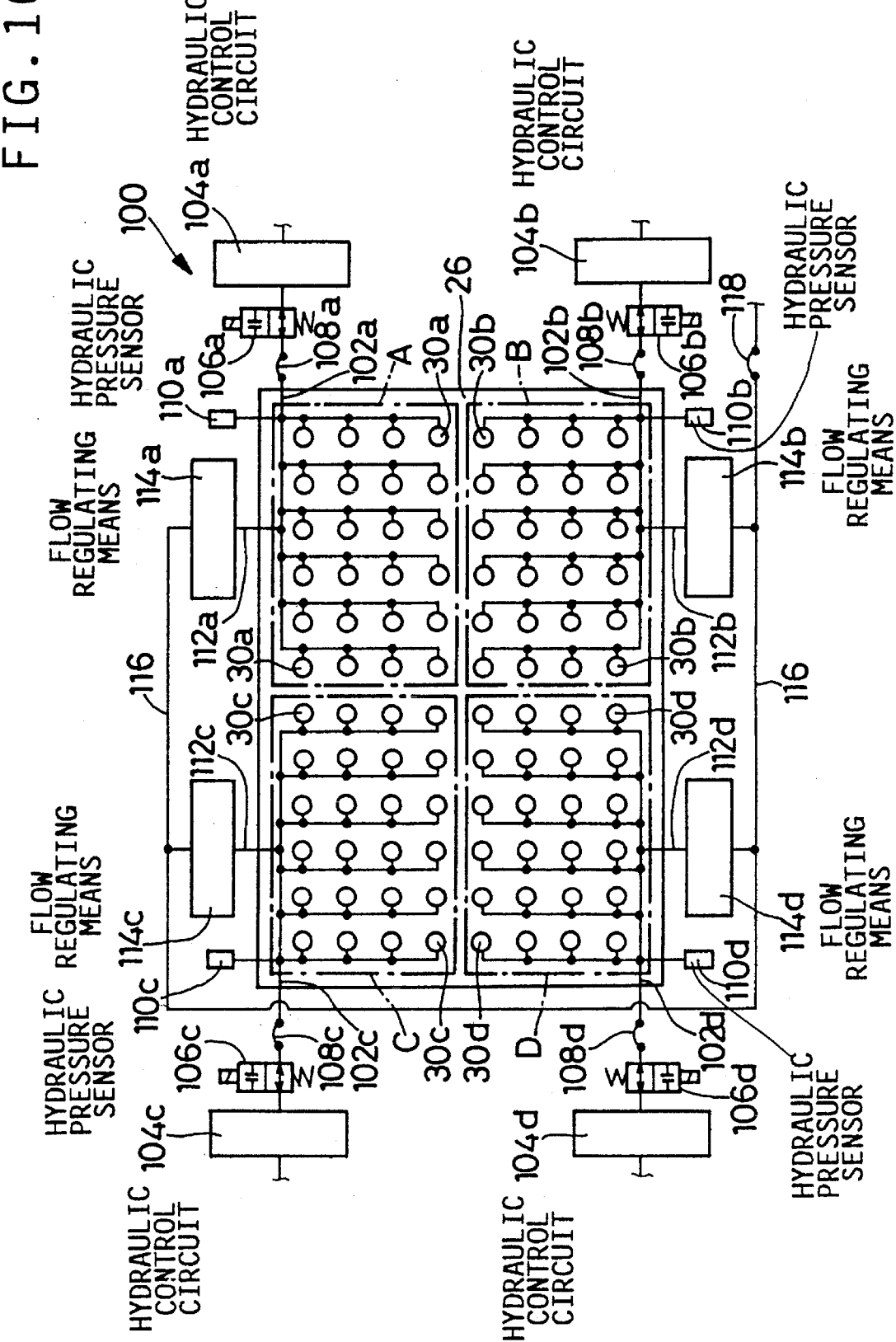
FIG. 10 is a schematic view showing a cushioning apparatus constructed according to another embodiment of the invention.

Referring to FIG. 10 wherein the hydraulic cylinders 30 are indicated as seen in a plane parallel to the cushion platen 26, a cushioning apparatus 100 has the balancing hydraulic cylinders 30 disposed on the cushion platen 26, and the cushion pins 22 associated with the pistons of the hydraulic cylinders 30, as in the embodiment of FIG. 1. In the present cushioning apparatus 100, the cushion platen 26 has four rectangular sections indicated at A, B, C and D in FIG. 10, and the hydraulic cylinders 30 are classified into corresponding four groups. That is, four groups of hydraulic cylinders 30a, 30b, 30c and 30d are disposed in the respective rear-right, front-right, rear-left and front-left sections A, B, C and D (upper-right, lower-right, upper-left and lower-left sections A, B, C and D as seen in FIG. 10) of the cushion platen 26. As is apparent from the following description, this arrangement is capable of adjusting the local blank-holding force values acting on different portions of the pressure ring 28, depending upon the specific configuration and specifications of the blank 40 and varying degrees of wear of the die set which includes the upper die 18, lower die 10 and pressure ring 28.

The four groups of hydraulic cylinders 30a–30d are connected to respective four supply lines 102a–102d, which are independent of each other. The supply lines 102a–102d are connected to respective hydraulic control circuits 104a–104d through respective flexible tubes 108a–108d and respective solenoid-operated shut-off valves 106a–106d. The solenoid-operated shut-off valves 106a–106d are controlled by control signals received from the controller 56 (as used in the preceding embodiments), independently of each other, so that the cylinders 30a–30d of the four groups have respective optimum initial hydraulic pressure values Poa–Pod prior to a pressing operation on the blank 40.

To the four supply lines 102a–102d, there are connected respective four hydraulic pressure sensors 110a–110d for detecting the hydraulic pressure in the supply lines 102a–102d, and respective four discharge lines 112a–112d for partially discharging the fluid from the respective four groups of hydraulic cylinders 30a–30d. To the four discharge lines 112a–112d, there are connected respective four flow regulating means 114a–114d, each of which may consist of the flow control valve 68 used in the embodiment of FIG. 1, for example. The flow regulating means 114a–114d are connected to the reservoir 60 through a drain passage 116 and a flexible tube 118. Each of the flow regulating means 114 has a closed position for inhibiting the fluid flow therethrough, and an open position for permitting the fluid flow therethrough. The four flow regulating means 114a–114d are controlled by control signals received from the controller 56, independently of each other, so as to be selectively placed in the closed and open positions. The flow rates of the flow regulating means 114a–114d when placed in the open position may be controlled by the controller independently of each other, when needed. According to the present arrangement, the pressure values in the hydraulic cylinders 30a–30d of the four groups can be lowered during a pressing action, independently of each other, depending upon the rates of discharge flows of the fluid through the respective flow regulating means 114a–114d. The controller 56 stores data indicative of the optimum initial hydraulic pressure values Poa–Pod indicated above, data indicative of the points of time at which the flow regulating means 114a–114d are opened, and if necessary data indicative of the flow rates of the individual flow regulating means 114a–114d.

In the cushioning apparatus 100, the pressurizing fluid is supplied to the four groups of hydraulic cylinders 30a–30d disposed in the respective four sections A–D of the cushion platen 26, through the respective supply lines 102a–102d, and the initial pressure values in the hydraulic cylinders 30a–30d of the four groups are adjusted to the respective optimum values Poa–Pod by the respective hydraulic control circuits 104a–104d. Further, the fluid can be discharged from each of the four groups of hydraulic cylinders 30a–30d, through the corresponding discharge line 112a, 112b, 112c, 112d, at a given flow rate determined on the corresponding flow regulating means 112a, 112b, 112c, 112d. This arrangement permits intricate adjustment of the local blank-holding force values acting on the local portions of the pressure ring 28, which correspond to the four groups of hydraulic cylinders 30a–30d disposed in the respective four sections A, B, C and D of the cushion platen 26.

Figure 11:
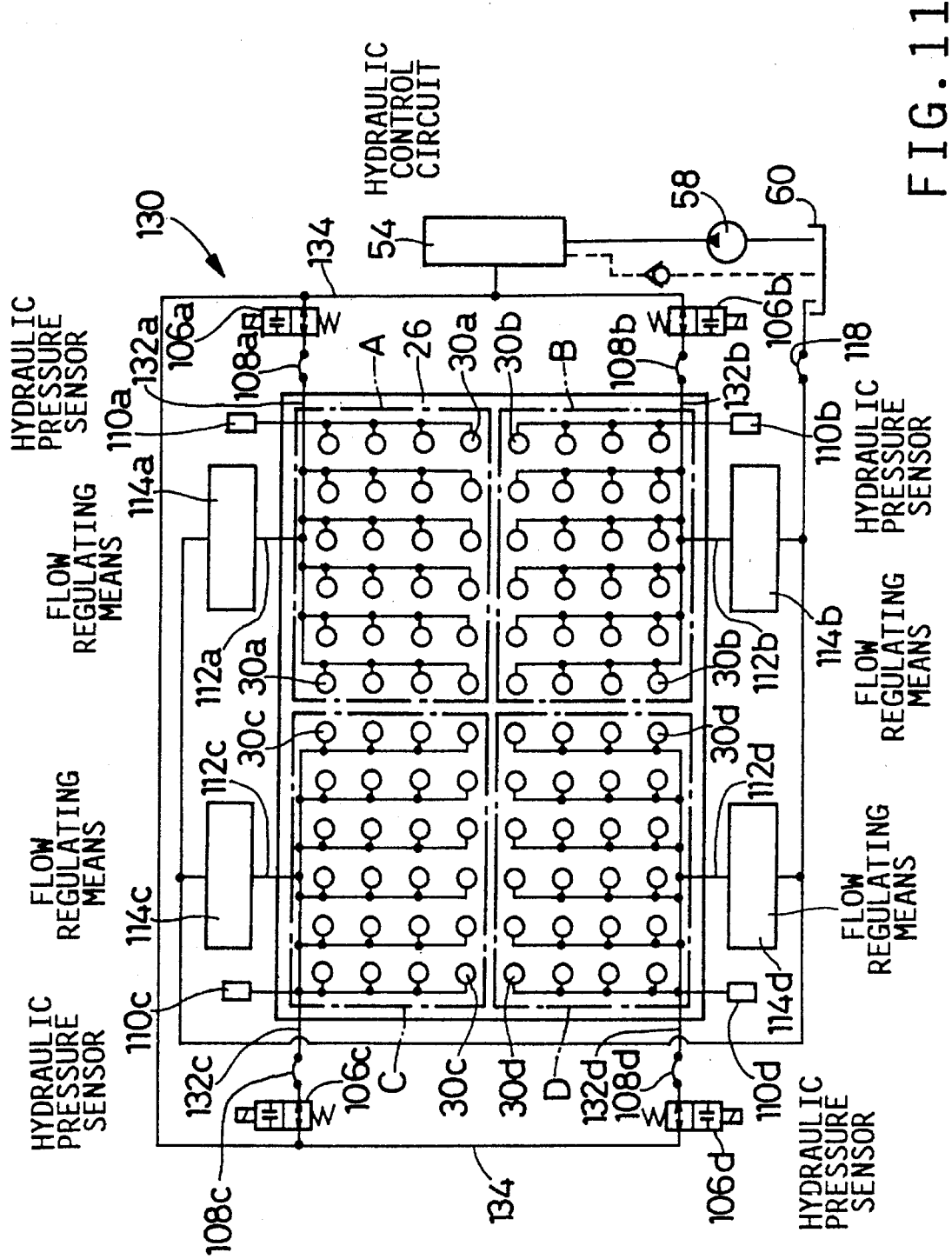
FIG. 11 is a schematic view showing a cushioning apparatus according to a further seventh embodiment of the invention.
Figure 12:
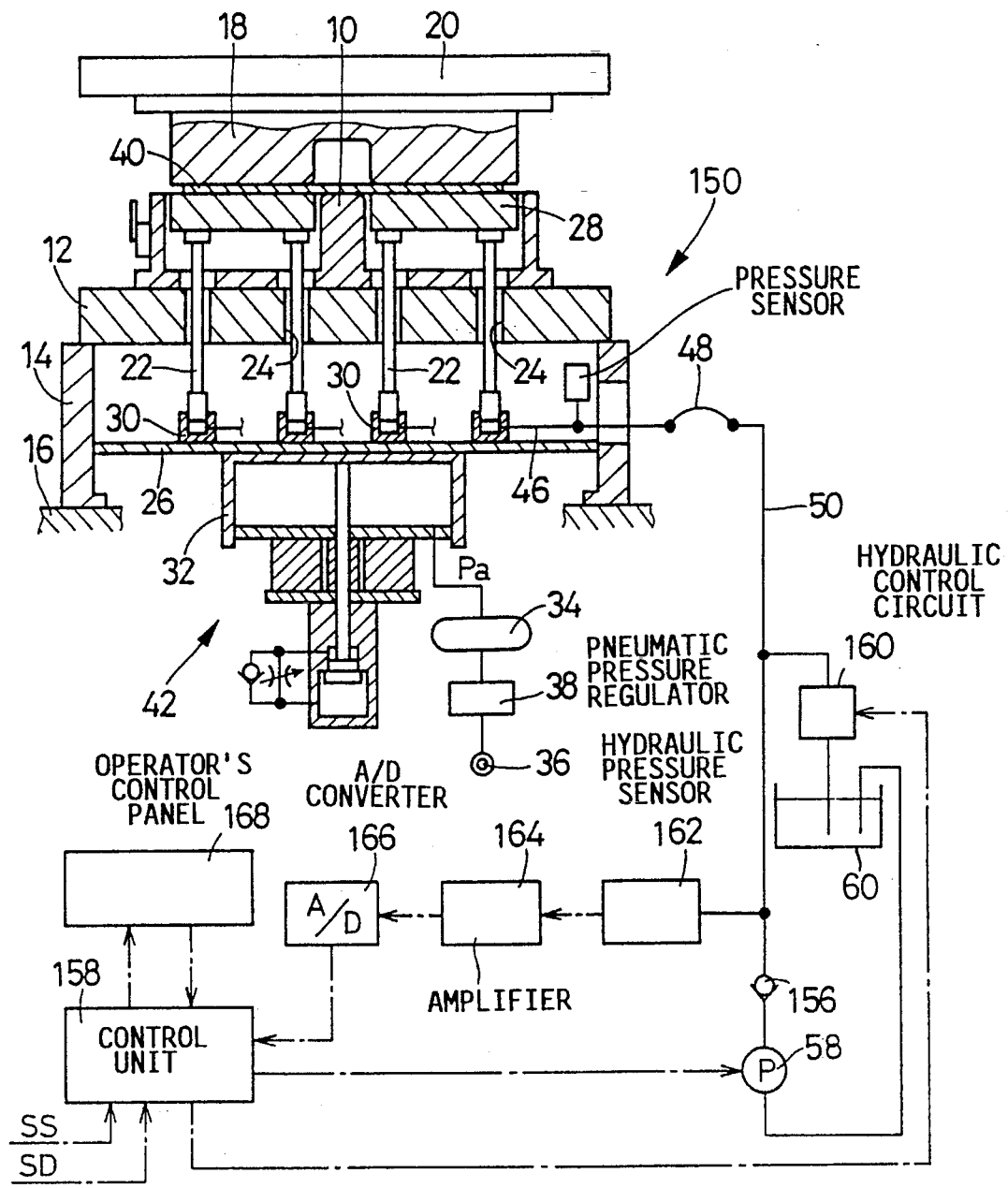
FIG. 12 is a schematic view showing a press equipped with a cushioning apparatus whose operating conditions are optimized by a device constructed according to another embodiment of the present invention.

In a cushioning apparatus 130 shown in FIG. 11, the single hydraulic control circuit 54 is used in place of the four hydraulic control circuits 104a–104d of FIG. 10 which correspond to the four sections A, B, C and D of the cushion platen 26. More particularly, four mutually independent supply lines 132a–132d connected to the four groups of hydraulic cylinders 30a–30d are connected to the single hydraulic control circuit 54, through the respective flexible tubes 108a–108d and solenoid-operated shut-off valves 106a–106d, and through a common fluid passage 134. The pressure values in the four groups of hydraulic cylinders 30a–30d and the four supply lines 132a–132d are controlled by the respective shut-off valves 106a–106d and the single hydraulic control circuit 54. The four supply lines 132a–132d are connected to the respective discharge lines 112a–112d and flow regulating means 114a–114d, so that the discharge flows of the fluid from the cylinders 30a–30d of the four groups are controlled by the flow regulating means 114a–114d independently of each other.

The cushioning apparatus 130 of FIG. 11 has the same function and advantage as the cushioning apparatus 100 of FIG. 10.

Referring next to FIGS. 12–19, there will be described a still further embodiment of this invention, wherein the same reference numerals as used in FIG. 1 will be used to identify the functionally corresponding elements.

In a cushioning apparatus 150 according to the present embodiment, the fluid passage 50 is connected through a check valve 156 to the pump 58, which is controlled by a control unit 158. The fluid passage 50 is also connected to a hydraulic control circuit 160 having a pressure relief valve controlled by the control unit 150 to regulate the pressure P of the fluid delivered from the pump 58. More specifically, the hydraulic control circuit 160 operates to control the initial hydraulic pressure in the hydraulic cylinders 30 to the predetermined optimum value Po prior to a pressing operation. To this end, the control unit 158 is adapted to receive an output signal of a hydraulic pressure sensor 162 through an amplifier 164 and an A/D converter 166. The output signal of the sensor 162 is indicative of the hydraulic pressure P in the fluid passage 50 and hydraulic cylinders 30.

Figure 13A:
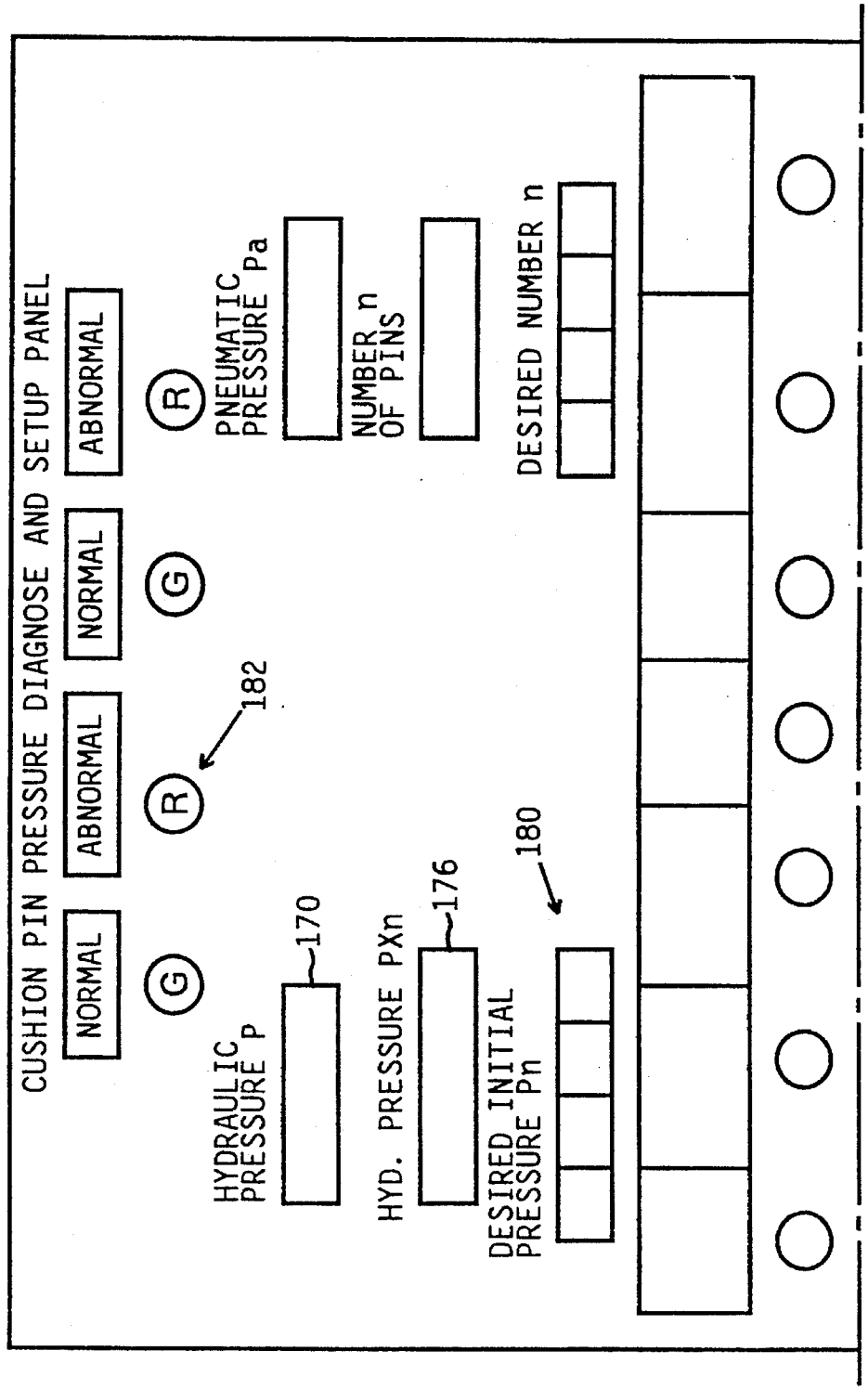

The control unit 158 consists principally of a microcomputer incorporating a central processing unit, a random-access memory and a read-only memory. The control unit 158 operates according to various control programs stored in the read-only memory, for controlling the pump 58 and the hydraulic control circuit 160, determining the optimum initial hydraulic pressure Po and an optimum in-process hydraulic pressure PXo, and monitoring an in-process hydraulic pressure PX, as explained below. The in-process hydraulic pressure PX is the pressure in the hydraulic cylinders 30 during a pressing action on the blank 40, and the optimum in-process hydraulic pressure PXo is the pressure PX which corresponds to the optimum initial hydraulic pressure Po prior to the pressing action. To the control unit 158, there is connected an operator's control panel 168 as illustrated in FIGS. 13A and 13B. The control unit 158 receives a TEST RUN signal SS generated when a TEST RUN pushbutton provided on the press is activated, and a signal SD generated when the press slide 20 has reached the lower stroke end or a point slightly above the lower stroke end. The operator's control panel 168 has various indicators and switches as shown in FIGS. 13A and 13B, such as an indicator 170 (FIG. 13A) for indicating the hydraulic pressure P in the hydraulic cylinders 30.

Figure 14A:
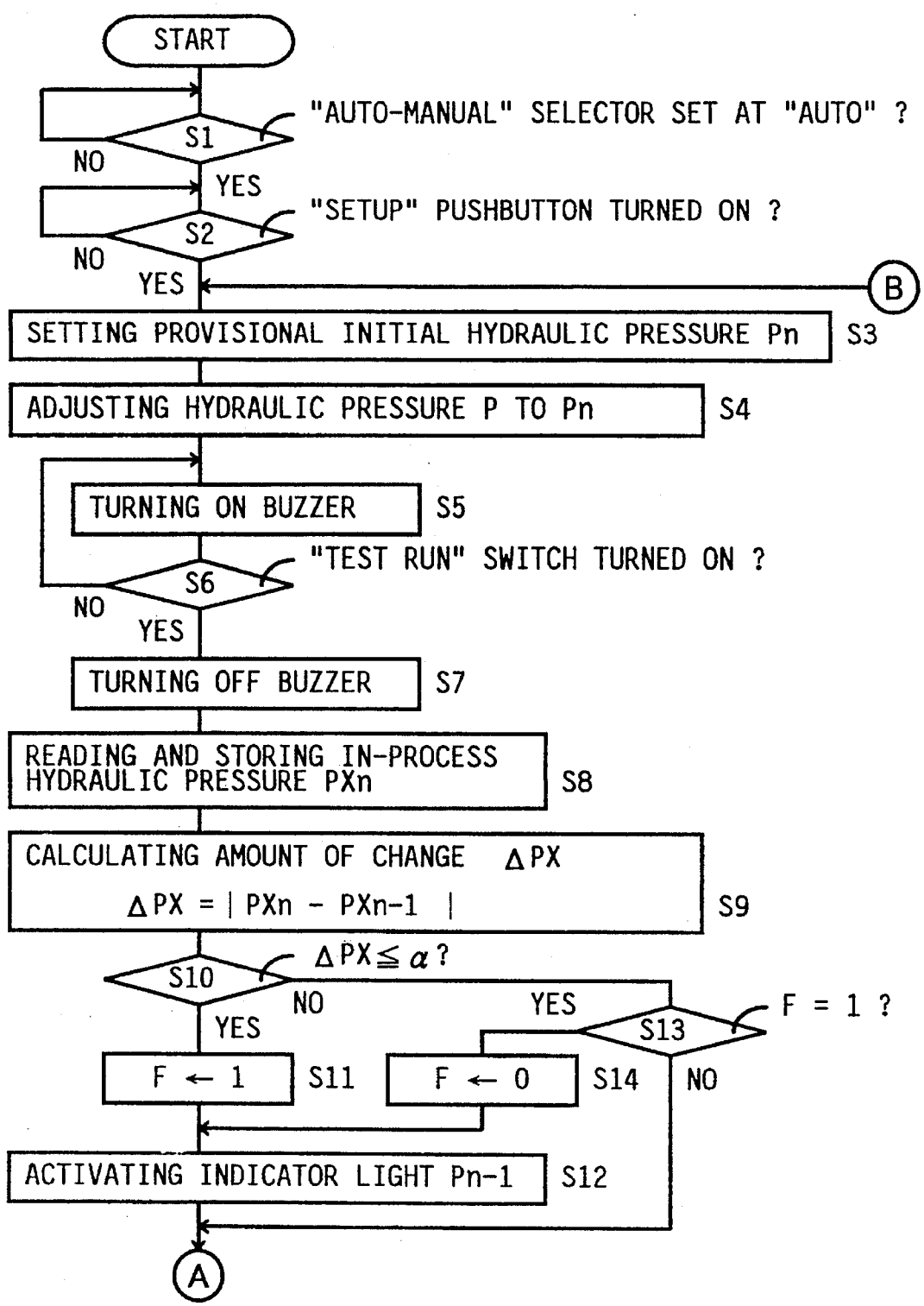
FIGS. 14A and 14B are flow charts illustrating a routine for determining and establishing optimum initial and in-process hydraulic pressure values Po and PXo of the cushioning apparatus.
Figure 14B:
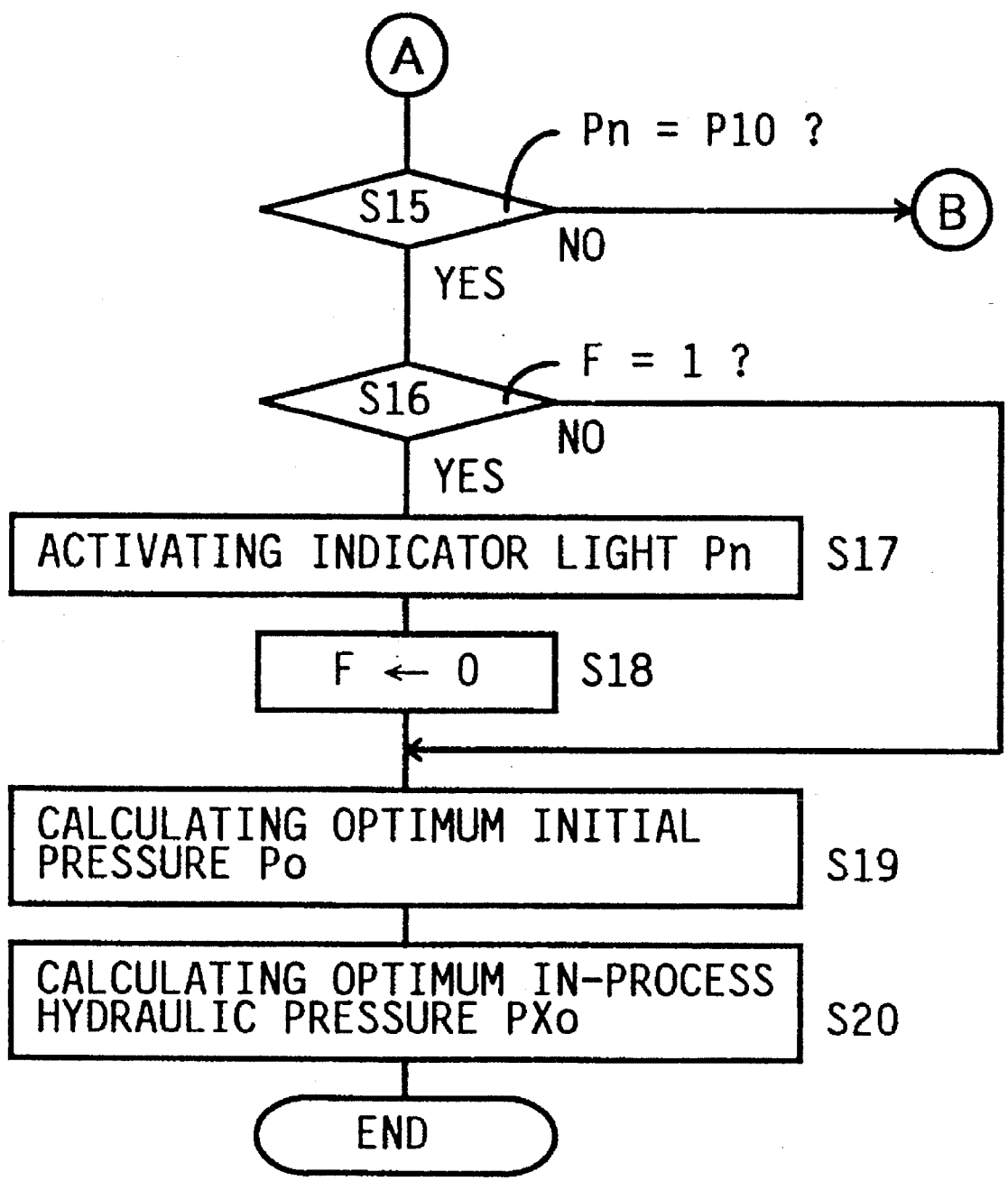

The optimum initial and in-process hydraulic pressure values Po and PXo are determined according to a routine as illustrated in the flow chart of FIGS. 14A and 14B. This routine is started with step S1 to determine whether an AUTO-MANUAL selector 172 (FIG. 13B) on the panel 168 is set in the AUTO position for automatic adjustment of the hydraulic pressure values Po and PXo. If the selector 172 is set in the AUTO position, step S2 is implemented to determine whether a SETUP pushbutton 174 on the panel 168 has been turned on. If the SETUP pushbutton 174 is turned on with the selector 172 placed in the AUTO position, the control flow goes to step S3 to set a provisional initial hydraulic pressure Pn (n=1 through 10). The control unit 158 stores data indicative of a total of ten provisional initial pressure values P1 through P10, where P1 and P10 represent 200 kgf/cm$^2$ and 20 kgf/cm$^2$, respectively. These provisional initial pressure values P1–P10 decrease in increments of 20 kgf/cm$^2$, and are selectively and sequentially set as the initial hydraulic pressure P, from the highest pressure P1 (200 kgf/cm$^2$) to the lowest pressure P10 (20 kgf/cm$^2$). It is noted that 1 kgf/cm$^2$ is approximately 9.8×10$^4$Pa (Pascal).

Step S3 is followed by step S4 in which the initial hydraulic pressure P prior to a pressing action on the blank 40 is adjusted to the currently selected provisional initial value Pn (set in step S3), for example, P10 (200 kgf/cm$^2$) in the first cycle of execution of the routine of FIGS. 14A and 14B. That is, the pump 58 and the hydraulic control circuit 160 are operated so that the pressure P is adjusted to a level substantially equal to the provisional initial value Pn, on the basis of the signal from the hydraulic pressure sensor 162. When the pressure P has become substantially equal to the value Pn, step S5 is implemented to activate an appropriate buzzer in such fashion that indicates that the pressure P has been adjusted to the currently set provisional value Pn.

Figure 15:
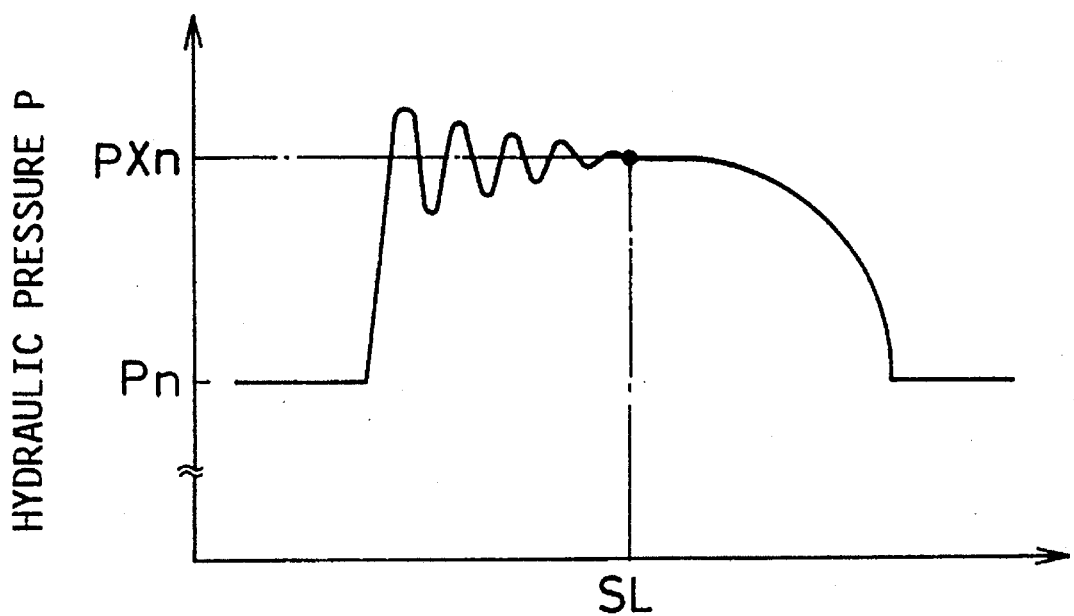
FIG. 15 is a graph explaining a point at which the detected in-process hydraulic pressure PXn is read in step S8 of the flow chart of FIG. 14A.

The control flow then goes to step S6 to determine whether the TEST RUN switch on the press has been turned on. When the operator recognizing the activation of the buzzer activates the TEST RUN switch, the TEST RUN signal SS is applied to the control unit 158, which in turn implements step S7 to stop the buzzer, and step S8 in which the press is operated to perform a test pressing operation with one reciprocation of the press slide 20, and a provisional in-process hydraulic pressure PXn in the hydraulic cylinders 30 during a pressing action on the blank 40 is read, stored in the random-access memory, and indicated on the indicator 176. The provisional in-process hydraulic pressure PXn corresponds to the provisional initial hydraulic pressure Pn. The hydraulic pressure P in the hydraulic cylinders 30 during a pressing cycle vibrates as indicated in FIG. 15. The pressure PXn to be read and stored in step S8 is the pressure P when the press slide 20 reaches the lower stroke end indicated at SL in FIG. 15 or a point near this lower stroke end SL, at which the vibration of the pressure P has settled. In other words, the pressure PXn to be stored in the control unit 158 is the pressure P as detected by the pressure sensor 162 when the signal SD is received by the control unit 158. However, the pressure PXn to be stored may be the maximum, minimum or average value of the pressure values P detected by the time the lower stroke end SL of the slide 20 is reached.

Step S8 is followed by step S9 to calculate an amount of change ΔPX=|PXn−PXn−1| of the currently obtained provisional in-process hydraulic pressure PXn with respect to the preceding value PXn−1. Step S9 is followed by step S10 to judge whether the amount of change ΔPX is equal to or smaller than a predetermined value α. The predetermined value α is for determining whether the provisional in-process pressure PXn during the pressing action is substantially constant in spite of a change in the provisional initial hydraulic pressure Pn prior to the pressing action. This value α is determined depending upon the expected fluctuation and detecting error of the pressure value PXn, and is usually set in the neighborhood of 5 kgf/cm$^2$. If an affirmative decision (YES) is obtained in step S10, step S11 is implemented to set a flag F to "1", and step S12 is implemented to activate one of ten indicator lights 178 (FIG. 13B) on the operator's control panel 168. Described more specifically, the ten indicator lights 178 correspond to the ten provisional initial hydraulic pressure values Pn sequentially set in step S3, and the indicator light 178 corresponding to the preceding value Pn−1 is activated.

If the amount of change ΔPX is larger than the predetermined value α, step S10 is followed by step S13 to judge whether the flag F is set at "1". If an affirmative decision (YES) is obtained in step S13, step S14 is implemented to reset the flag F to "0", and step S12 is then implemented as described above. The control flow goes to step S15 if a negative decision (NO) is obtained in step S13 or after the step S12 has been implemented. In step S15, the control unit 158 determines whether the currently set provisional initial value Pn is P10, namely, 20 kgf/cm$^2$, that is, whether the in-process pressure values PXn corresponding to all the ten provisional initial values P1 through P10 have been detected and stored. If a negative decision (NO) is obtained in step S15, the control flow goes back to step S3. Steps S3 through S15 are repeatedly implemented with the provisional initial values Pn decremented down to 20 kgf/cm². In the first cycle of execution of the routine in which the preceding value Pn−1 does not exist, steps S9 through S14 are skipped, and step S8 is followed by step S15.

Figure 16:
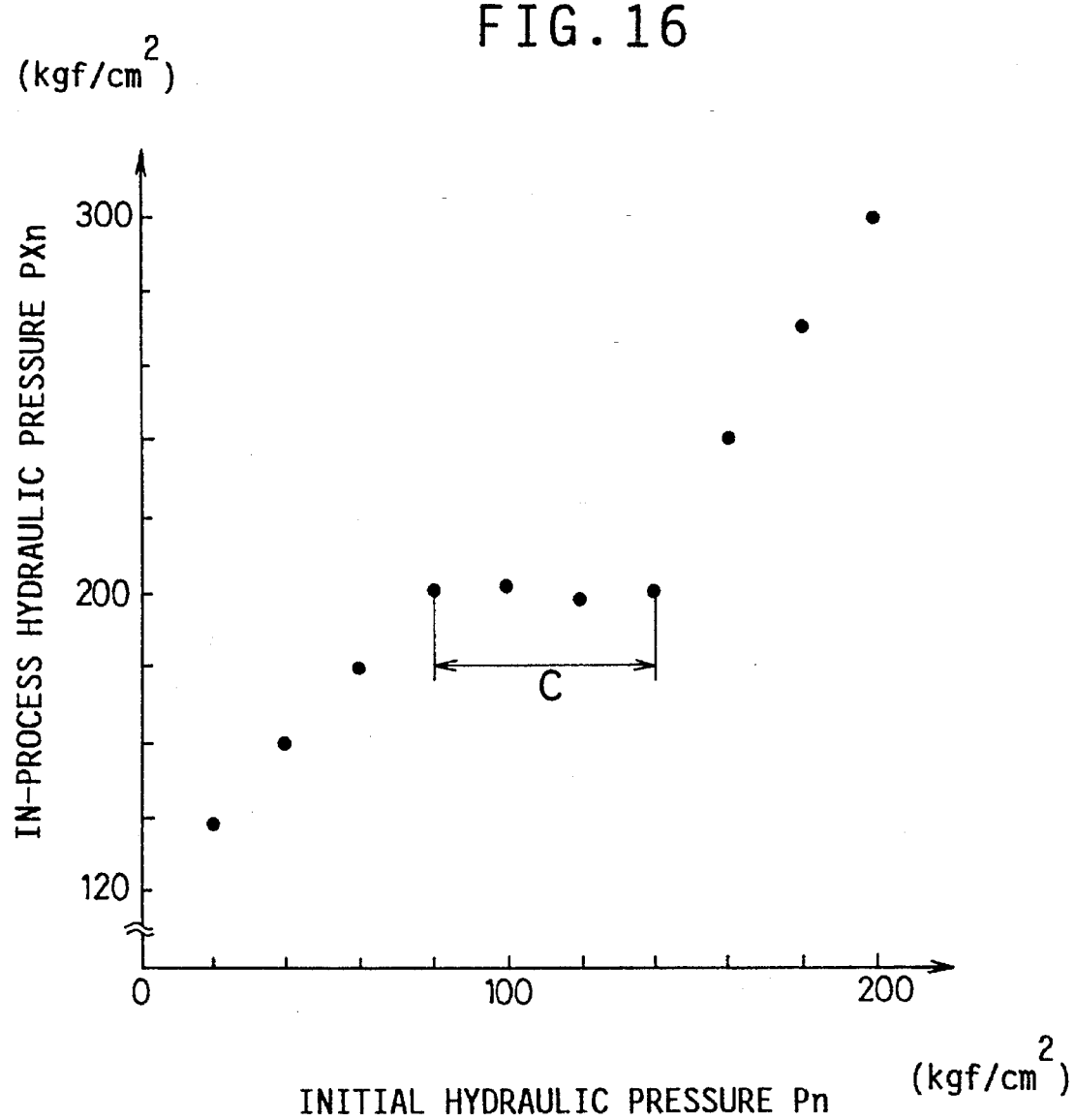
FIG. 16 is a view indicating an example of a relationship between the detected initial and in-process hydraulic pressure values Pn and PXn, which is used to determine the optimum initial and in-process pressure values Po and PXo in the routine of FIGS. 14A and 14B.

The graph of FIG. 16 shows an example of the provisional in-process hydraulic pressure values PXn obtained for the 10 provisional initial hydraulic pressure values Pn, by repeated execution of steps S3–S14. In this specific example, the in-process pressure value PX4 corresponding to the initial value P4(140 kgf/cm²) is 200 kgf cm², while the in-process pressure value PX5 corresponding to the initial value P5 is 198 kgf/cm². Therefore, the amount of change ΔPX=|PX5−PX4| of the pressure value PX5 with respect to the pressure value PX4 is 2 kgf/cm², which is smaller than the predetermined value α of 5 kgf/cm². Accordingly, an affirmative decision (YES) is obtained in step S10, whereby the indicator light 178 corresponding to the provisional initial value P4 (140 kgf/cm²) is activated. Similarly, the affirmative decision (YES) is obtained in step S10 for the provisional initial values P6 (100 kgf/cm²) and P7 (80 kgf/cm²), and the indicator lights 178 corresponding to the provisional initial value P5 (120 kgf/cm²) and P6 (100 kgf/cm²) are activated. In the case of the provisional initial value P8 (60 kgf/cm²), the amount of change ΔPX=|PX8−PX7| is larger than the predetermined value α, whereby the negative decision (NO) is obtained in step S10. Since the flag F has been set to "1" in the preceding cycle, an affirmative decision (YES) is obtained in step S13, and step S12 is implemented following step S14, whereby the indicator light 178 corresponding to the preceding initial value P7 (80 kgf/cm²) is activated. Hatched lines in the row of the indicator lights 178 in FIG. 13B indicate the activated indicator lights 178.

Figure 17:
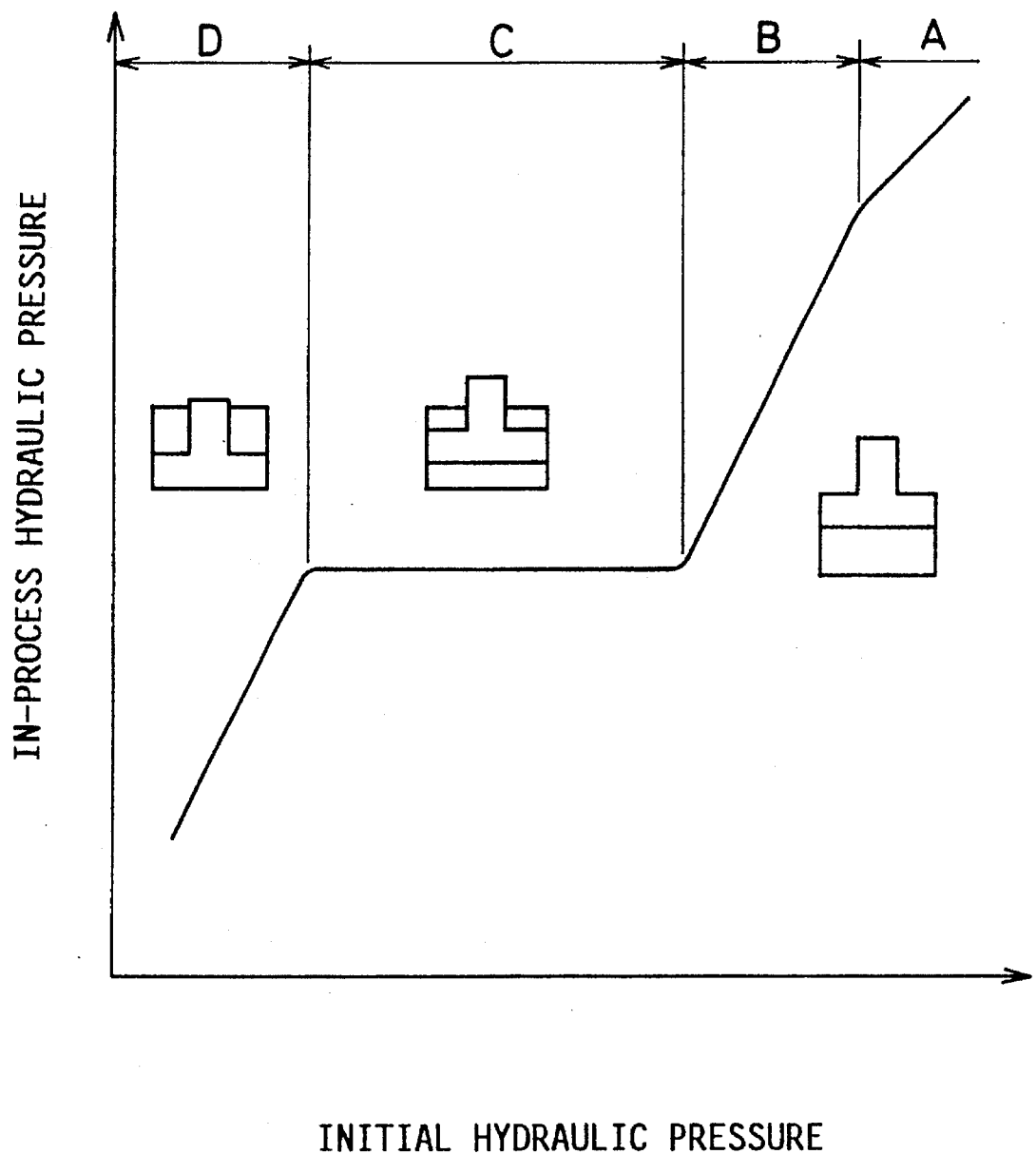
FIG. 17 is a graph explaining a tendency of change in the in-process hydraulic pressure value PXn with the initial hydraulic pressure value Pn.

An optimum range of the initial hydraulic pressure Pn indicated by the activated indicator lights 178 corresponds to a range C of FIGS. 16 and 17 in which the amount of change ΔPX of the in-process hydraulic pressure PXn is smaller than the predetermined value α in spite of the change in the provisional initial value Pn. While the initial hydraulic pressure values Pn of all the hydraulic cylinder 30 are held within this optimum range, the pistons of the cylinders 30 connected to the corresponding cushion pins 22 are all located between their upper and lower stroke ends, as indicated in FIG. 17, during the pressing action, without bottoming of the pistons even with the press slide 20 lowered down to its lower stroke end. Thus, the range C is the optimum range of the initial hydraulic pressure P. The range of the provisional initial hydraulic pressure values Pn and the decrementing amount used in step S3 to detect the optimum range C are suitably determined for specific individual pressing operations which are effected with different blank-holding forces and different numbers of the cushion pins 22. In other words, the range of the values Pn and the decrementing amount are determined depending upon the number of the hydraulic cylinders 30, pressure-receiving area and travel distance of the pistons of the cylinders 30, and optimum range of the blank-holding force, so that the optimum range C of the initial hydraulic pressure P can be detected for each specific pressing job. For instance, the optimum initial hydraulic pressure value is estimated according to the equation (1) identified above, depending upon the blank-holding force and the number of the cushion pins 22, and the range of the initial hydraulic pressure values Pn is determined so as to include the thus estimated optimum initial hydraulic pressure value.

It is noted that an excessive variation in the length of the cushion pins 22 or in the travel distance of the pistons of the hydraulic cylinders 30 may cause bottoming of the pistons of some of the cylinders 30, with no blank-holding force acting on the pistons of the other cylinders 30. In the event of such abnormality of the cushioning apparatus, the optimum range of the initial hydraulic pressure P cannot be found out according to the routine of FIGS. 14A and 14B. In this case, the abnormality can be detected by the operating states of the indicator lights 178. For example, none of the lights 178 are activated, or none of the successive lights 178 are activated. If the AUTO-MANUAL selector 172 is set to "MANUAL", the provisional initial hydraulic pressure Pn can be set as desired by using Pn setting dials 180 (FIG. 13A) on the panel 168. In this manual setting, too, the in-process hydraulic pressure PX is indicated on the indicator 176, which facilitates the manual setting of the initial hydraulic pressure Pn, namely, sequential changing of the provisional initial value Pn by a desired decremental or incremental amount, to detect a change in the in-process hydraulic pressure PXn and determine the optimum range C of the initial hydraulic pressure P.

Referring back to the flow chart of FIG. 14B, the control flow goes to step S16 if the affirmative decision (YES) is obtained in step S15. Step S16 is for determining whether the flag F is set at "1" or not. If so, the step S17 is implemented to activate the indicator light 178 corresponding to the last provisional initial value P10 (20 kgf/cm²). Then, the control flow goes to step S18 to reset the flag F to "0", and to step S19. If the negative decision (NO) is obtained in step S16, the control flow goes directly to step S19, skipping steps S17 and S18. Steps S16 through S18 are provided to activate the indicator light 178 corresponding to the last provisional initial value P10, if the amount of change ΔPX of the in-process pressure PX10 corresponding to the last initial value P10 is equal to or smaller than the predetermined value α.

Step S19 is provided to calculate an optimum initial hydraulic pressure Po, which is an average of the provisional initial pressure values Pn whose indicator lights 178 are currently activated. The calculated optimum initial hydraulic pressure Po is stored in the random-access memory of the control unit 158. In the specific example as shown in FIG. 13B, the optimum initial hydraulic pressure Po is equal to 110 kgf/cm²=(80 kgf/cm²+100 kgf/cm²+ 120 kgf/cm²+140 kgf/cm²)/4. Then, the control flow goes to step S20 to calculate an optimum in-process hydraulic pressure PXo, which is an average of the stored provisional in-process pressure values PXn corresponding to the indicator lights 178 which are currently activated. In the specific example shown in FIG. 16, the optimum in-process hydraulic pressure PXo is equal to (PX4+PX5+PX6+PX7)/4=(200 kgf/cm²+198 kgf/cm²+202 kgf/cm²+201 kgf/cm²)/4, which is approximately 200 kgf/cm². The calculated optimum in-process hydraulic pressure PXO is stored in the random-access memory of the control unit 158, together with the optimum initial hydraulic pressure Po. These values Po and PXo are used as information indicative of the optimum operating condition of the hydraulic cylinders 30.

Figure 18:
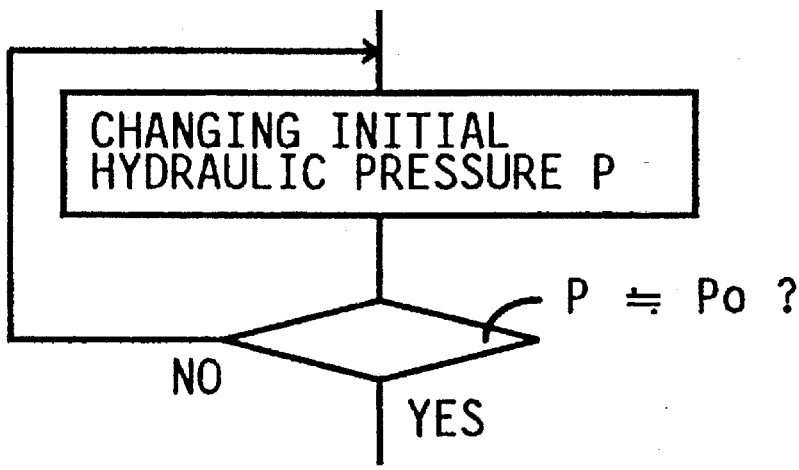
FIG. 18 is a fragmentary flow chart illustrating steps for controlling the initial hydraulic pressure P in a routine for controlling a pressing operation on the press of FIG. 12.
Figure 19:
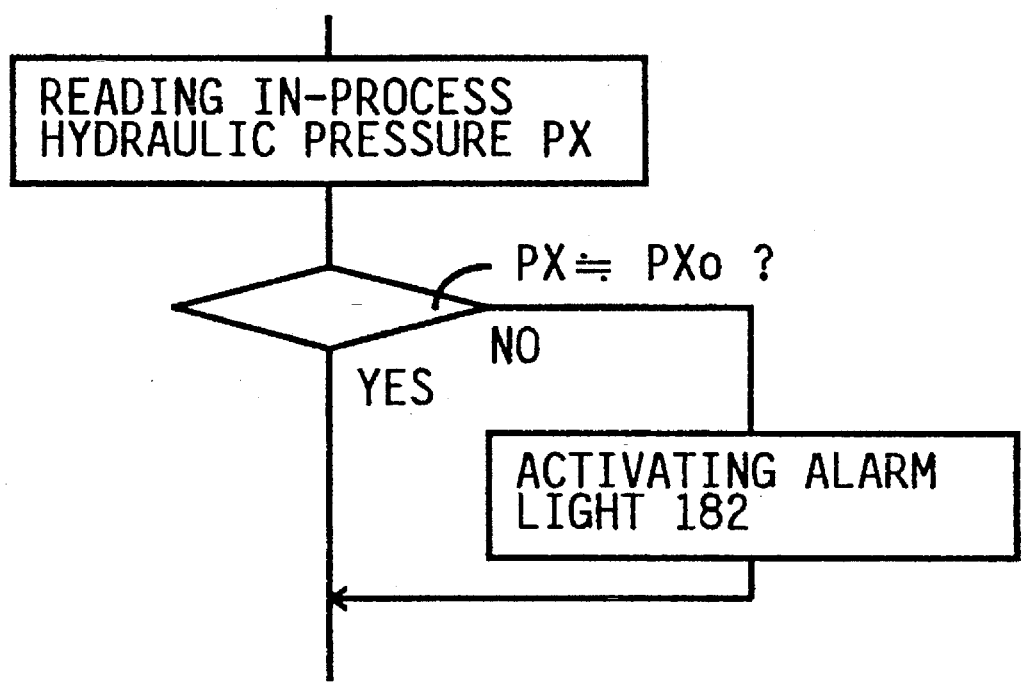
FIG. 19 is a fragmentary flow chart illustrating steps for monitoring the in-process hydraulic pressure PX in the routine indicated above with respect to FIG. 18.

Thus, the routine of FIGS. 14A and 14B is performed to obtain the optimum initial and in-process hydraulic pressure values Po and PXo. In an actual production run of the press, the pump 58 and the hydraulic control circuit 160 are operated to adjust the initial hydraulic pressure P to the stored optimum initial value Po, as indicated in FIG. 18, prior to a drawing operation, when the slide 20 is in its upper stroke end, for example. As indicated above, the optimum initial hydraulic pressure Po permits the pistons of all the hydraulic cylinders 30 to be held between their upper and lower stroke ends during a drawing action on the blank 40, whereby the blank-holding force is substantially evenly distributed on the pressure member 28, so that the blank 40 is held under a substantially uniform surface pressure over its entire surface area contacting the pressure member 28. Further, the in-process hydraulic pressure PX during the drawing operation is read and compared with the stored optimum in-process value PXo, as indicated in FIG. 19. If the actual in-process pressure PX is not substantially equal to the optimum value PXo, an alarm light 182 on the operator's control panel 168 is turned on, or a buzzer is activated in a suitable fashion to inform the operator of the press of some abnormality of the press. It is possible to adjust the initial hydraulic pressure P so that the in-process hydraulic pressure PX substantially coincides with the optimum value PXo. Further, given the optimum in-process hydraulic pressure PXo, the blank-holding force Fs may be obtained according to the equation (2) indicated above, on the basis of the pressure-receiving area As of the hydraulic cylinders 30, weight Wp of the cushion pins 22 and weight Wr of the pressure ring 28, as well as the optimum in-process pressure value PXo.

In the present cushioning apparatus 150 of FIGS. 12–19, the in-process hydraulic pressure values PXn corresponding to the predetermined ten provisional initial hydraulic pressure values Pn are detected to determine the optimum range C of the initial values Pn in which the amount of change $\Delta PX$ of the in-process pressure value PX due to a change in the initial value P does not exceed the predetermined value $\alpha$. The optimum initial hydraulic pressure Po is obtained by calculating the average of the provisional initial hydraulic pressure values Pn within the determined optimum range C, while the optimum in-process hydraulic pressure PXo is obtained by calculating the average of the in-process pressure values PXn corresponding to the initial values Pn within the optimum range C.

The above arrangement permits simpler and more accurate determination of the optimum initial and in-process hydraulic pressure values Po and PXo, than the conventional arrangement in which the optimum values are obtained according to the above equations (1) and (2), on the basis of the average stroke Xav and pressure-receiving area As of the pistons of the hydraulic cylinders 30, volume modulus of elasticity K of the working fluid, total volume V of the fluid, etc. Thus, the present embodiment assures reduced defects of the products due to uneven distribution of the blank-holding force on the pressure member 28. The on-off states of the indicator lights 178 enable the operator to find some abnormality of the cushioning apparatus 150. The operator's control panel 168 and the switches on the press permit automatic detection of the in-process hydraulic pressure values PXn, automatic calculation of the amount of change $\Delta PX$, automatic determination of the optimum range C of the initial hydraulic pressure P, and automatic determination or calculation of the optimum initial and in-process pressure values Po and PXo based on the determined optimum range C. Accordingly, the operator's working load is reduced, and inadequate setting of the operating condition of the press due to erroneous operation by the operator can be effectively avoided.

It will be understood from the above description of the present embodiment of FIGS. 14–19 that the steps S3, S4 and S8 implemented by the control unit 158 constitute a step of obtaining the relationship between the initial and in-process hydraulic pressure values Pn and PXn as illustrated in the graph of FIG. 16, while steps S9, S10, S12 and S17 constitute a step of determining the optimum range C of the initial hydraulic pressure value Pn in which the in-process hydraulic pressure value PXn is substantially constant irrespective of the change in the initial value Pn, or the amount of change $\Delta PX$ is not larger than the predetermined value $\alpha$. Further, the pressure sensor 162 serves as means for detecting the hydraulic pressure P in the hydraulic cylinders 30, while the portion of the control unit 158 assigned to implement steps S3 and S4 cooperates with the pump 58 and hydraulic control circuit 160 to constitute initial pressure changing means for changing the provisional initial hydraulic pressure value Pn in a plurality of steps at a predetermined rate of change, that is, in decrements of 20 kgf/cm². It is also noted that the portion of the control unit 158 assigned to implement steps S8 and S9 constitutes calculating means for calculating the amount of change $\Delta PX$ in the in-process hydraulic pressure PX. The portion of the control unit 158 assigned to implement step S10 constitutes judging means for judging whether the amount of change $\Delta PX$ is larger than the predetermined value $\alpha$, while the portion of the control unit 158 assigned to implement steps S12, S17, S19 and S20 constitutes means for determining the optimum initial and in-process hydraulic pressure values Po and PXo, that is, the optimum operating condition of the hydraulic cylinders 30, on the basis of the provisional initial hydraulic pressures Pn within the optimum range C.

Regarding the relationship between the initial and in-process hydraulic pressure values Pn and PXn, it is noted that the in-process value PXn does not substantially change with the initial value Pn due to air trapped in the working fluid, when the initial value Pn is relatively low. The graph of FIG. 20 indicates an example of such case, in which the in-process hydraulic pressure values PX9 and PX10 corresponding to the relatively low initial values P9= 40 kgf/cm² and P10=20 kgf/cm² are substantially equal to each other. In this case, the affirmative decision (YES) is obtained in step S10 in the cycle wherein the initial value P10 (=20 kgf/cm²) is set and established in steps S3 and S4. Consequently, the indicator lights 178 corresponding to the initial values P9 and P10 are turned on in steps S12 and S17, and the control unit 158 may erroneously determine the optimum initial and in-process hydraulic pressure values Po and PXo.

Figure 21A:
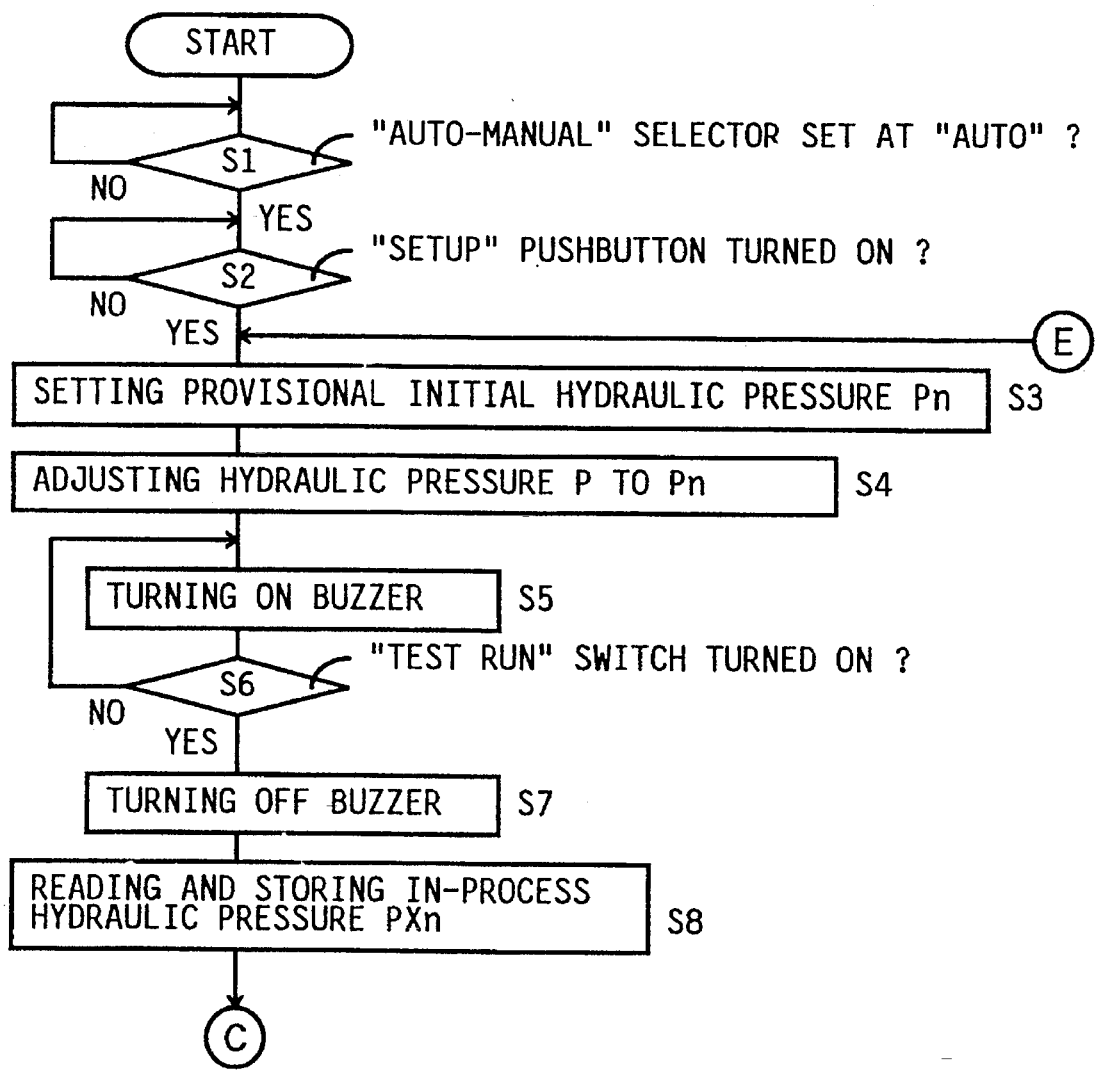
Figure 21B:
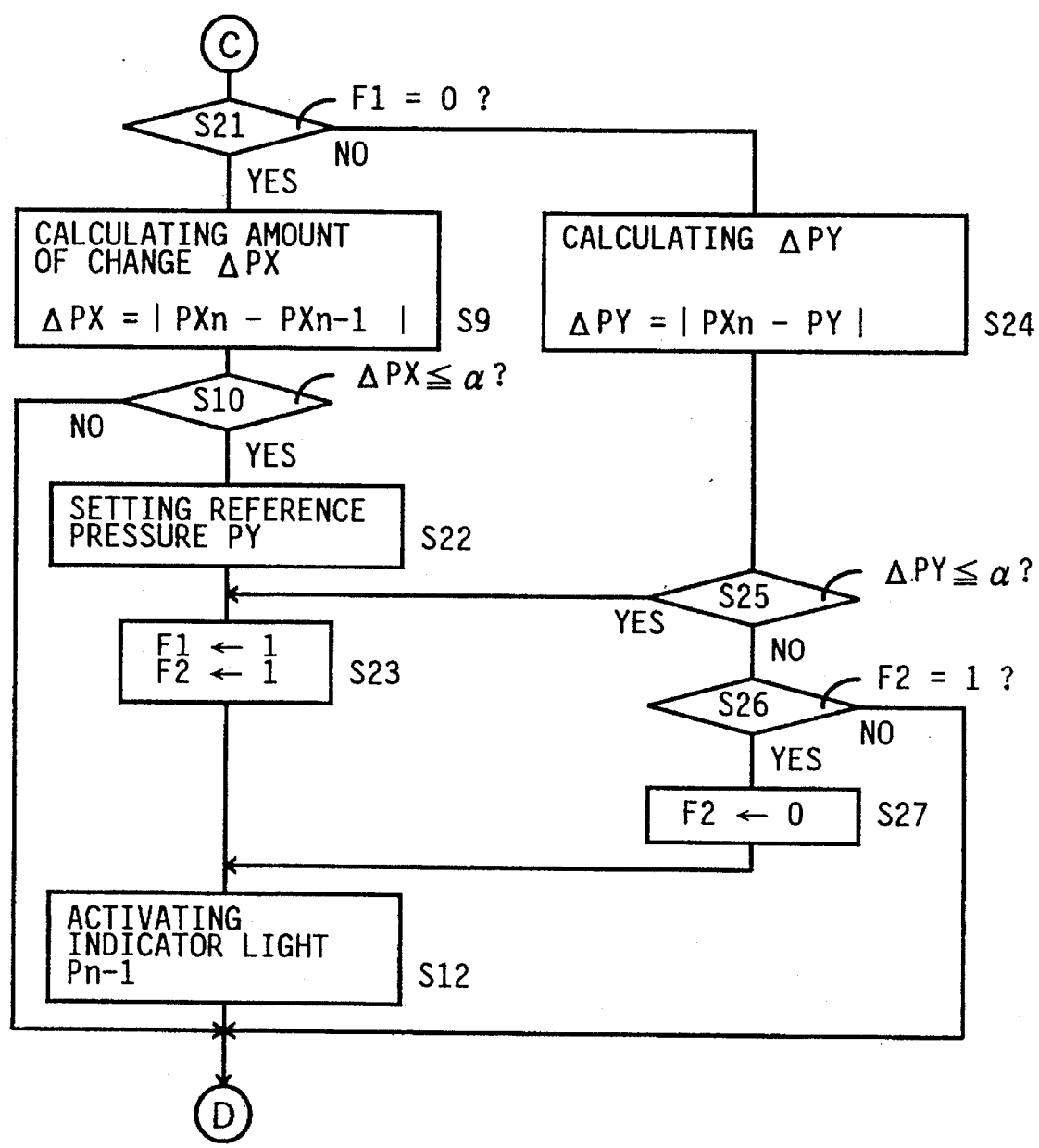

Referring to the flow chart of FIGS. 21A, 21B and 21C, there is illustrated a routine to determine the optimum initial and in-process hydraulic pressure values Po and PXo, which routine is adapted to avoid erroneous determination of the optimum range of the initial value Pn for the reason explained above. In this embodiment, too, the same reference numerals as used in the preceding embodiments will be used to identify the functionally corresponding elements.

Referring to FIG. 21A, steps S1 through S8 of the routine are similar to those of the routine of FIG. 14A. However, step S8 is followed by step S21 (FIG. 21B) to determine whether a flag F1 is set to "0". Since the flag F1 is reset to "0" in the initialization process of the control unit 158, step S21 is followed by step S9 in the first cycle of execution of the routine. Step S10 is then implemented to judge whether the amount of change $\Delta PX$ calculated in the preceding step S9 is equal to or smaller than the predetermined value $\alpha$. If the affirmative decision (YES) is obtained in step S10, the control flow goes to step S22 to set a reference hydraulic pressure value PY, and to step S23 to set the flag F1 and a flag F2 to "1". The reference value PY is subsequently used as a basis on which the amount of change in the in-process value PXn is calculated. The reference value PY may be the in-process value PXn obtained in step S8 in the present cycle of execution of the routine, or the in-process value PXn−1 obtained in step S8 in the last cycle of execution of the routine, or may alternatively be the average value of the values PXn and PXn−1. Step S23 is followed by step S12 wherein the indicator light 178 on the panel 168 which corresponds to the preceding initial value Pn−1 is activated.

In the case where the affirmative decision (YES) is obtained in step S10 and the flag F1 is set to "1" in step S23, step S21 is followed by step S24 in the next cycle of execution of the routine. In step S24, an amount of change $\Delta PY=|PXn-PY|$ of the current in-process value PXn with respect to the reference value PY is calculated. Step S24 is followed by step S25 to judge whether the amount of change $\Delta PY$ is equal to or smaller than the predetermined value $\alpha$ or not. The value a used in step S25 may be different from that used in step S10. If an affirmative decision (YES) is obtained in step S25, steps S23 and S12 are implemented to activate the indicator light 178 corresponding to the preceding initial hydraulic pressure value Pn−1. If the amount of change $\Delta PY$ is larger than the predetermined value $\alpha$ or if a negative decision (NO) is obtained in step S25, the control flow goes to step S26 to determine whether the flag F2 is set at "1". If the flag F2 is set at "1", step S27 is implemented to reset the flag F2 to "0", and the control flow goes to step S15 (FIG. 21C) through step S12. If the flag F2 is set at "0", the control flow goes directly to step S15. Step S15 is followed by step S16' to determine whether the flag F2 is set at "1". If the flag F2 is set at "1", step S17 is implemented to activate the indicator light 178 corresponding to the current initial pressure value Pn, namely, P10=20 kgf/cm². Step S17 is followed by step S18' to reset the flags F1 and F2 to "0".

In the present modified embodiment of FIGS. 21A, 21B and 21C, step S22 is provided to set the reference hydraulic pressure value PY, when the affirmative decision (YES) is obtained in step S10 for the first time (that is, when the amount of change $\Delta PX$ has become equal to or smaller than the predetermined value $\alpha$ for the first time). As explained above, the reference pressure value PY is determined by the in-process pressure value PXn detected when the affirmative decision (YES) is obtained in step S10 for the first time. For instance, the value PY may be the present in-process pressure value PXn, the preceding in-process pressure value PXn−1 or the average of the values PXn and PXn−1. Once the reference hydraulic pressure value PY has been set in step S22, this value PY is used in the subsequent cycles of execution of the routine, to judge whether the amount of change of the in-process value PXn with a change in the initial value Pn is substantially constant. Namely, the present in-process value PXn is compared with the reference value PY to obtain the amount of change $\Delta PY$ in step S24, and the thus obtained amount of change $\Delta PY$ is compared with the predetermined value $\alpha$ in step S25. In the specific example of FIG. 20, the in-process hydraulic pressure value PX4 or PX5 or the average of these values PX4 and PX5 is used as the reference value PY. Consequently, the optimum initial hydraulic pressure Po is calculated in step S19 on the basis of the provisional initial pressure values P4 through P7 within the optimum range C, and not on the basis of the provisional initial pressure values P9 and P10 which are almost equal to each other. In other words, the amount of change $\Delta PY$ corresponding to the initial value P9 is necessarily larger than the predetermined value $\alpha$ since the difference of the in-process value PX9 with respect to the reference value PY is considerably large. As described above, the present arrangement is capable of avoiding an erroneous determination of the optimum range of the initial pressure on the basis of the initial values P9 and P10, and assures correct determination of the optimum range C on the basis of the initial values P4–P7, and accurate calculation of the optimum initial and in-process pressure values Po and PXo on the basis of the values Pn within the determined optimum range C and the corresponding in-process values PXn.

In the present embodiment of FIGS. 21A, 21B and 21C, steps S3, S4 and S8 constitute a step of obtaining the relationship between the initial and in-process hydraulic pressure values Pn and PXn, while steps S9, S10, S12, S17, S22, S24 and S25 constitute a step of determining the optimum range C of the initial hydraulic pressure value Pn. The pressure sensor 162 serves as means for detecting the hydraulic pressure P, and the portion of the control unit 158 assigned to implement steps S3 and S4 cooperates with the pump 58 and hydraulic control circuit 160 to constitute initial pressure changing means for changing the provisional initial hydraulic pressure value Pn. The portion of the control unit 158 assigned to implement steps S8, S9, S22 and S24 constitutes calculating means for calculating the amount of change $\Delta PX$, $\Delta PY$. The portion of the control unit 158 assigned to implement step S10 and S25 constitutes judging means for judging whether the amount of change $\Delta PX$, $\Delta PY$ is larger than the predetermined value $\alpha$, while the portion of the control unit 158 assigned to implement steps S12, S17, S19 and S20 constitutes means for determining the optimum initial and in-process hydraulic pressure values Po and PXo, that is, the optimum operating condition of the hydraulic cylinders 30. It is also noted that the portion of the control unit 158 assigned to implement steps S21 and S23 provides means for inhibiting steps S9 and S10 from being implemented once the affirmative decision (YES) is obtained in step S10.

Figure 22:
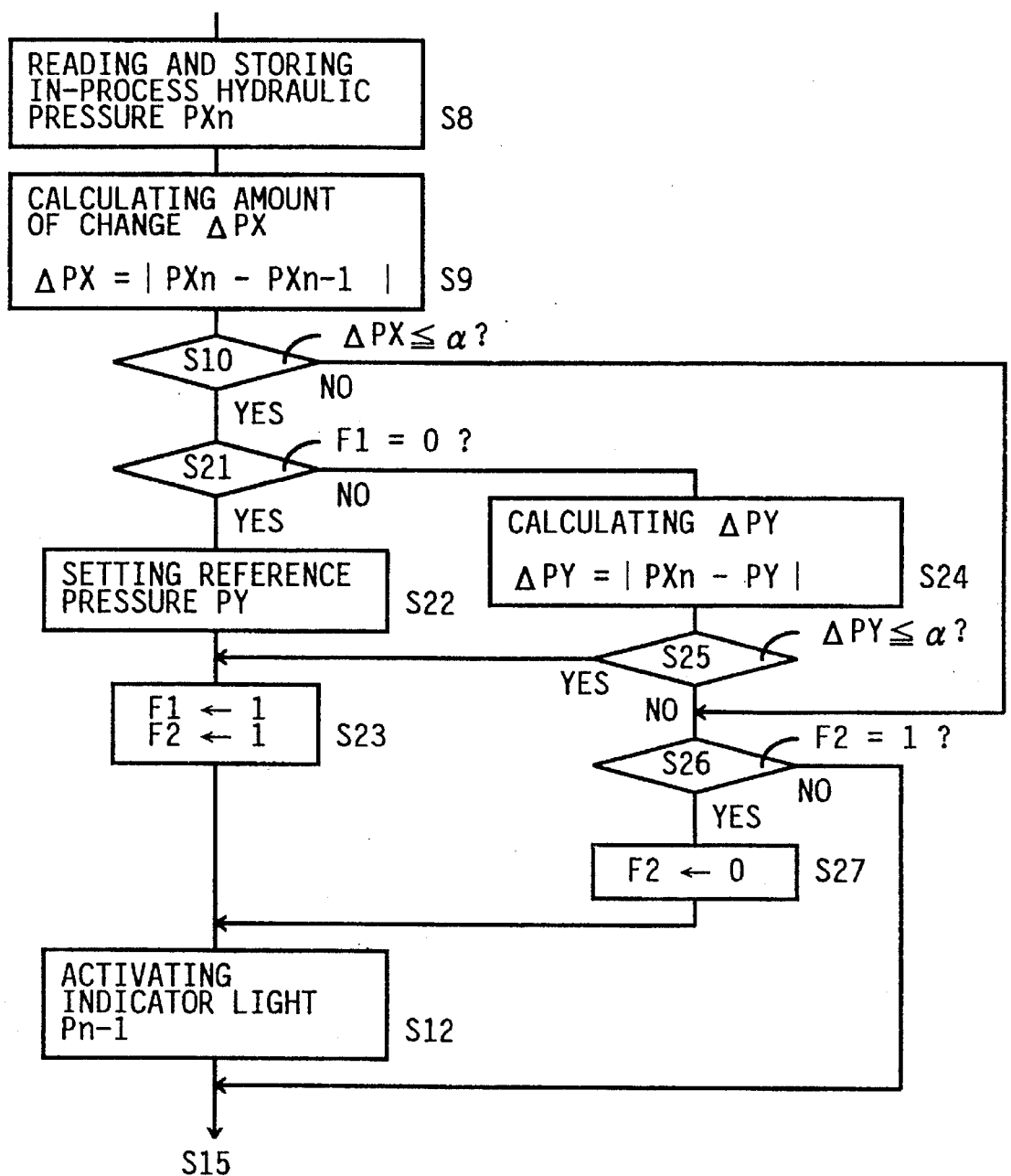
FIG. 22 is a flow chart illustrating another routine executed in a yet further embodiment of the invention.

One modification of the preceding embodiment of FIGS. 21A, 21B and 21C is illustrated in the flow chart of FIG. 22. This modified embodiment also includes steps S21 through S27 as in the preceding embodiment. While step S21 is implemented between steps S8 and S9 in the preceding embodiment, this step S21, if implemented, follows step S10 in the present modified embodiment of FIG. 22. More specifically, steps S8, S9 and S10 are successively implemented in the order of description as in the embodiment of FIGS. 14A and 14B, so that the amount of change $\Delta PX$ calculated in step S9 based on the in-process hydraulic pressure value PXn read and stored in step S8 is compared with the predetermined value $\alpha$ in step S10. If the amount of change $\Delta PX$ is equal to or smaller than the predetermined value $\alpha$, step S10 is followed by step S21 to determine whether the flag F1 is set at "0". Since the flag F1 has been initialized to "0", the affirmative decision (YES) is obtained in step S21 when this step S21 is implemented for the first time. As a result, step S21 is followed by step S22 in which the reference hydraulic pressure value PY is set as described above with respect to the preceding embodiment of FIGS. 21A, 21B and 21C. Then, the control flow goes to step S23 to set the flags F1 and F2 to "1", and step S12 to turn on the indicator light 178 corresponding to the preceding provisional initial hydraulic pressure value Pn−1. Once the affirmative decision (YES) has been obtained in step S10 and the flag F1 has been set to "1" in step S23, the negative decision (NO) is obtained in step S21 in the next cycle of execution of the routine, whereby step S21 is followed by step S24. If the negative decision (NO) is obtained in step S10, namely, if the amount of change $\Delta PX$ is larger than the predetermined value $\alpha$, step S10 is followed by step S26.

In the present embodiment of FIG. 22, therefore, step S21 and the subsequent steps are implemented only after the amount of change ΔPX has become equal to or smaller than the predetermined value α. Once the reference hydraulic pressure value PY has been set in step S22, step S21 is followed by step S24 and the subsequent steps, so that the in-process hydraulic pressure value PXn is compared with the reference value PY. Once the reference value PY has been set, the affirmative decision (YES) in step S10 will not result in automatic implementation of step S12. That is, once step S12 is implemented following steps S22 and S23, this step S12 will not be implemented again unless the affirmative decision (YES) is obtained in step S25 (unless the amount of change ΔPY has become equal to or smaller than the predetermined value α) after the affirmative decision (YES) is obtained in step S10 (the amount of change ΔPX has become equal to or smaller than the value α). If the negative decision (NO) is obtained in step S25, the flag F2 is set to "0" in step S27, and the negative decision (NO) is obtained in step S26 in the next cycle, whereby step S12 will not be implemented. Thus, the embodiment of FIG. 22 has the same advantage as the preceding embodiment of FIGS. 21A, 21B and 21C.

Figure 23A:
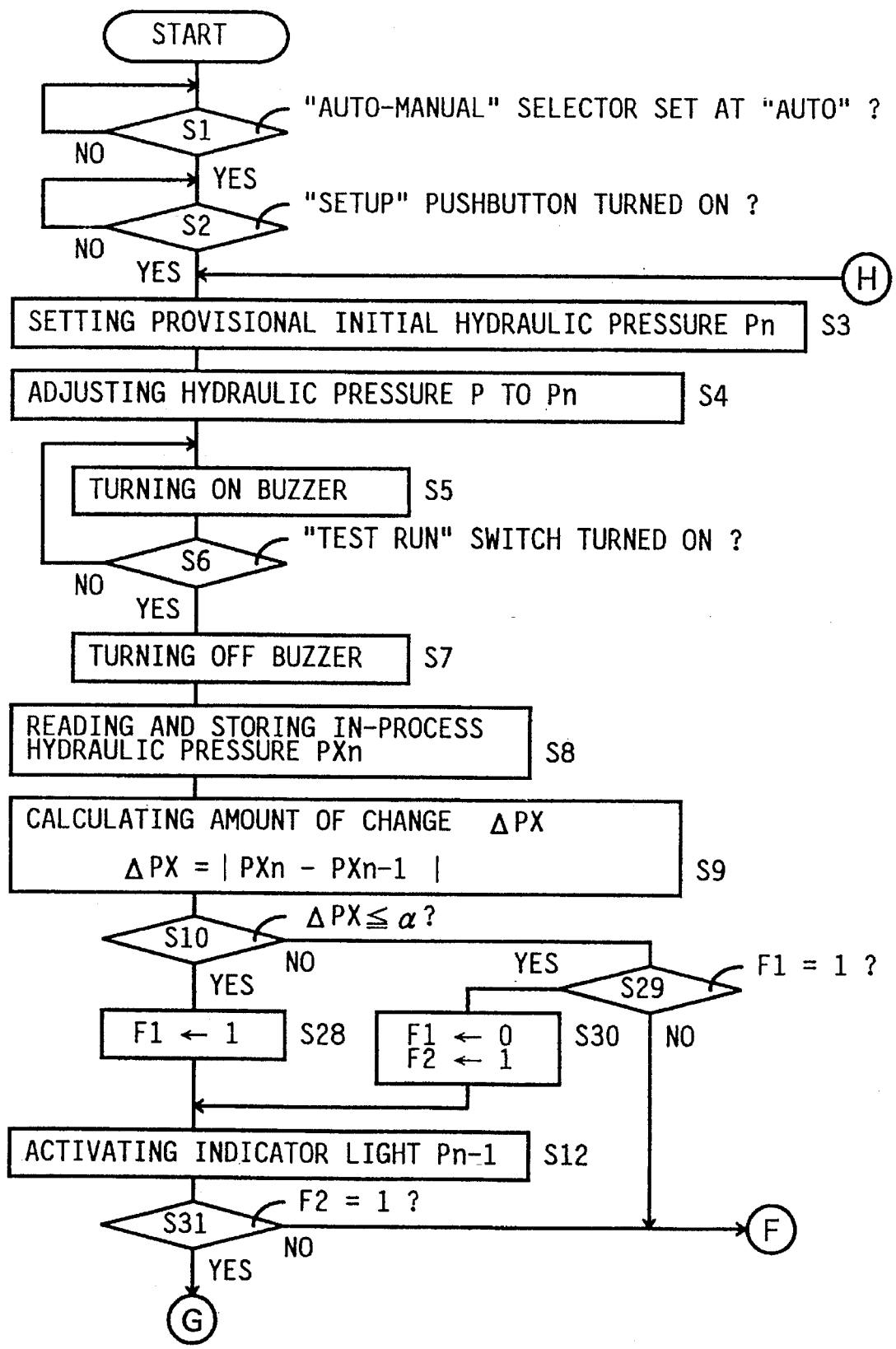

A modification of the embodiment of FIGS. 14A and 14B is illustrated in the flow chart of FIGS. 23A and 23B in which steps S1 through S10 are implemented as in the embodiment of FIGS. 14A and 14B. The present modified embodiment uses two flags F1 and F2. If the affirmative decision (YES) is obtained in step S10, step S28 is implemented to set the flag F1 to "1", and then step S12 is implemented to activate the indicator light 178 corresponding to the preceding provisional initial hydraulic pressure value Pn−1. If the negative decision (NO) is obtained in step S10, step S29 is implemented to determine whether the flag F1 is set at "1". If the flag F1 is set at "1", step S29 is followed by step S30 in which the flag F1 is reset to "0" while the flag F2 is set to "1". Further, step S12 is followed by step S31 to determine whether the flag F2 is set at "1". If this flag F2 is set at "0", the control flow goes to step S15 (FIG. 23B) and the subsequent steps. If the flag F2 is set at "1", that is, if the negative decision (NO) is obtained in step S10 and steps S29 and 30 are implemented after the affirmative decision (YES) is once obtained in step S10, the control flow goes directly to step S18" and the subsequent steps (FIG. 23B), and the routine is terminated. It is noted that steps S16", S17 and S18" are implemented if the affirmative decision (YES) is obtained in step S10 when the last provisional initial hydraulic pressure value P10 (20 kgf/cm²) is established, or if the affirmative decision (YES) is not obtained (step S12 is not implemented) for any one of the ten provisional initial hydraulic pressure values Pn. Step S16" is implemented to determine whether the flag F1 is set at "1". If the flag F1 is set at "1", step S17 is implemented to activate the indicator light 178 corresponding to the current provisional initial hydraulic pressure value Pn, namely, P10 (20 kgf/cm²). Step S17 is followed by step S18" to reset the flags F1 and F2 to "0".

In the present embodiment of FIGS. 23A and 23B, the flag F2 is set to "1" in step S30 if the negative decision (NO) is obtained in step S10 after the affirmative decision (YES) is once obtained in step S10. In this case, therefore, the control flow does not return to step S3 through step S15, but goes to step S18", whereby the routine is terminated once the negative decision (NO) following the affirmative decision (YES) is obtained in step S10. Accordingly, step S12 will not be implemented successively with the relatively low provisional initial hydraulic pressure values Pn once this step S12 has been implemented with the relatively high provisional initial hydraulic pressure values Pn. In the example of FIG. 20, therefore, only the relatively high initial hydraulic pressure values P4 through P7 for which the amount of change ΔPX is sufficiently small are determined to fall within the optimum range C, but the routine is terminated when the negative decision (NO) is subsequently obtained in step S10 for the initial hydraulic pressure value P8 (60 kgf/cm²). Thus, the optimum initial and in-process hydraulic pressure values Po and PXo are calculated based on only the provisional initial values P4–P7 within the optimum range C.

In the present embodiment of FIGS. 23A and 23B, steps S3, S4 and S8 constitute a step of obtaining the relationship between the initial and in-process hydraulic pressure values Pn and PXn, while steps S9, S10, S12 and S17 constitute a step of determining the optimum range C of the initial hydraulic pressure value Pn, as in the embodiment of FIGS. 14A and 14B. The present embodiment is also similar to the embodiment of FIGS. 14A and 14B, in that the portion of the control unit 158 assigned to implement steps S3 and S4 cooperates with the pump 58 and hydraulic control circuit 160 to constitute initial pressure changing means for changing the provisional initial hydraulic pressure value Pn, and the portion of the control unit 158 assigned to implement steps S8 and S9 constitutes calculating means for calculating the amount of change ΔPX. Further, the portion of the control unit 158 assigned to implement step S10 constitutes judging means for judging whether the amount of change ΔPX is larger than the predetermined value α, while the portion of the control unit 158 assigned to implement steps S12, S17, S19 and S20 constitutes means for determining the optimum initial and in-process hydraulic pressure values Po and PXo. It is further noted that the portion of the control unit 158 assigned to implement steps S30 and S31 provides means for inhibiting steps S3–S10 (in particular step S10) after the negative decision (NO) following the affirmative decision (YES) is obtained in step S10 for the first time.

Figure 24:
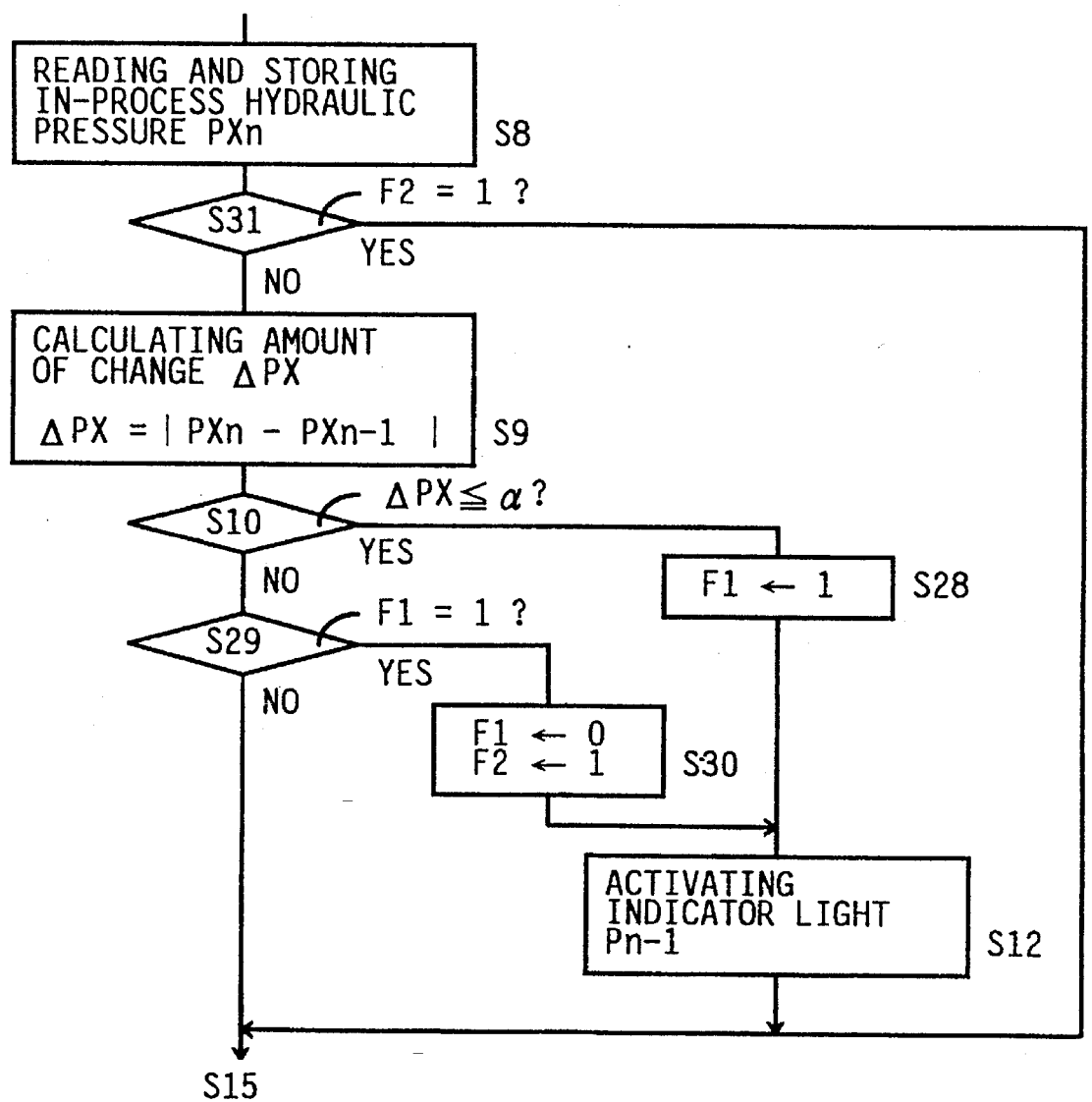
FIG. 24 is a flow chart illustrating a routine executed in a further embodiment of the invention.

A modification of the embodiment of FIGS. 23A and 23B is illustrated in the flow chart of FIG. 24 in which steps S28 through S31 are implemented as in the embodiment of FIGS. 23A and 23B. In this modified embodiment, step S31 to determine whether the flag F2 is set at "1" is implemented between steps S8 and S9. If the flag F2 is set at "1", step S9 and subsequent steps including step S12 are not implemented, and the control flow returns to step S3 through step S15, for implementing step S8 for the remaining provisional initial hydraulic pressure values Pn. Thus, the in-process pressure values PXn are detected, stored, and displayed on the operator's control panel 168 even after the negative decision (NO) following the affirmative decision (YES) is obtained in step S10. Hence, the present embodiment is capable of obtaining the relationship between the provisional initial and in-process pressure values Pn and PXn over the entire range of the initial value Pn. The present embodiment is similar to the preceding embodiment of FIGS. 23A and 23B, regarding the activation of the indicator lights 178 in step S12, and the calculation of the optimum initial and in-process hydraulic pressure values Po and PXo.

In the above embodiments of FIGS. 14, 21, 22, 23 and 24 are adapted to determine the optimum initial and in-process hydraulic pressures Po and PXo, by detecting the in-process pressure values PXn during different test pressing cycles effected with different provisional initial hydraulic pressure values Pn. However, the optimum in-process pressure PXo may be determined by detecting the in-process pressure value PXn while changing the amount of fluid in the hydraulic cylinders 30 when the upper die 18 is held in abutting contact with the pressure ring 28. A cushioning apparatus 188 illustrated in FIG. 25 incorporates one example of such a device adapted to determine the optimum in-process hydraulic pressure PXo on the basis of the detected in-process pressure PX which varies with a change in the amount of the fluid in the cylinders 30.

Figure 25:
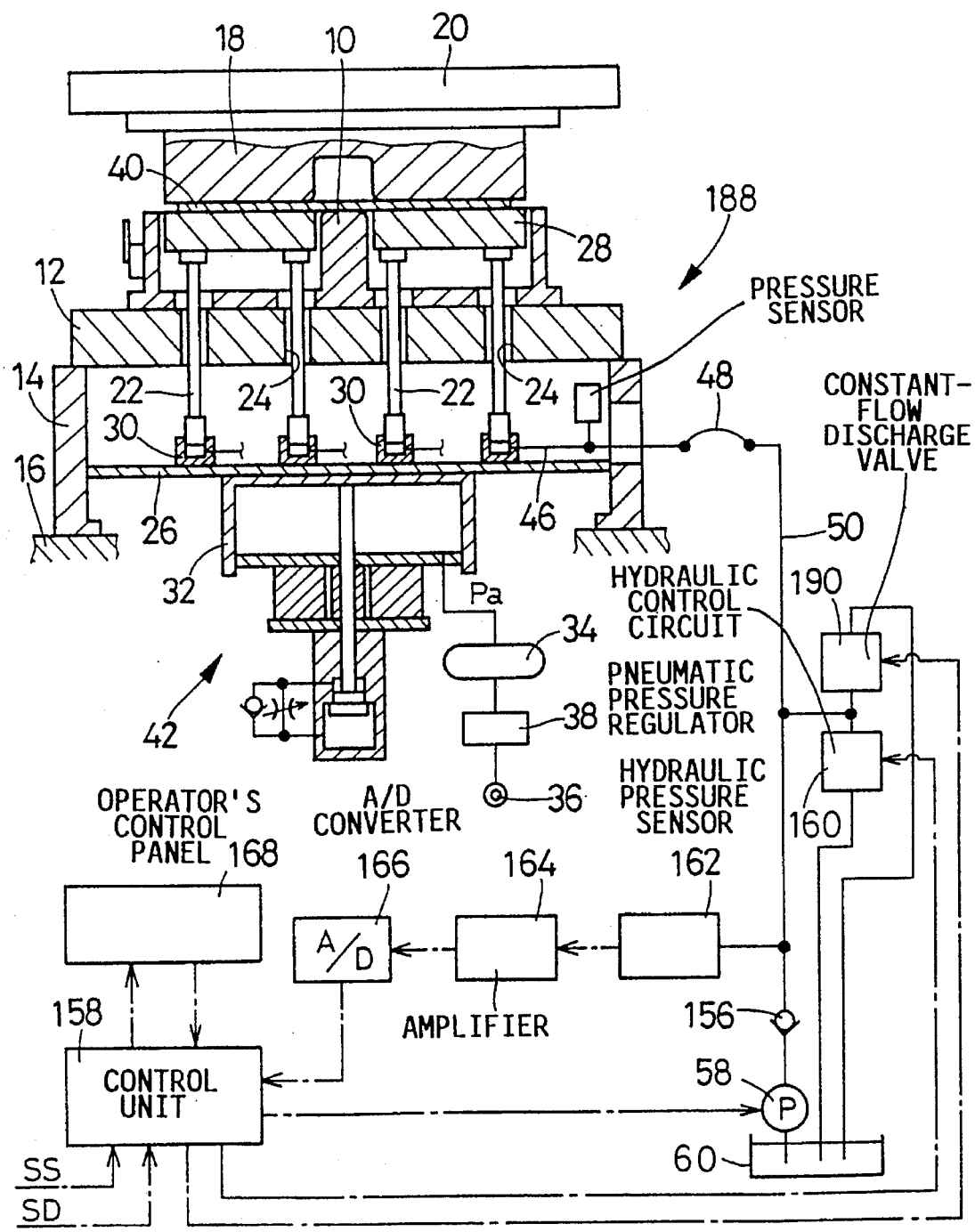
FIG. 25 is a schematic view showing a press equipped with a cushioning apparatus according to a still further embodiment of this invention.

In the cushioning apparatus 188 of FIG. 25, the fluid passage 50 is connected to a constant-flow discharge valve 190 as well as to the hydraulic control circuit 160. The discharge valve 190 is opened and closed according to a signal received from the control unit 158, during execution of a routine as illustrated in the flow chart of FIG. 26. The discharge valve 190 placed in its open position permits the fluid to flow therethrough at a predetermined rate. The present apparatus 188 does not require the indicator lights 178 on the operator's control panel 168.

Figure 26:
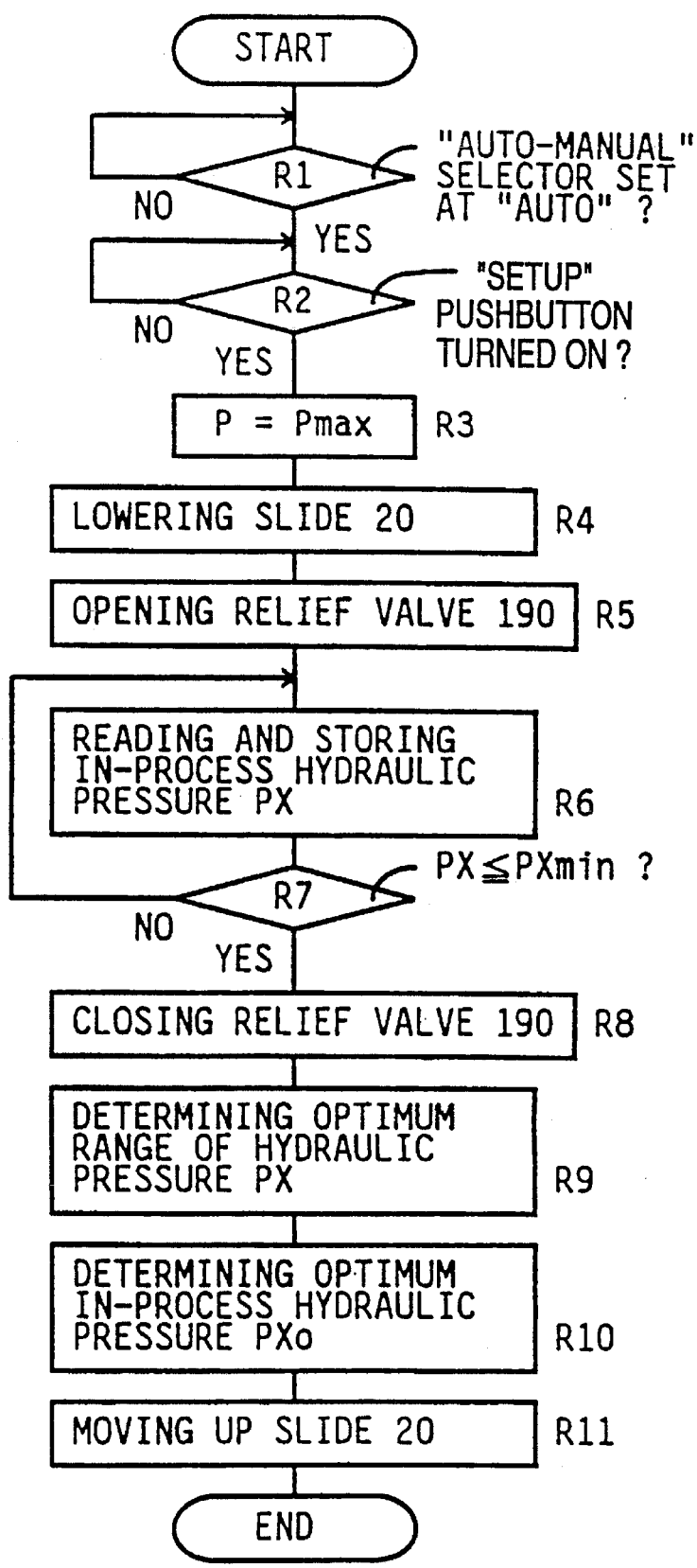
FIG. 26 is a flow chart illustrating a routine for determining the optimum in-process hydraulic pressure PXo of the apparatus of FIG. 25.

Referring to the flow chart of FIG. 26, the routine is started with steps R1 and R2 to determine whether the AUTO-MANUAL selector 172 is set at "AUTO" while the SETUP pushbutton 174 is on. If an affirmative decision (YES) is obtained in both of these steps R1 and R2, the control flow goes to step R3 in which the pump 58 and the hydraulic control circuit 160 are activated and controlled to regulate the hydraulic pressure P in the fluid passage 50 and hydraulic cylinders 30 prior to a pressing operation, so that the pressure P as detected by the hydraulic pressure sensor 162 is adjusted to a predetermined maximum level Pmax, which may be 200 kgf/cm$^2$, for example. Then, step R4 is implemented to lower the press slide 20 to a predetermined blank-holding position in which the upper die 18 attached to the press slide 20 is forced against the pressure ring 28. The blank-holding position may be the lower stroke end of the slide 20 which is detected by the signal SD indicative of the lower stroke end of the slide 20. With the press slide 20 located in the predetermined blank-holding position, step R5 is implemented to open the constant-flow discharge valve 190 so that the fluid is discharged from the hydraulic cylinders 30 and passage 50 at a given flow rate, into the reservoir 60. The hydraulic pressure PX, which decreases as the fluid is discharged, is detected and stored in the random-access memory of the control unit 158 in step R6.

Step R6 is repeatedly implemented at a predetermined time interval until an affirmative decision (YES) is obtained in step R7, namely, until the detected hydraulic pressure PX is lowered down to a predetermined lower limit PXmin, which may be approx. 150 kgf/cm$^2$, for instance. When the detected pressure PX is equal or lower than the lower limit PXmin, the control flow goes to step R8 to close the discharge valve 190, and step R9 to determine an optimum range of the hydraulic pressure PX on the basis of the pressure values PX detected in step R6. The hydraulic pressure values Pmax and PXmin may be predetermined constant values, or selected as desired with appropriate switches by the operator. Alternatively, those values Pmax and PXmin may be determined on the basis of estimated initial and in-process pressure values which are calculated according to the above equation (1) or (2) and depending upon the other operating conditions of the press such as the desired blank-holding force and the number of the cushion pins 22 used.

Figure 27:
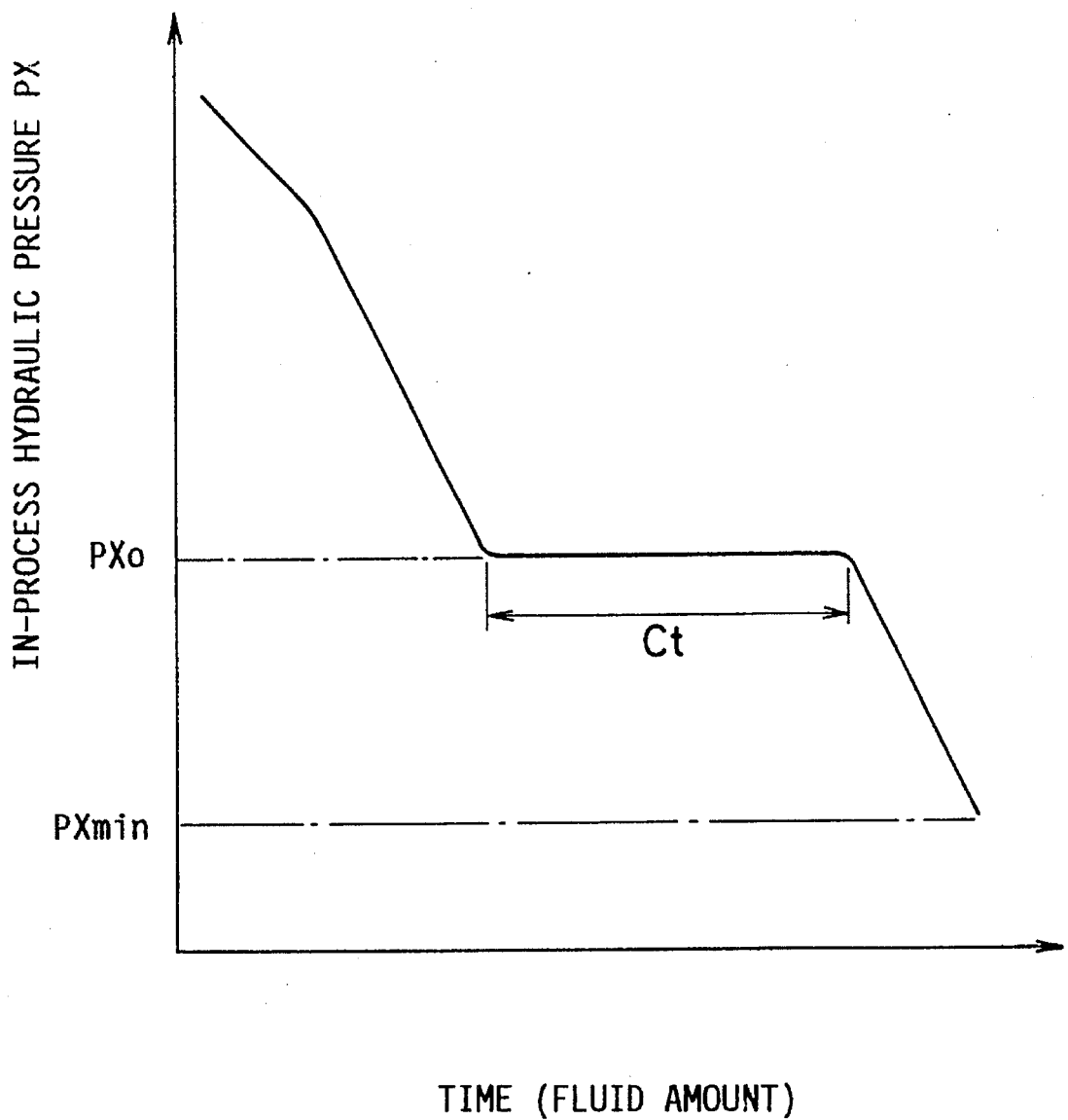
FIG. 27 is a graph explaining an example of a change in the in-process hydraulic pressure PX as detected in the routine of FIG. 26.

As indicated above, the hydraulic pressure PX detected in step R6 varies with time as indicated in the graph of FIG. 27 as the fluid is discharged from the hydraulic circuit including the hydraulic cylinders 30. Changing the amount of the fluid in the hydraulic circuit by discharging the fluid through the relief valve 160 provides substantially the same result in connection with the hydraulic pressure PX, as the changing of the initial hydraulic pressure P in the preceding embodiments of FIGS. 14 and 21–24. That is, when the pistons of the hydraulic cylinders 30 are located at their neutral positions permitting even distribution of the blank-holding force, the pressure PX in the hydraulic circuit is kept substantially constant, in spite of the change in the amount of the fluid in the hydraulic circuit, which causes only slight movements of the cylinder pistons. In view of this fact, the pressure values PX successively detected in step R6 are checked in step R9 to see if the amount of change of the successive pressure values PX does not exceed a predetermined value. If the amount of change is not larger than the predetermined value, the appropriate successive pressure values PX can be determined to fall within the optimum range. In the example of FIG. 27, the pressure PX is held in the optimum range during a time period indicated at Ct. This time period Ct corresponds to an optimum range of the fluid amount in the hydraulic circuit. The determination in step R9 may be made by comparing an amount of change $\Delta$PX and/or an amount of change $\Delta$PY with a predetermined value as in the embodiments of FIGS. 14 and 21–24. If the optimum range of the fluid amount cannot be determined or two or more optimum ranges are recognized, this means some abnormality of the cushioning apparatus 188, and an alarm light or buzzer is activated to indicate the abnormality.

Then, the control flow goes to step R10 in which the optimum in-process hydraulic pressure PXo is determined on the basis of the pressure values PX within the optimum range determined in step R9. For instance, the optimum in-process hydraulic pressure PXo may be an average of the pressure values PX within the optimum range. The determined optimum value PXo is stored in the random-access memory of the control unit 158. Step R10 is followed by step R11 to move the slide 20 back to its upper stroke end. Thus, the routine of FIG. 26 is terminated. In an actual pressing operation on the press, the initial hydraulic pressure P prior to a pressing action is adjusted to an optimum value Po so that the in-process pressure PX is substantially equal to the optimum value PXo determined in step R10. The value PXo may be used to monitor the actual in-process pressure PX, as illustrated in the flow chart of FIG. 19.

This cushioning apparatus 188 also permits easy and accurate determination of the optimum in-process hydraulic pressure PXo, and diagnosis regarding the hydraulic pressure of the cylinders 30, without the conventionally required calculation according to the above equation (1) or (2) on the basis of the average operating stroke Xav and pressure-receiving area As of the pistons of the cylinders 30, the volume modulus of elasticity K and total volume of the fluid, etc. Further, the routine to determine the optimum in-process hydraulic pressure PXo is performed fully automatically in a single test operation in which the hydraulic pressure PX is detected as the fluid is discharged from the hydraulic circuit through the discharge valve 190, with the press slide 20 held in abutting contact with the pressure ring 28. Accordingly, the present apparatus 188 assures more efficient determination of the optimum value PXo, than the preceding embodiments in which many test pressing cycles are performed with different provisional initial hydraulic pressure values Pn, each cycle being started by manipulation of the TEST RUN switch provided on the press.

It will be understood from the above description that the portion of the control unit 158 assigned to implement step R4 corresponds to a step of holding the press slide 20 in abutting contact with the pressure ring 28, and the portion of the control unit 158 assigned to implement steps R5 and R6 corresponds to a step of detecting the hydraulic pressure PX while the amount of the fluid in the hydraulic circuit including the cylinders 30 is changed. Further, the portion of the control unit 158 assigned to implement step R9 corresponds to a step of determining an optimum range of the hydraulic pressure PX in which the pressure PX is substantially constant irrespective of a change in the amount of the fluid in the hydraulic circuit.

While the present invention has been described in detail in its presently preferred embodiments, it is to be understood that the invention may be otherwise embodied.

In the illustrated embodiments of FIGS. 1–11, the discharge flow of the fluid from the hydraulic cylinders 30 is controlled on the basis of the vertical position of the press slide 20 or upper die 18 as detected by the position sensors 70. However, the hydraulic pressure sensor 62 may be used to control the flow regulating means. For instance, the hydraulic pressure detected by the sensor 62 may be used to determine the point at which the flow regulating means is commanded to initiate the fluid discharge from the hydraulic cylinders 30. The position sensors 70 may be a sensor capable of continuously detecting a linear or angular position, such as a magnetic length measuring device for sensing the position of the press slide 20, or a rotary encoder for detecting the rotating angle of a crank of the drive mechanism for the slide 20.

In the illustrated embodiments of FIGS. 1–11, the single controller 56 is assigned to control not only the initial hydraulic pressure Po of the hydraulic cylinders 30 but also the discharge flow of the fluid from those cylinders 30. However, the initial hydraulic pressure Po and the discharge flow of the fluid may be controlled by two exclusive controllers. In the embodiment of FIG. 10, the controller 56 may be replaced by four controllers corresponding to the four groups of hydraulic cylinders 30a–30d disposed in the four sections A–D of the platen 26.

While the hydraulic cylinders 30 in the embodiment of FIG. 10 are classified into the four groups 30a–30d corresponding the four sections A–D of the cushion platen 26, the manner of grouping the hydraulic cylinders 30 (manner of dividing the platen 26) and the number of the groups of hydraulic cylinders 30 (number of the divided sections of the platen 26) may be changed as needed. In this respect, it is possible that each hydraulic cylinder 30 considered as the smallest independent unit is connected to a supply line and a discharge line such that the individual hydraulic cylinders are independent of each other. In this case, the initial hydraulic pressure values in the individual cylinders and the discharge flows of the fluid from those cylinders are controlled independently of each other.

In the embodiment of FIG. 10, the four hydraulic control circuits 104a–104d control the initial pressures values of the four groups of hydraulic cylinders 30a–30d to the respective different optimum values Poa–Pod depending upon the pneumatic pressure of the single pneumatic cylinder 32, so that the pistons of the hydraulic cylinders 30a–30d of the four groups are all placed in their neutral positions during a pressing action on the blank 40. However, it is possible to use four mutually independent pneumatic cylinders 32 and four mutually independent cushion platens 26 which correspond to the four groups of hydraulic cylinders 30. In this case, the original blank-holding force values corresponding to the four pneumatic cylinders 32 may be adjusted to respective different optimum values, and the optimum initial hydraulic pressures Poa–Pod may be selected over a comparatively wide range depending upon the established optimum original blank-holding force values.

The embodiment of FIG. 11 in which the four hydraulic pressure sensors 110a–110d are provided for the respective four groups of hydraulic cylinders 30a–30d is capable of adjusting the initial hydraulic pressures of the four groups of cylinders 30a–30d independently of each other. A single hydraulic pressure sensor may be provided in the common fluid passage 134 (between the hydraulic control circuit 54 and the solenoid-operated shut-off valves 106a–106d). In this case, the initial hydraulic pressure values of the four groups of hydraulic cylinders 30a–30d are adjusted to the same optimum value by the hydraulic control circuit 54, but the discharge flows of the fluid from the four groups of hydraulic cylinders 30a–30d can be controlled by the respective four flow regulating means 114a–114d independently of each other.

In the embodiments of FIGS. 14 and 21–24, the buzzer is turned on in step S5 after the hydraulic pressure adjustment to the preset initial pressure value Pn in step S4, to prompt the operator to turn on the TEST RUN switch in step S6. However, steps S5 and S6 are replaced by a step in which a test pressing cycle is automatically initiated after the hydraulic pressure adjustment in step S4.

While the indicator lights 178 are provided in the embodiments of FIGS. 14 and 21–24 to indicate the optimum range of the initial hydraulic pressure Pn, these lights 178 may be eliminated, provided the control unit 158 is adapted to store the provisional initial hydraulic pressure values Pn which correspond to the in-process hydraulic pressure values PXn whose amount of change ΔPX is not larger than the predetermined value α.

In the embodiments of FIGS. 14 and 21–24, the press or operator's control panel 168 may be equipped with a liquid crystal display or other display means for indicating the obtained relationship between the provisional initial and in-process hydraulic pressure Pn and PXn as illustrated in the graph of FIG. 16. In this case, the operator of the press may determine the optimum initial pressure Po and/or the optimum in-process pressure PXo. Such display means may be employed in the embodiment of FIGS. 25–27, to indicate the detected hydraulic pressure PX in relation to time or the amount of the fluid in the hydraulic circuit, as illustrated in the graph of FIG. 27.

In the embodiments of FIGS. 14 and 21–24, the provisional initial hydraulic pressure values Pn are set in step S4, in the order from the highest value P1 (200 kgf/cm$^2$) to the lowest value P10 (20 kgf/cm$^2$). However, the pressure Pn may be set starting with the lowest value (20 kgf/cm$^2$). The highest and lowest values of the provisional initial pressure Pn, and the interval of the values Pn may be manually set by the operator.

The embodiments of FIGS. 14 and 21–24 wherein the optimum initial and in-process pressure values Po and PXo are both calculated may be modified to obtain only one of these values.

Although the embodiment of FIGS. 25–27 is adapted to discharge the fluid at a constant flow rate through the constant-flow discharge valve 190, it is possible to discharge the fluid through a flow restrictor. In this case, a cumulative amount of the fluid discharged is detected by a suitable sensor, so that the optimum in-process pressure PXo is determined on the basis of a relationship between the detected cumulative amount of the discharged fluid and the detected pressure PX. It is also possible to intermittently discharge the fluid by a predetermined amount for each discharge, and detect the pressure PX at the end of each discharge.

Further, the optimum hydraulic pressure PXo may be determined by detecting the pressure PX while the pressure of the pressurized fluid delivered from the pump 58 is raised from a low level by the hydraulic control circuit 160.

In the embodiment of FIGS. 25–27, step R11 may be preceded by a step in which the pressure of the fluid delivered from the pump 58 is raised to the optimum in-process pressure value PXo determined in step R10. This step is followed by step R11 to move the press slide 20 to its upper stroke end, and then detect the hydraulic pressure as the optimum initial pressure Po. It is also possible to stop the discharge flow of the fluid when the amount of change in the in-process pressure PX becomes smaller than a predetermined value. In this case, the pressure value PX detected last is determined as the optimum in-process hydraulic pressure PXo, and the pressure detected after the slide 20 is returned to the upper stroke end is determined as the optimum initial hydraulic pressure Po.

Although the illustrated embodiments are applied to a mechanical press in which the press slide 20 is reciprocated by a drive mechanism which uses cranks and other linkage members driven by a motor, the principle of the present invention is equally applicable to a hydraulic press in which the press slide is reciprocated by a hydraulic system.

While the presses equipped with the illustrated cushioning apparatuses are adapted such that the punch 10 (lower die) is disposed on the base 16 through the press carrier 14, the cushioning apparatus of the present invention is also applicable to a press in which the punch 10 is disposed otherwise, for instance, directly attached to the base 16.

Although the force generating means 42 used in the illustrated embodiments uses the pneumatic cylinder 32, a hydraulic cylinder equipped with a pressure relief valve whose relief pressure is variable, or a spring may be used as the force generating means.

It is to be understood that the present invention may be embodied with various other changes, modifications and improvements, which may occur to those skilled in the art, in the light of the foregoing teachings.

What is claimed is:

1. A method of checking an optimum condition relating to a hydraulic pressure of a plurality of hydraulic cylinders in a cushioning apparatus for a press having an upper die and a lower die which cooperate to perform a pressing action on a blank during a downward movement of the upper die, and a pressure member which cooperates with said upper die to hold said blank during said pressing action, said cushioning apparatus including (a) force generating means for generating a blank-holding force, (b) a cushion platen disposed below said lower die and biased toward said lower die by said blank-holding force, (c) said plurality of hydraulic cylinders disposed on said cushion platen and having fluid chambers communicating with each other, and (d) a plurality of cushion pins associated at lower ends thereof with said hydraulic cylinders, respectively, and supporting at upper ends thereof said pressure member, and wherein said blank is held by said upper die and said pressure member during said pressing action, by said blank-holding force which is generated by said force generating means and which is transmitted to said pressure member through said cushion platen, hydraulic cylinders and said cushion pins such that said blank-holding force is substantially evenly distributed on all of said cushion pins by said hydraulic cylinders, said method comprising the steps of:

detecting in-process values of a hydraulic pressure in said hydraulic cylinders during pressing actions in a plurality of pressing cycles which are started at different initial values of said hydraulic pressure prior to said pressing actions respectively, to thereby obtain a relationship between said initial values and said in-process values of said hydraulic pressure, said relationship including a characteristic portion wherein said in-process values detected in successive adjacent ones of said pressing cycles are substantially the same, irrespective of a difference in the corresponding initial values; and determining, on the basis of said characteristic portion of the detected relationship, an optimum range of said initial values of said hydraulic pressure in which said in-process value of said hydraulic pressure is substantially constant irrespective of a change in said initial value.

2. A method according to claim 1, wherein said step of determining an optimum range of said initial values of said hydraulic pressure comprises: a sub-step (S8) of storing two successively detected in-process values (PXn, PXn–1) of said hydraulic pressure which correspond to respective two successive initial values (Pn, Pn–1) of said hydraulic pressure: a sub-step (S9) of calculating an amount of change (ΔPX) of a latter one (PXn) of said two successively detected in-process values with respect to a preceding one (Pn–1) of said two successively detected in-process values; a sub-step (S10) of judging whether said amount of change (ΔPX) of said two successively detected in-process values (PXn, PXn–1) is larger than a predetermined value (α) or not; and a sub-step (S12, S17) of determining that at least one of said two successive initial values (Pn, Pn–1) corresponding to said two successively detected in-process values (PXn, PXn–1) falls within said optimum range (C), if said amount of change is judged not be larger than said predetermined value.

3. A method according to claim 2, wherein said step of detecting in-process values (PXn) of a hydraulic pressure in said hydraulic cylinders comprises a sub-step (S3, S4) of changing said initial value (Pn) of said hydraulic pressure in a predetermined number of steps (P1 through P10) at a predetermined range of change.

4. A method according to claim 3, wherein said sub-step (S10) of judging whether said amount of change (ΔPX) is larger than a predetermined value or not is effected for all combinations of said two successively detected in-process values corresponding to respective all combinations of said two successive initial values available with said predetermined number of steps.

5. A method according to claim 3, wherein said sub-step (S10) of judging whether said amount of change (ΔPX) is larger than a predetermined value or not is inhibited from being implemented after said amount of change for any combination of said two successively detected in-process values corresponding to one of combinations of said two successive initial values available with said predetermined number of steps is judged to be larger than said predetermined value after said amount of change for a preceding combination of said two successively detected in-process values has been judged not to be larger than said predetermined value.

6. A method according to claim 5, wherein said step of detecting in-process value (PXn) of a hydraulic pressure in said hydraulic cylinders is continued even after said amount of change for said any combination of said two successively detected in-process values is judged to be larger than said predetermined value after said amount of change for said preceding combination of said two successively detected in-process values has been judged not be larger than said predetermined value.

7. A method according to claim 3, wherein said sub-steps (S8, S9, S10, S12, S17) recited in claim 2 are effected until said amount of change ($\Delta$PX) for any combination of said two successively detected in-process values corresponding to any combination of said two successive initial values available with said predetermined number of steps has been judged not to be larger than said predetermined value, and wherein said step of determining an optimum range of said initial value of said hydraulic pressure further comprises: a sub-step (S22) of setting a reference hydraulic pressure value (PY) when said amount of change for said any combination of said two successively detected in-process values has been judged not to be larger than said predetermined value; a sub-step (S24) of calculating an amount of change ($\Delta$PY) of the in-process value (PXn) detected after said reference hydraulic pressure value (PY) is set, with respect to said reference hydraulic pressure value; and a sub-step (S25) of judging whether said amount of change ($\Delta$PY) of said in-process value with respect to said reference hydraulic pressure value is larger than a predetermined threshold ($\alpha$) or not.

8. A method according to claim 7, wherein said reference hydraulic pressure value (PY) is selected from the group consisting of: said latter one (PXn) of said two successively detected in-process values whose amount of change ($\Delta$PX) has been judged not to be larger than said predetermined value; said preceding one (PXn–1) of said two successively detected in-process values whose change has been judged not be larger than said predetermined value; and an average of said two successively detected in-process values (PXn, PXn–1) whose amount of change has been judged not to be larger than said predetermined value.

9. A method according to claim 7, wherein said predetermined threshold ($\alpha$) is equal to said predetermined value ($\alpha$).

10. A device for determining an optimum condition relating to a hydraulic pressure of a plurality of hydraulic cylinders in a cushioning apparatus for a press having an upper die and a lower die which cooperate to perform a pressing action on a blank during a downward movement of the upper die, and a pressure member which cooperates with said upper die to hold said blank during said pressing action, said cushioning apparatus including (a) force generating means for generating a blank-holding force (b) a cushion platen disposed below said lower die and biased toward said lower die by said blank-holding force, (c) said plurality of hydraulic cylinders disposed on said cushion platen and having fluid chambers communicating with each other, and (d) a plurality of cushion pins associated at lower ends thereof with said hydraulic cylinders, respectively, and supporting at upper ends thereof said pressure member, and wherein said blank is held by said upper die and said pressure member during said pressing action, by said blank-holding force which is generated by said force generating means and which is transmitted to said pressure member through said cushion platen, hydraulic cylinders and said cushion pins such that said blank-holding force is substantially evenly distributed on all of said cushion pins by said hydraulic cylinders, said device comprising:

detecting means for detecting a hydraulic pressure in said hydraulic cylinders;

initial pressure changing means for changing an initial value of said hydraulic pressure prior to said pressing action, in a plurality of steps at a predetermined rate of change, so that pressing actions in a plurality of pressing cycles are effected at different initial values of said hydraulic pressure;

calculating means for calculating an amount of change of an in-process value of said hydraulic pressure detected by said detecting means during one of said pressing cycles with respect to an in-process value of said hydraulic pressure detected by said detecting means during a preceding one of said pressing cycles, said amount of change arising from a difference between the initial values established by said initial pressure changing means in said one and preceding pressing cycles;

judging means for judging whether said amount of change of said in-process value calculated by said calculating means is larger than a predetermined value; and determining means for determining an optimum condition relating to said hydraulic cylinders, on the basis of an optimum range of said initial value of said hydraulic pressure in which said amount of change of said in-process value is not larger than said predetermined value.

11. A device according to claim 10, wherein said calculating means comprises: means (S8) for storing two successively detected in-process values (PXn, PXn–1) of said hydraulic pressure which correspond to respective two successive initial values (Pn, Pn–1) of said hydraulic pressure; and means (S9) for calculating an amount of change ($\Delta$PX) of a latter one (PXn) of said two successively detected in-process values with respect to a preceding one (Pn–1) of said two successively detected in-process values, and wherein said judging means comprises means (S10) for judging whether said amount of change ($\Delta$PY) of said two successively detected in-process values is larger than a predetermined value ($\alpha$) or not.

12. A device according to claim 11, wherein said determining means comprises means (S12, S17) for determining that at least one of said two successive initial values (Pn, Pn1–1) corresponding to said two successively detected in-process values (PXn, PXn–1) falls within said optimum range (C), if said judging means (S10) judges that said amount of change ($\Delta$PX) of said two successively detected in-process values is not larger than said predetermined value.

13. A device according to claim 12, wherein said initial pressure changing means comprises a pressure source for delivering a pressurized fluid, pressure regulating means for regulating a pressure of said pressurized fluid as said initial value of said hydraulic pressure in said hydraulic cylinders, and a controller for controlling said pressure regulating means to regulate said initial value of said hydraulic pressure in a predetermined number of steps at said predetermined rate of change.

14. A device according to claim 13, wherein said judging means is operable for all combinations of said two successively detected in-process values corresponding to respective all combinations of said two successive initial values available with said predetermined number of steps.

15. A device according to claim 13, further comprising inhibiting means (S30, S31) for inhibiting said judging means (S10) from operating after said judging means judges that said amount of change for any combination of said two successively detected in-process values corresponding to one of combinations of said two successive initial values available with said predetermined number of steps is larger than said predetermined value, after said judging means has judged that said amount of change for a preceding combination of said two successively detected in-process values is not larger than said predetermined value.

16. A device according to claim 15, wherein said means (S8) for storing two successively detected in-process values (PXn, PXn−1) of said hydraulic pressure is continuously operable even after said judging means judges that said amount of change for said any combination of said two successively detected in-process values is larger than said predetermined value after said judging means has judged that said amount of change for said preceding combination of said two successively detected in-process values is not larger than said predetermined value.

17. A device according to claim 13, further comprising inhibiting means (S21, S23) for inhibiting operations of said means (S8) for storing two successively detected in-process values (PXn, PXn−1) of said hydraulic pressure, said means (S9) for calculating an amount of change (ΔPX) of a latter one (PXn) of said two successively detected in-process values with respect to a preceding one (Pn−1) of said two successively detected in-process values, and said means (S10) for judging whether said amount of change (ΔPY) of said two successively detected in-process values is larger than a predetermined value (α) or not, after until said means (S10) for judging has judged that said amount of change (ΔPX) for any combination of said two successively detected in-process values corresponding to any combination of said two successive initial values available with said predetermined number of steps is not larger than said predetermined value, said calculating means further comprising means (S22) for setting a reference hydraulic pressure value (PY) when said judging means has judged that said amount of change (ΔPX) for any combination of said two successively detected in-process values is not larger than said predetermined value (α), and means (S24) for calculating an amount of change (ΔPY) of the in-process value (PXn) detected after said reference hydraulic pressure value (PY) is set, with respect to said reference hydraulic pressure value, said judging means (158, S10, S25) further comprising means (S25) for judging whether said amount of change (ΔPY) of said in-process value with respect to said reference hydraulic value is larger than a predetermined threshold (α) or not.

18. A device according to claim 17, wherein said reference hydraulic pressure (PY) is selected from the group consisting of: said latter one (PXn) of said two successively detected in-process values whose amount of change (ΔPX) has been judged not to be larger than said predetermined value; said preceding one (PXn−1) of said two successively detected in-process values whose change has been judged not be larger than said predetermined value; and an average of said two successively detected in-process values (PXn, PXn−1) whose amount of change has been judged not to be larger than said predetermined value.

19. A method according to claim 17, wherein said predetermined threshold (α) is equal to said predetermined value (α).

20. A method of checking an optimum condition relating to a hydraulic pressure of a plurality of hydraulic cylinders in a cushioning apparatus for a press having an upper die and a lower die which cooperate to perform a pressing action on a blank during a downward movement of the upper die, and a pressure member which cooperates with said upper die to hold said blank during said pressing actions said cushioning apparatus including (a) force generating means for generating a blank-holding force, (b) a cushion platen disposed below said lower die and biased toward said lower die by said blank-holding force, (c) said plurality of hydraulic cylinders disposed on said cushion platen and having fluid chambers communicating with each other, and (d) a plurality of cushion pins associated at lower ends thereof with said hydraulic cylinders, respectively, and supporting at upper ends thereof said pressure member, and wherein said blank is held by said upper die and said pressure member during said pressing action, by said blank-holding force which is generated by said force generating means and which is transmitted to said pressure member through said cushion platen, hydraulic cylinders and said cushion pins such that said blank-holding force is substantially evenly distributed on all of said cushion pins by said hydraulic cylinders, said method comprising the steps of:

lowering said upper die to a predetermined blank-holding position for abutting contact with said pressure member;

detecting a plurality of values of a hydraulic pressure of a working fluid in a hydraulic circuit including said hydraulic cylinders, at a predetermined time interval while said upper die is held in said predetermined position and while an amount of said working fluid in said hydraulic circuit is changed; and determining an optimum range of the hydraulic pressure in which said hydraulic pressure is substantially constant irrespective of a change in said amount of the fluid in said hydraulic circuit as a function of time.

21. A method according to claim 20, wherein said amount of the working fluid in said hydraulic circuit is reduced by discharging the fluid from the hydraulic circuit while said upper die is held in said blank-holding position.

22. A method according to claim 21, wherein said working fluid is discharged from said hydraulic circuit through a discharge valve connected to said hydraulic circuit.

23. A method according to claim 20, further comprising a step of determining an optimum in-process hydraulic pressure in said hydraulic cylinders during said pressing action, on the basis of the determined optimum range of said hydraulic pressure of the fluid.

24. A method according to claim 20, wherein said step of determining an optimum range of said hydraulic pressure comprising determining whether an amount of change in said hydraulic pressure of the fluid while said amount of said fluid is changed is larger than a predetermined value.

25. A method according to claim 20, wherein said amount of the working fluid is changed until said hydraulic pressure of the fluid is lowered to a predetermined lower limit.

* * * * *

UNITED STATES PATENT AND TRADEMARK OFFICE
CERTIFICATE OF CORRECTION

PATENT NO. : 5,457,980
DATED : October 17, 1995
INVENTOR(S) : Kazunari KIRII et al.

It is certified that error appears in the above-indentified patent and that said Letters Patent is hereby corrected as shown below:

Claim 6, col. 36, line 60, "value" should read --values--.

Signed and Sealed this

Twenty-sixth Day of December, 1995

Attest:

BRUCE LEHMAN

*Attesting Officer*     *Commissioner of Patents and Trademarks*